(12) United States Patent
Sumi et al.

(10) Patent No.: US 9,088,741 B2
(45) Date of Patent: Jul. 21, 2015

(54) METHOD OF CONTROLLING SEMICONDUCTOR DEVICE, SIGNAL PROCESSING METHOD, SEMICONDUCTOR DEVICE, AND ELECTRONIC APPARATUS

(75) Inventors: Hirofumi Sumi, Kanagawa (JP); Nobuo Nakamura, Kanagawa (JP); Shoji Kawahito, Shizuoka (JP)

(73) Assignee: SONY CORPORATION (JP)

( * ) Notice: Subject to any disclaimer, the term of this patent is extended or adjusted under 35 U.S.C. 154(b) by 2 days.

(21) Appl. No.: 13/344,090

(22) Filed: Jan. 5, 2012

(65) Prior Publication Data

US 2012/0104235 A1 May 3, 2012

Related U.S. Application Data

(63) Continuation of application No. 12/903,333, filed on Oct. 13, 2010, now Pat. No. 8,711,261, which is a continuation of application No. 10/997,511, filed on Nov. 24, 2004, now Pat. No. 7,830,436.

(30) Foreign Application Priority Data

Dec. 5, 2003 (JP) ................................. 2003-407966

(51) Int. Cl.
*H04N 5/335* (2011.01)
*H04N 5/235* (2006.01)
(Continued)

(52) U.S. Cl.
CPC .............. *H04N 5/3575* (2013.01); *H04N 5/243* (2013.01); *H04N 5/3696* (2013.01); *H04N 5/37455* (2013.01); *H04N 5/37457* (2013.01)

(58) Field of Classification Search
CPC ..... H04N 5/2352; H04N 5/235; H04N 5/243; H04N 9/045; H04N 2209/049; H04N 5/772; H04N 5/378; H04N 5/335; H04N 5/3575; H04N 3/155; H04N 3/1512; H04N 5/3696; H04N 5/37457; H04N 5/37455; H01L 27/14862; H01L 27/14831

USPC .............. 348/229.1, 264, 300–302, 308–309; 341/196, 155; 250/208.1
See application file for complete search history.

(56) References Cited

U.S. PATENT DOCUMENTS 5,638,072 A * 6/1997 Van Auken et al. ........... 341/141
5,712,682 A 1/1998 Hannah
(Continued)

FOREIGN PATENT DOCUMENTS

EP 0 991 270 4/2000
JP 02-107075 4/1990
(Continued)

OTHER PUBLICATIONS

Michael Schanz et al.; A High-Dynamic-Range CMOS Image Sensor for Automotive Applications; IEEE Journal of Solid-State Circuits, NY; vol. 35, No. 7; Jul. 2000; pp. 932-938; XP001100943.
(Continued)

*Primary Examiner* — Aung S Moe
(74) *Attorney, Agent, or Firm* — Sheridan Ross P.C.

(57) ABSTRACT

A pre-amplifier (column region unit) of a solid-state imaging device including a pixel-signal controller. The pixel-signal controller, for each vertical signal line, detects the level of each pixel signal independently by a pixel-signal detector on the output side of a pixel-signal amplifier, and sets a gain independently to the pixel-signal amplifier according to the level of the signal. At a subsequent stage of the solid-state imaging device, an analog-to-digital (A/D) converter and a signal extending unit are provided. The A/D converter digitizes a pixel signal, and the digitized pixel signal is corrected by a gain set to the pixel-signal amplifier with reference to a classification signal from the pixel-signal detector, so that the dynamic range of signals of one screen is extended.

24 Claims, 29 Drawing Sheets

(51) Int. Cl.
*H04N 5/357* (2011.01)
*H04N 5/3745* (2011.01)
*H04N 5/243* (2006.01)
*H04N 5/369* (2011.01)

(56) References Cited

U.S. PATENT DOCUMENTS

| | | | |
|---|---|---|---|
| 6,137,533 A | 10/2000 | Azim | |
| 6,154,252 A | 11/2000 | Tanaka | |
| 6,313,779 B1* | 11/2001 | Leung et al. | 341/155 |
| 6,396,048 B1 | 5/2002 | Schanz | |
| 6,433,822 B1* | 8/2002 | Clark et al. | 348/241 |
| 6,747,264 B2 | 6/2004 | Miida | |
| 6,757,018 B1* | 6/2004 | Fowler | 348/301 |
| 6,885,331 B2* | 4/2005 | Krymski | 341/169 |
| 7,005,628 B2 | 2/2006 | Rossi | |
| 7,443,435 B2* | 10/2008 | Loose | 348/294 |
| 7,573,518 B2* | 8/2009 | Nakamura et al. | 348/302 |
| 8,149,326 B2* | 4/2012 | Olsen et al. | 348/362 |
| 8,284,284 B2* | 10/2012 | Ueno et al. | 348/301 |
| 2002/0134918 A1 | 9/2002 | Miida | |
| 2003/0033096 A1* | 2/2003 | Hansen et al. | 702/45 |
| 2004/0080637 A1* | 4/2004 | Nakamura et al. | 348/255 |
| 2005/0057389 A1* | 3/2005 | Krymski | 341/169 |
| 2006/0012696 A1* | 1/2006 | Zarnowski et al. | 348/294 |
| 2008/0136952 A1* | 6/2008 | Loose | 348/301 |

FOREIGN PATENT DOCUMENTS

| | | |
|---|---|---|
| JP | 04-084520 | 3/1992 |
| JP | 04-104668 | 4/1992 |
| JP | 05-315962 | 11/1993 |
| JP | 10-209868 | 8/1998 |
| JP | 2000-115632 | 4/2000 |
| JP | 2002-320146 | 10/2002 |
| JP | 2002-534005 | 10/2002 |
| WO | 99/45751 | 9/1999 |
| WO | 00/38409 | 6/2000 |

OTHER PUBLICATIONS

Cha You-Jin et al; Digitally-controlled automatic gain control circuits for CMOS CCD camera interface; Electronics Letters, IEE stevenage, GB; vol. 35, No. 22; Oct. 28, 1999; pp. 1909-1910.
Communication pursuant to Article 94(3) EPC dated Dec. 22, 2011 in connection with counterpart EP Application No. 10 008 061.3.

* cited by examiner

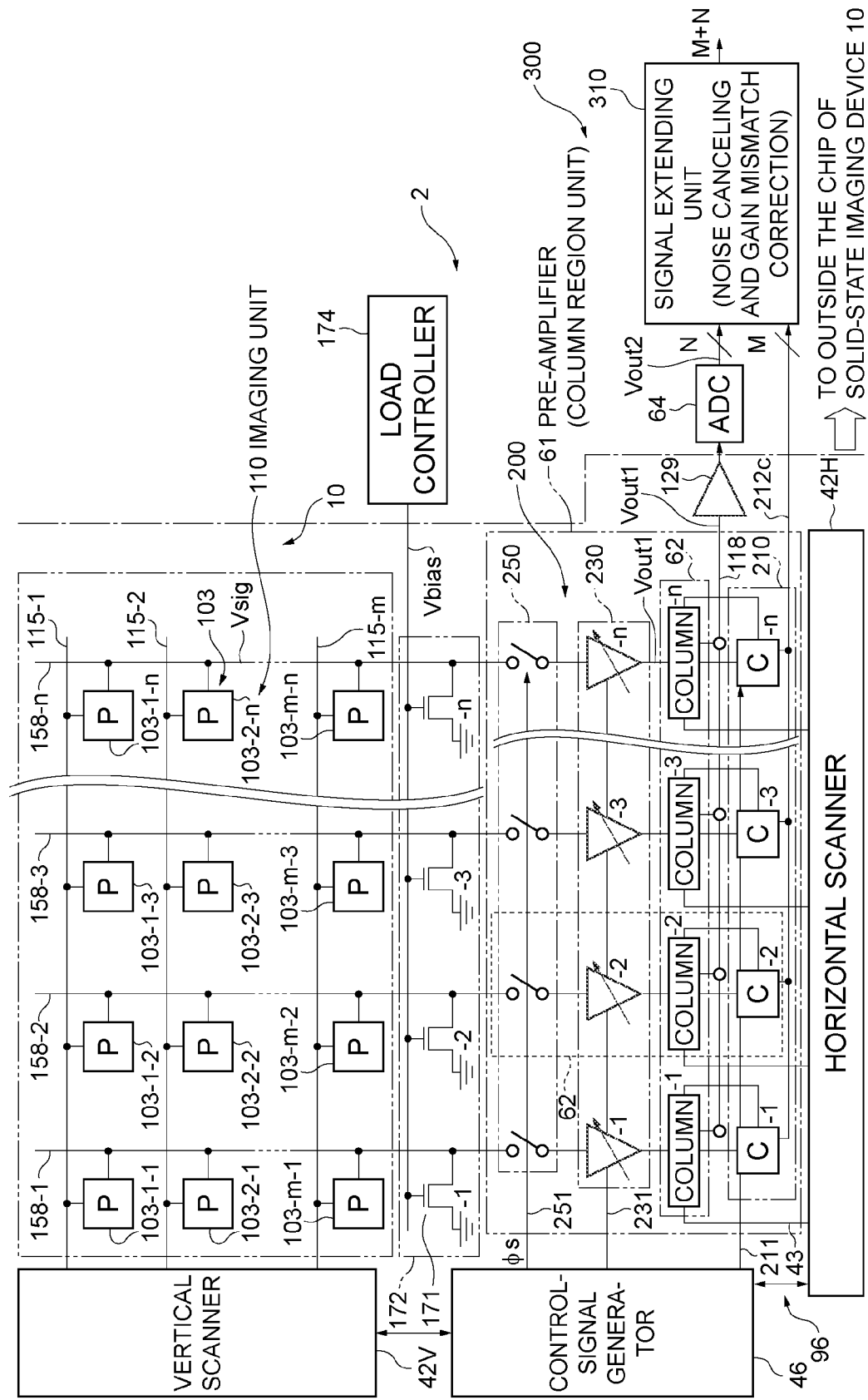

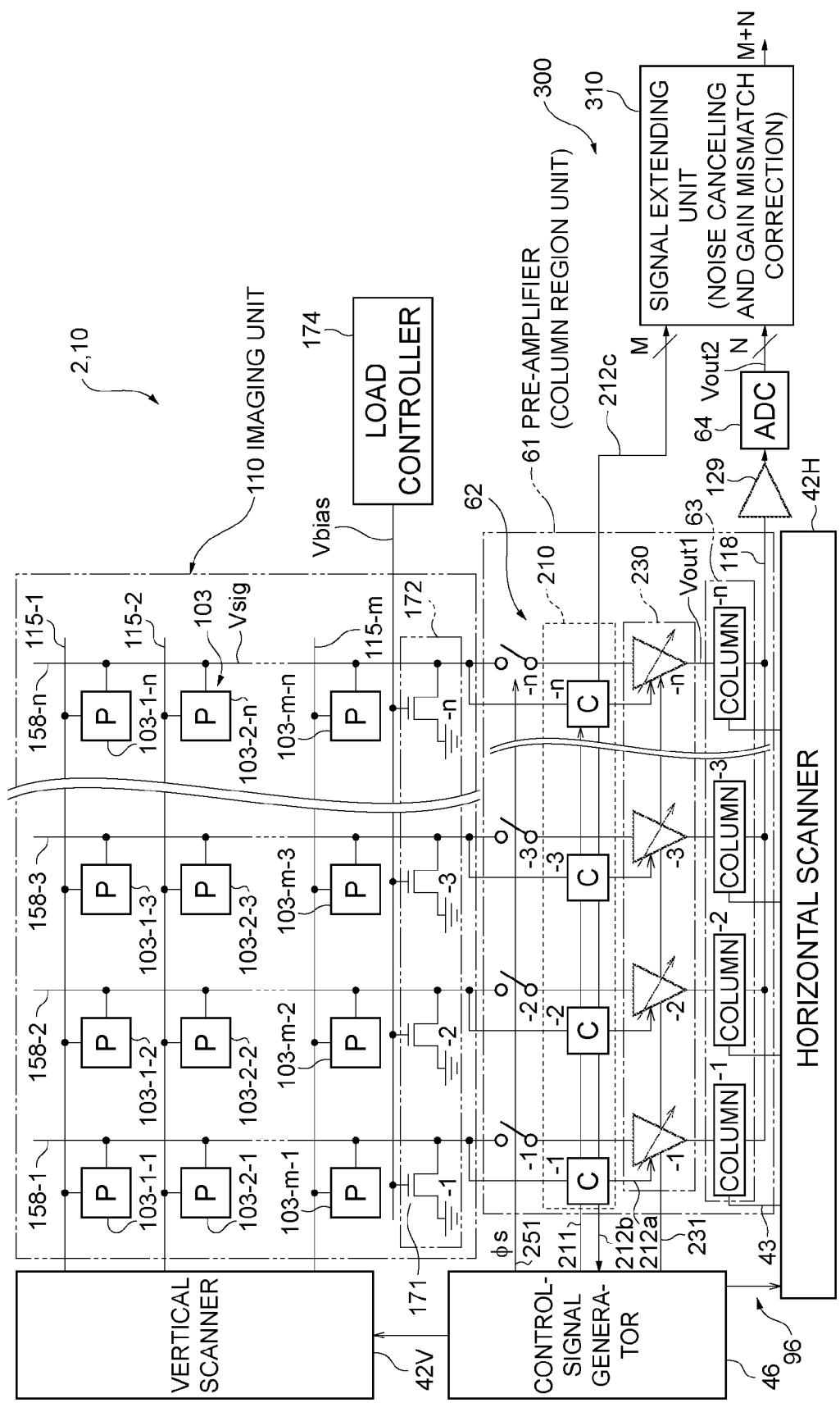

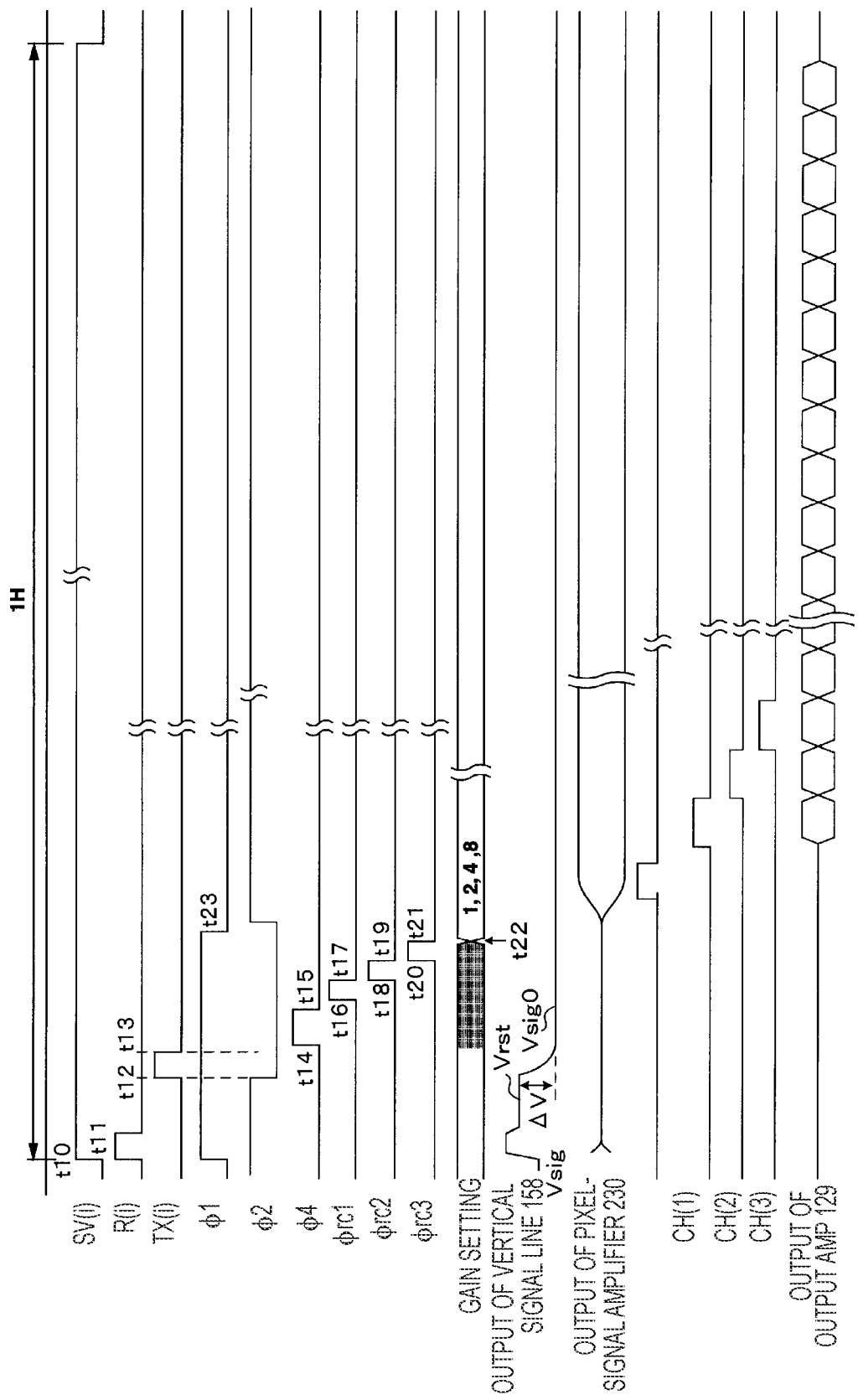

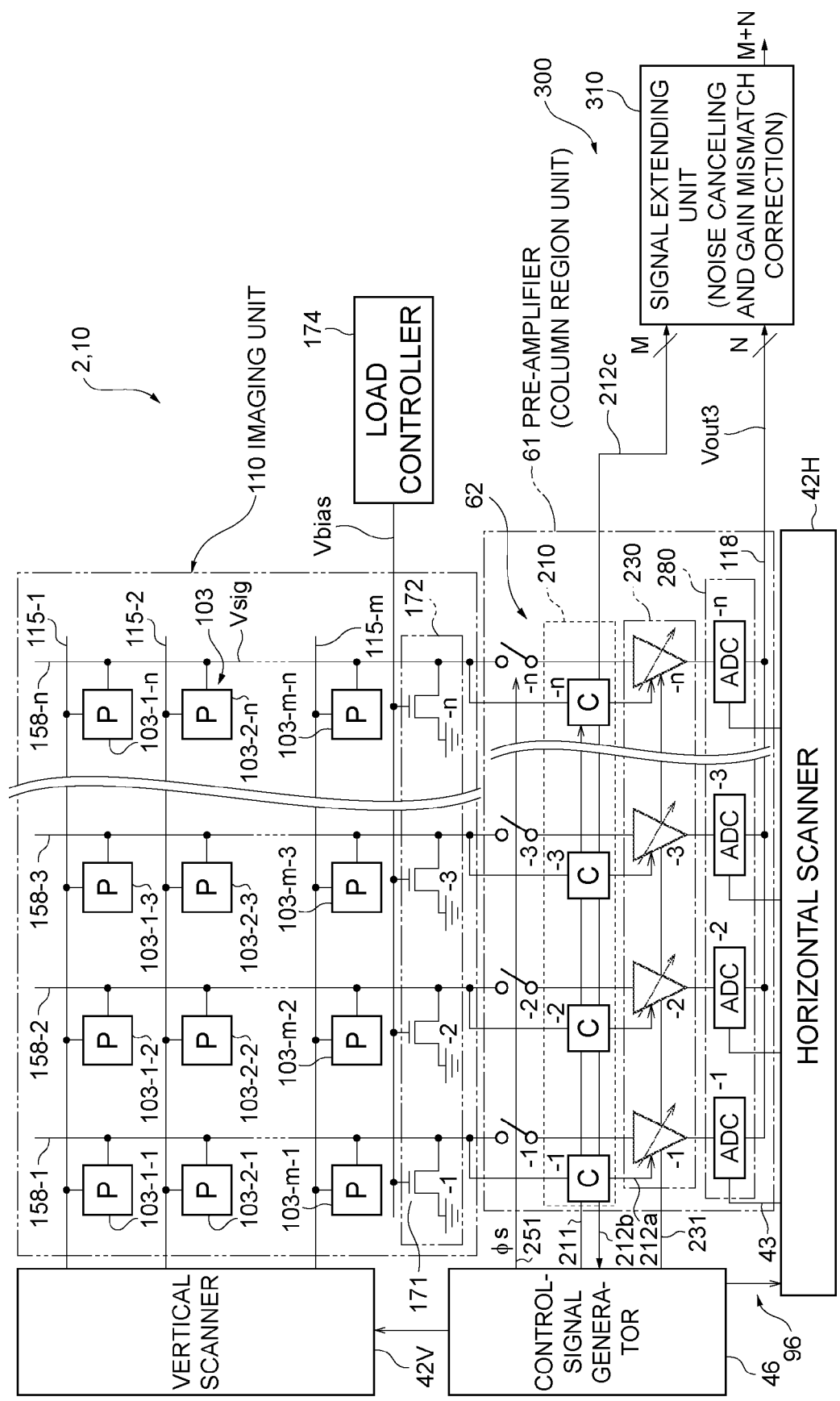

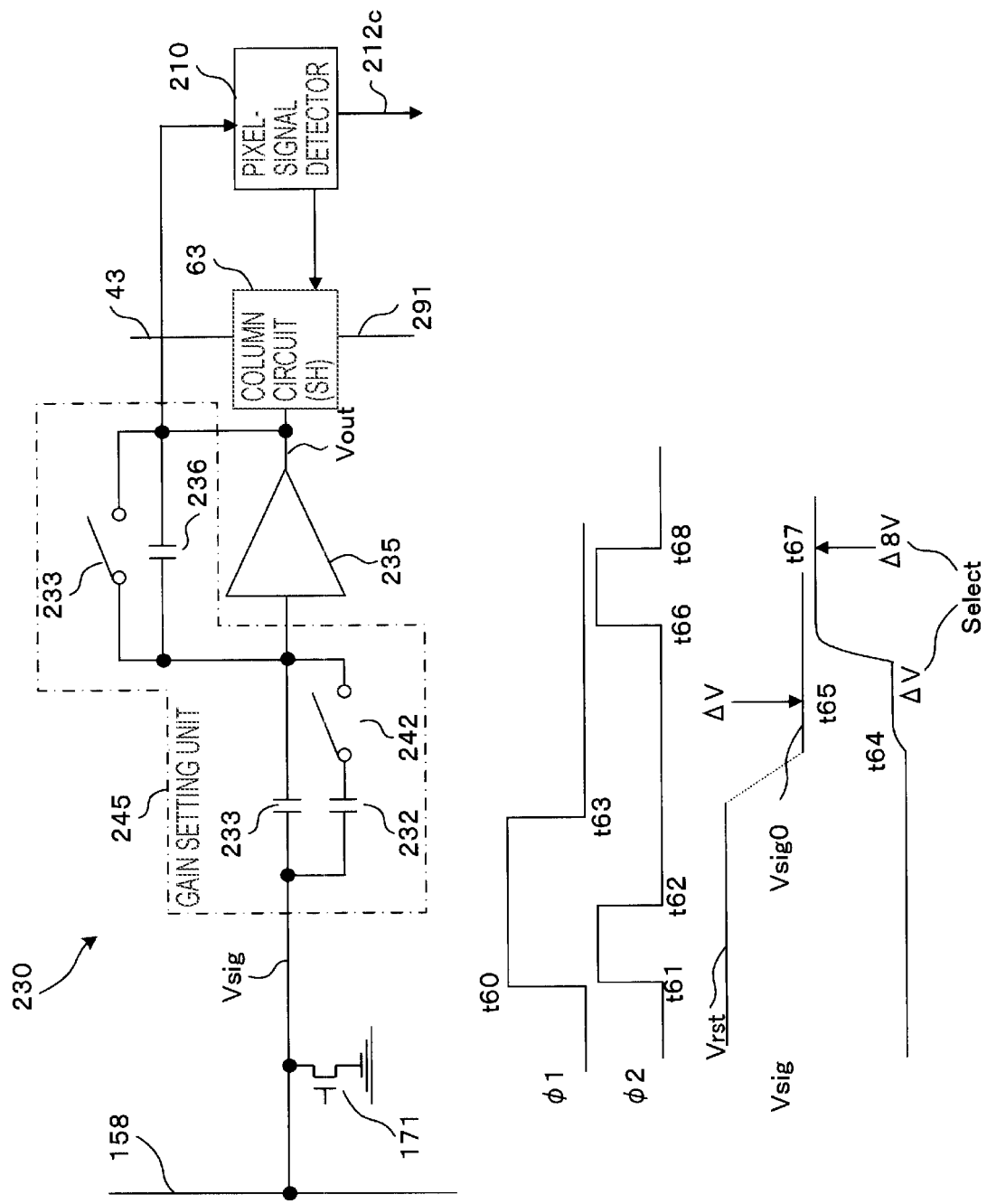

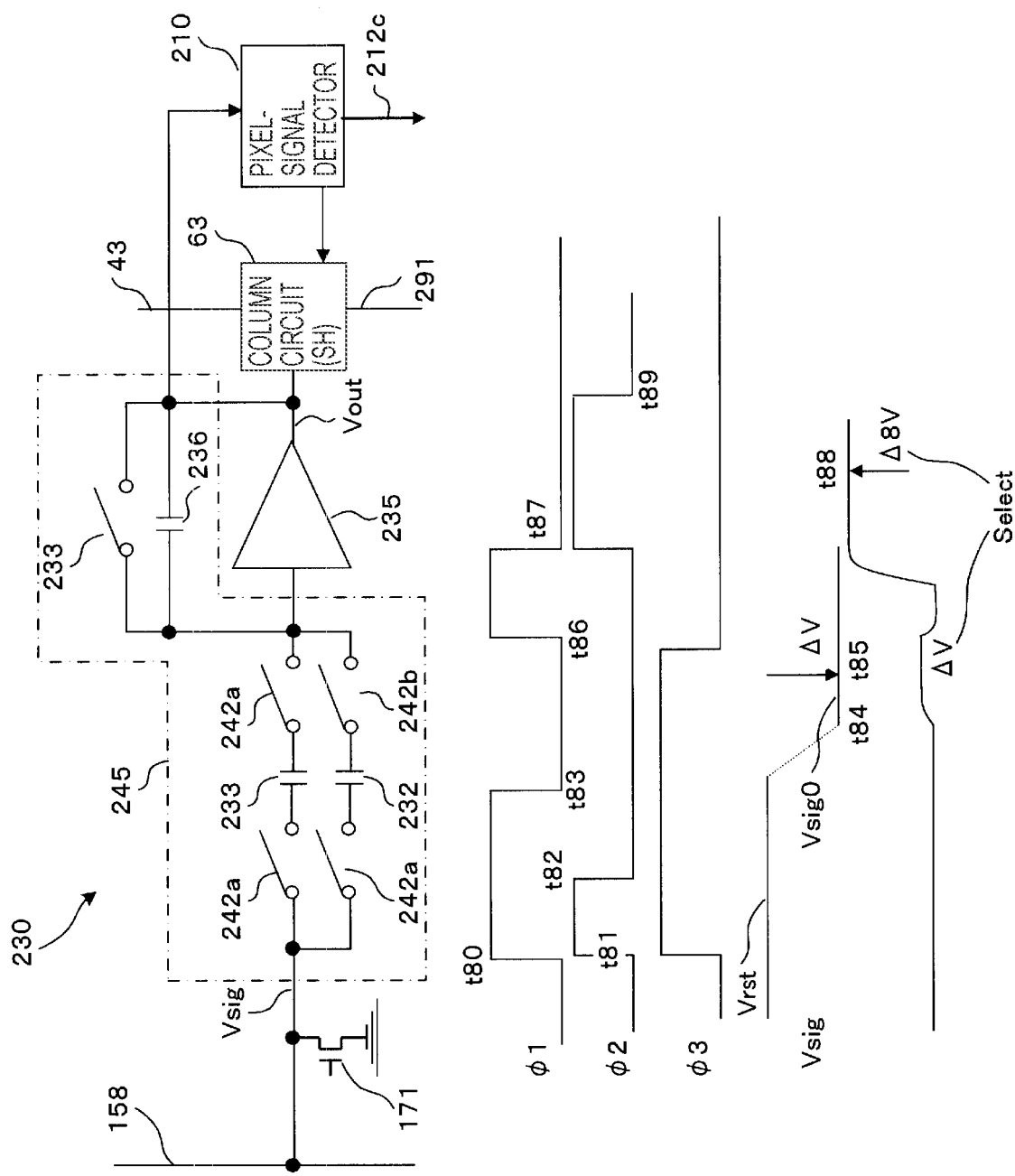

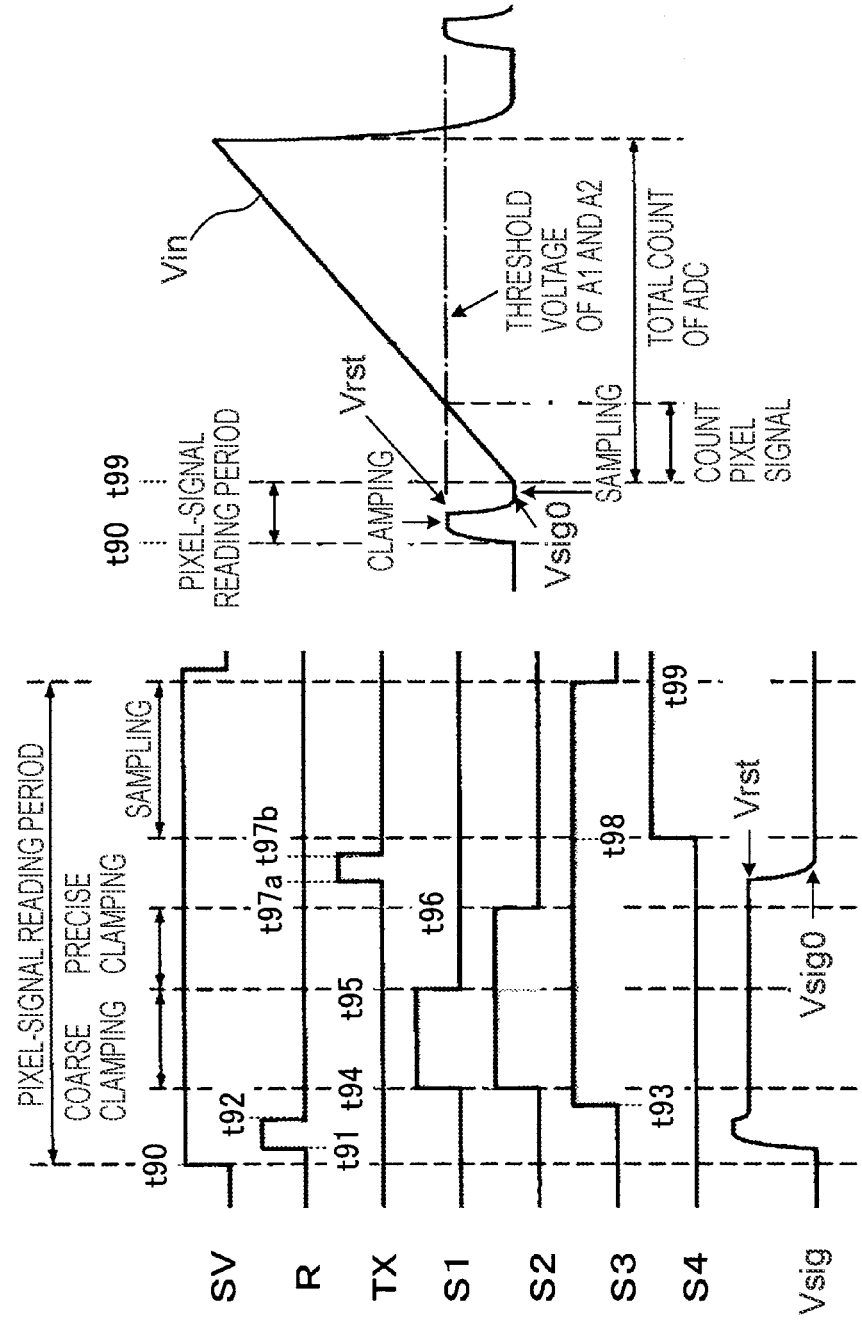

$E_k(i)$ WHEN $E(i) = 8$ (SHIFTED BY THREE BITS)

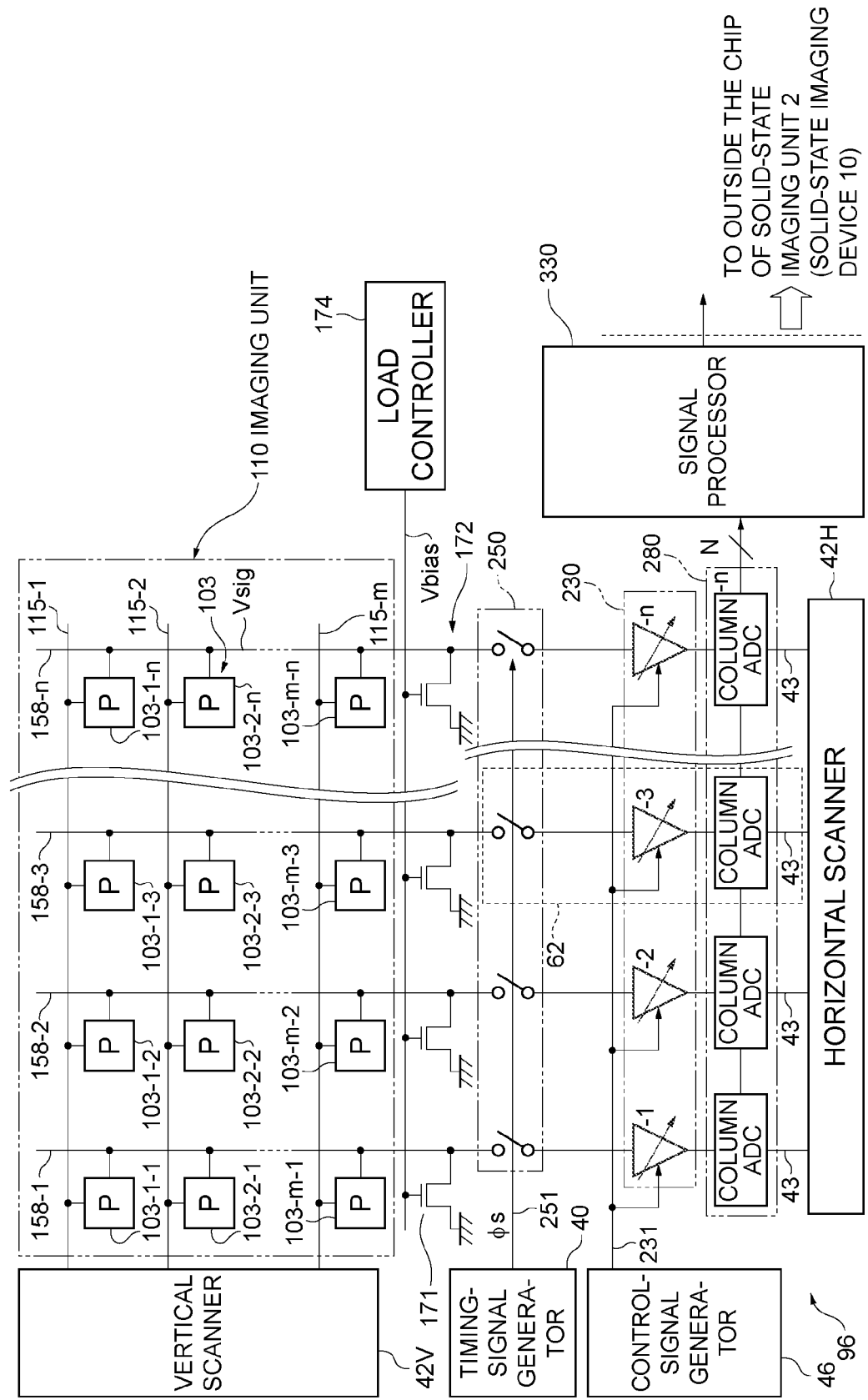

METHOD OF CONTROLLING SEMICONDUCTOR DEVICE, SIGNAL PROCESSING METHOD, SEMICONDUCTOR DEVICE, AND ELECTRONIC APPARATUS

RELATED APPLICATION DATA

This application is a continuation of U.S. patent application Ser. No. 12/903,333, filed Oct. 13, 2010, which is a continuation of U.S. patent application Ser. No. 10/997,511, filed Nov. 24, 2004, the entirety of which is incorporated herein by reference to the extent permitted by law. This application claims the benefit of priority to Japanese Patent Application No. 2003-407966, filed Dec. 5, 2003, the entirely of which is incorporated herein by reference to the extent permitted by law.

BACKGROUND OF THE INVENTION

The present invention relates to a semiconductor device including a plurality of unit elements, an electronic apparatus including the semiconductor device, and a controlling method and a signal processing method relating to the semiconductor device or the electronic apparatus.

More specifically, the present invention relates to a semiconductor device (e.g., a solid-state imaging device) for detecting distribution of a physical quantity by reading electric signals representing the distribution of the physical quantity obtained by a matrix of unit elements (e.g., unit pixels) that are sensitive to electromagnetic waves input from the outside, such as light or radiation, a method of controlling gains for signals in the semiconductor device, and signal processing techniques for output signals amplified by the controlled gains.

Semiconductor devices for detecting distributions of physical quantities, including lines or a matrix of unit elements (e.g., pixels) that are sensitive to electromagnetic waves input from the outside, such as light or radiation, are used in various fields. For example, in the field of video apparatuses, solid-state imaging devices for detecting light as a physical quantity, implemented by charge coupled devices (CCDs) or complementary metal-oxide semiconductor (CMOS) devices, are used. These devices read electric signals representing a distribution of a physical quantity obtained by unit elements (pixels in the case of a solid-state imaging device).

In a type of solid-state imaging device called amplifying solid-state imaging device, pixels implemented by active pixel sensors or gain cells including amplifying transistors in pixel-signal generators for generating pixel signals corresponding to signal charges generated by charge generators are provided. For example, CMOS solid-state imaging devices are often of this type. In an amplifying solid-state imaging device, in order to read image signals to the outside, address control is exercised on a pixel unit including a plurality of unit pixels so that signals from the individual pixels can be selected and read as desired. That is, an amplifying solid-sate imaging device is an example of an address-controlled solid-state imaging device.

For example, in an amplifying solid-state imaging device that is a type of X-Y addressed solid-state imaging device including a matrix of unit pixels, active elements such as MOS transistors are used so that pixels themselves are capable of amplification. That is, signal charges (photoelectrons) accumulated in photodiodes that function as photoelectric converters are amplified by the active elements to read image information.

In the X-Y addressed solid-state imaging device of this type, for example, a pixel unit includes a two-dimensional matrix of a large number of pixel transistors, accumulation of signal charges corresponding to incident light is started individually for each row or each pixel, and current or voltage signals based on the accumulated signal charges are sequentially read from the pixels based on addressing.

When signals are read from the pixel unit and output to the outside of the chip, reading circuits (column processors) are provided individually for the respective columns, signals are read sequentially from the pixels on a row-by-row basis and temporarily stored in the column processors, and pixel signals for one row are sequentially output to the outside of the chip at specific timing. This is called a column-based arrangement.

FIG. 27 shows an example construction of a column-based CMOS image sensor according to a related art, which is an example of X-Y addressed solid-state imaging device.

The CMOS image sensor includes an imaging unit (photoelectric converter region) 110, a timing-signal generator 40, a horizontal scanner 42H, a vertical scanner 42V, a column region unit 920, an output amp 950, a variable-gain amplifier 960, and an analog-to-digital (A/D) converter 970, provided on a semiconductor substrate (not shown).

Vertical signal lines 158 of the imaging unit 110 receive constant bias voltage applied by a load controller 174 via load MOS transistors 171.

In the column region unit 920 on the output side of the imaging unit 110, column processors 930 are provided for the respective columns of pixels. The column processors 930 have capacitors 932 on the vertical signal lines 158. The column processors 930 sequentially store pixel signals Vsig read from the respective pixels, and sequentially read the pixel signals Vsig out to the output amp 950.

In the arrangement described above, processing circuits (i.e., the column circuits 930) are provided individually for the respective columns, which is referred to as a column-based arrangement. That is, pixel signals are processed after reading the pixel signals on a column-by-column basis. Thus, compared with a case where signal processing is carried out in each unit pixel, the construction of each pixel is simplified, so that the number of pixels in an image sensor can be increased, the size of an image sensor can be reduced, or the cost of an image sensor can be reduced.

Next, the operation of the circuit of the column-based arrangement will be described briefly. The imaging unit 110 for receiving optical signals includes a plurality of unit pixels (P) 103 arranged in rows and columns. Each of the unit pixels 103 includes at least one charge generator (photoelectric converter), which is usually implemented by a photodiode or a photogate. Pixel signals output from the imaging unit 110 are read from rows selected by the vertical scanner 42H via vertical-scanning control lines 115.

Although only one vertical-scanning control line for each row of pixels is shown in FIG. 27, usually, a plurality of types of vertical-scanning control lines 115 is provided in parallel from the vertical scanner 42V in order to select each row of pixels and to read pixel signals.

Signals of a row selected via a vertical-scanning control line 115 are sequentially accumulated in the capacitors 932 of the column processors 930 provided in parallel on the output side of the imaging unit 110. The signals are accumulated simultaneously for the entire row.

The pixel signals Vsig accumulated in the capacitors 932 of the column processors 930 are sequentially selected by an operation of scanning columns sequentially from the left according to horizontal-select pulses CH(i) from the horizontal scanner 42H. That is, column-select switches 934, usually implemented by transistors, are sequentially selected and driven by the horizontal scanner 42H. Thus, pixel signals Vsig of the respective unit pixels 103 are sequentially read out to the output amp 950.

The output amp 950 sequentially amplifies the pixel signals Vsig read through a horizontal signal line 118 and outputs the amplified signals as voltage signals. The variable-gain amplifier 960 amplifies the voltages at one of gains having a small step size. The amplified pixel signals are input to the A/D converter 970 and are converted into digital signals.

Usually, the imaging unit 110, the column region unit 920, and the output amp 950 are formed on the same semiconductor chip to form a solid-state imaging device 10, and the variable-gain amplifier 960 and the A/D converter 970 are provided outside the chip, whereby a solid-state imaging unit 2 is formed. Alternatively, the variable-gain amplifier 960 and the A/D converter 970 are also formed on the semiconductor chip together with the imaging unit 110 and the like, in which case the solid-state imaging device 10 substantially coincides with the solid-state imaging unit 2.

In the arrangement described above, various amps are provided in the circuitry, such as amps used I the output amp 950 and the variable-gain amplifier 960. Since these amps are analog amps, thermal noise, which is analog random noise, could occur. The thermal noise could occur randomly with respect to time. An increased bandwidth is needed in the proximity of the output amp 950, and thermal noise that could be generated by amps tends to increase as the bandwidth increases. This is disadvantageous considering the trend of increased number of pixels and increased speed of imaging.

The bit precision of the A/D converter 970 provided in the solid-state imaging device currently available is usually 12 bits or 14 bits. When the bit precision of the A/D converter 970 is increased, power consumption is increased, and noise caused by the circuitry itself prohibits improvement in bit precision.

Thus, in a column-based image sensor according to the related art, it has been difficult to improve bit precision, and to extend dynamic range while maintaining favorable S/N ratio.

When gains of pixels signals are controlled on a pixel-by-pixel basis in the respective pixels of the imaging unit 110, bit precision is improved in the photoelectric converter region, so that the dynamic range of output signals can be extended. In that case, however, the construction of each of the pixels becomes complex, so that the advantages of reduced cost and reduced size due to the column-based arrangement are lost.

As an approach for overcoming these problems, for example, ISSCC 2003 2/11, Digest of Technical Paper, pp. 224-225, and IEEE J. Solid-State Circuits, Vol. 35, No. 7, pp. 932-938, July 2000, M. Schanz, propose techniques for reducing noise by using programmable gain control (PGA) circuits for adaptively amplifying, on a column-by-column basis, pixel signals read from a pixel unit in a CMOS image sensor. According to the techniques, the dynamic range of signals is extended while maintaining favorable S/N ratio so that image quality of the CMOS image sensor is improved, particularly when the luminance is low.

According to the techniques, on a line separate from the PGA circuits, pixel signals output from the imaging unit 110 are compared with predetermined threshold values, gains to be set to the PGA circuits are determined based on the results of comparison, and the PGA circuits are caused to operate with the gains determined, whereby gain control is exercised.

In exercising the gain control, when it is determined that signal levels are low and gains must be increased, the PGA circuits amplify pixel signals obtained by the imaging unit 110 by increased gains, outputting amplified signals to the outside. On the other hand, when it is determined that the signal levels are high and gains need not be increased, pixel signals obtained by the imaging unit 110 are output to the outside without being amplified by the PGA circuits.

The documents, however, only disclose basis techniques for providing PGA circuits for adaptively amplifying pixel signals for the respective columns, and further improvement is needed.

Furthermore, according to the techniques disclosed in the documents, depending on the constructions of the PGA circuits or circuits provided at subsequent stages thereof, in some cases, signal levels amplified by adjusted gains exceed the dynamic range of the circuitry, failing to appropriately extend the dynamic range of signals.

SUMMARY OF THE INVENTION

The present invention has been made in view of the situation described above, and an object thereof is to provide techniques relating to column-based circuits that allow a dynamic range to be extended while maintaining favorable S/N ratio, preferably preventing setting of a gain exceeding the dynamic range.

According to an aspect of the present invention, a method for controlling a semiconductor device including a signal obtaining unit and column processors, the signal obtaining unit including unit elements arranged in rows and columns, the unit elements each including a charge generator for generating signal charges corresponding to incident electromagnetic waves and a signal generator for generating a signal corresponding to the signal charges generated by the charge generator, the column processors being provided for the respective columns to read the signals on a row-by-row basis, to amplify the signals by certain gains, and to sequentially output amplified signals, the column processors respectively including amplifier circuits for amplifying the signals read from the unit elements by gains set to the amplifier circuits, is provided. The method includes a gain-determination controlling step of detecting signal levels of output signals of the amplifier circuits or of subsequent stages thereof with different gains set to the respective amplifier circuits, determining gains to be set to the amplifier circuits based on the signal levels detected, and causing the amplifier circuits to operate with the gains determined.

To "detect output signals of the amplifier circuits or of subsequent stages thereof" is not limited to detecting output signals of the amplifier circuits themselves, and may refer to detecting output signals of various circuits provided at subsequent stages of the amplifier circuits. That is, gains are set to the amplifier circuits and signal levels are detected at predetermined positions on the output side, not the input side, of the amplifier circuits.

According to another aspect of the present invention, a signal processing method for executing predetermined signal processing on signals output from a semiconductor device including a signal obtaining unit and column processors, the signal obtaining unit including unit elements arranged in rows and columns, the unit elements each including a charge generator for generating signal charges corresponding to incident electromagnetic waves and a signal generator for generating a signal corresponding to the signal charges generated by the charge generator, the column processors being provided for the respective columns to read the signals on a row-by-row basis, to amplify the signals by certain gains, and to sequentially output amplified signals, the column processors respectively including amplifier circuits for amplifying the signals read from the unit elements by gains set to the amplifier circuits, is provided. The method includes a gain-determination controlling step of detecting signal levels of output signals of the amplifier circuits or of subsequent stages thereof with different gains set to the respective amplifier circuits, determining gains to be set to the amplifier circuits based on the signal levels detected, and causing the amplifier circuits to operate with the gains determined; and a gain correcting step of correcting output signals output from the column processors after the gain-determination controlling step, based on the gains set to the respective amplifier circuits.

According to another aspect of the present invention, a semiconductor device is provided. The semiconductor device includes a signal obtaining unit including unit elements arranged in rows and columns, the unit elements each including a charge generator for generating signal charges corresponding to incident electromagnetic waves and a signal generator for generating a signal corresponding to the signal charges generated by the charge generator; column processors provided for the respective columns to read the signals on a row-by-row basis, to amplify the signals by certain gains, and to sequentially output amplified signals, the column processors respectively including amplifier circuits for amplifying the signals read from the unit elements by gains set to the amplifier circuits; and a gain-determination controller for detecting signal levels of output signals of the amplifier circuits or of subsequent stages thereof with different gains set to the respective amplifier circuits, determining gains to be set to the amplifier circuits based on the signal levels detected, and causing the amplifier circuits to operate with the gains determined.

According to another aspect of the present invention, an electronic apparatus for executing predetermined signal processing on signals output from a semiconductor device including a signal obtaining unit and column processors, the signal obtaining unit including unit elements arranged in rows and columns, the unit elements each including a charge generator for generating signal charges corresponding to incident electromagnetic waves and a signal generator for generating a signal corresponding to the signal charges generated by the charge generator, the column processors being provided for the respective columns to read the signals on a row-by-row basis, to amplify the signals by certain gains, and to sequentially output amplified signals, the column processors respectively including amplifier circuits for amplifying the signals read from the unit elements by gains set to the amplifier circuits, is provided. The electronic apparatus includes a gain-determination controller for detecting signal levels of output signals of the amplifier circuits or of subsequent stages thereof with different gains set to the respective amplifier circuits, determining gains to be set to the amplifier circuits based on the signal levels detected, and causing the amplifier circuits to operate with the gains determined; and a signal extending unit for executing gain correction on output signals from the column processors, based on the gains set to the respective amplifier circuits, thereby extending a dynamic range of signals of one screen of the signal obtaining unit.

According to another aspect of the present invention, a method of controlling a semiconductor device including a signal obtaining unit and column processors, the signal obtaining unit including unit elements arranged in rows and columns, the unit elements each including a charge generator for generating signal charges corresponding to incident electromagnetic waves and a signal generator for generating a signal corresponding to the signal charges generated by the charge generator, the column processors being provided for the respective columns to read the signals on a row-by-row basis, to amplify the signals by certain gains, and to sequentially output amplified signals, the column processors respectively including amplifier circuits for amplifying the signals read from the unit elements by gains set to the amplifier circuits, is provided. The method includes a gain-determination controlling step of detecting signal levels of signals output from the signal obtaining unit, determining gains to be set to the amplifier circuits based on results of the detection, and causing the amplifier circuits to operate with the gains determined; and a gain correcting step of outputting results of comparison or classification signals for classifying signal levels in accordance with results of comparison to the outside of the column processors, in association with signals output from the amplifier circuits, the association being made on the basis of the individual unit elements, and correcting output signals output from the column processors based on the gains set to the respective amplifier circuits, with reference to the results of comparison or the classification signals.

According to another aspect of the present invention, a method of controlling a semiconductor device including a signal obtaining unit and column processors, the signal obtaining unit including unit elements arranged in rows and columns, the unit elements each including a charge generator for generating signal charges corresponding to incident electromagnetic waves and a signal generator for generating a signal corresponding to the signal charges generated by the charge generator, the column processors being provided for the respective columns to read the signals on a row-by-row basis, to amplify the signals by certain gains, and to sequentially output amplified signals, the column processors respectively including amplifier circuits for amplifying the signals read from the unit elements by gains set to the amplifier circuits, is provided. The method includes a gain-determination controlling step of detecting levels of signals output from the signal obtaining unit, determining gains to be set to the amplifier circuits based on results of the detection, and causing the amplifier circuits to operate with the gains determined; and a step of converting analog signals output from the amplifier circuits into digital values.

According to another aspect of the present invention, a method of controlling a semiconductor device including a signal obtaining unit and column processors, the signal obtaining unit including unit elements arranged in rows and columns, the unit elements each including a charge generator for generating signal charges corresponding to incident electromagnetic waves and a signal generator for generating a signal corresponding to the signal charges generated by the charge generator, the column processors being provided for the respective columns to read the signals on a row-by-row basis, to amplify the signals by certain gains, and to sequentially output amplified signals, the column processors respectively including amplifier circuits for amplifying the signals read from the unit elements by gains set to the amplifier circuits, is provided. The method includes a gain-determination controlling step of detecting levels of signals output from the signal obtaining unit, determining gains to be set to the amplifier circuits based on results of the detection, and causing the amplifier circuits to operate with the gains determined; and a step of suppressing occurrence of variation in output direct-current level among the amplifier circuits due to different gains being set to the respective amplifier circuits.

According to another aspect of the present invention, an imaging device is provided. The imaging device includes an imaging region including a plurality of pixels each including a charge generator for generating signal charges; an amplifier-circuit region for amplifying signals output from the pixels and outputting amplified signals, the amplifier-circuit region being provided beside the imaging region; and an output portion provided at a subsequent stage of the amplifier-circuit region. The amplifier-circuit region comprises a plurality of amplifiers to which gains are set based on levels of signals output from the output portion.

BRIEF DESCRIPTION OF THE DRAWINGS

FIGS. 2A and 2B are schematic diagrams showing a solid-state imaging unit composed mainly of a CMOS imaging device, and peripheral parts thereof, according to a first embodiment of the present invention;

FIG. 3 is a schematic diagram showing a solid-state imaging unit composed mainly of a CMOS imaging device, and peripheral parts thereof, according to a second embodiment of the present invention;

FIG. 4 is a timing chart showing operation timing in a horizontal period of the solid-state imaging unit according to the second embodiment shown in FIG. 3;

FIG. 10 is a schematic diagram showing a solid-state imaging unit composed mainly of a CMOS imaging device, and peripheral parts thereof, according to a fourth embodiment of the present invention;

FIGS. 11A and 11B are diagrams showing a first example of the construction and operation of a pixel-signal amplifier and peripheral parts in the first and third embodiments;

FIGS. 13A and 13B are diagrams showing a second example of the construction and operation of a pixel-signal amplifier and peripheral parts in the first and third embodiments;

FIGS. 20A to 20C are diagrams showing an example circuit construction of a column ADC circuit and peripheral parts provided at a subsequent stage of a pixel-signal amplifier in a column region unit;

FIG. 22 is a schematic diagram showing a solid-state imaging unit composed mainly of a CMOS imaging device, and peripheral parts thereof, according to a fifth embodiment of the present invention;

DESCRIPTION OF THE PREFERRED EMBODIMENTS

Now, embodiments of the present invention will be described with reference to the drawings. The following description will be made in the context of a CMOS imaging device, which is an example of X-Y addressed solid-state imaging device. Furthermore, it is assumed herein that all the pixels are implemented using NMOS transistors. This, however, is only an example, and device types are not limited to MOS imaging devices. The embodiments described below are applicable to any semiconductor device for detecting distribution of physical quantity, that includes a matrix of elements that are sensitive to electromagnetic waves input from outside, such as light or radiation.

Overall Construction of Digital Still Camera

Construction of Digital Still Camera

Now, embodiments of the present invention will be described in detail with reference to the drawings.

Figure 1:
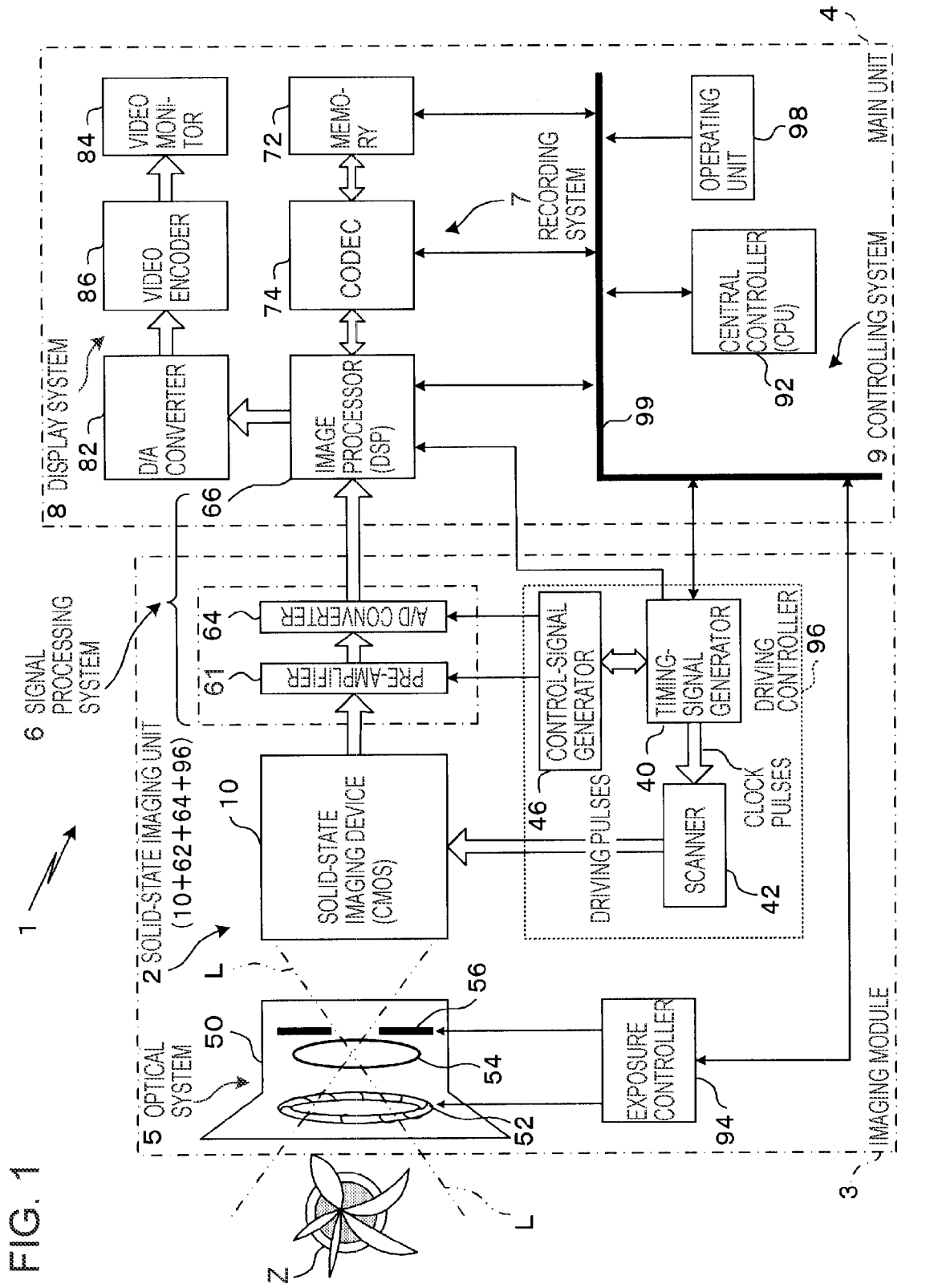
FIG. 1 is a schematic diagram showing the construction of a camera system, which is an electronic apparatus according to an embodiment of the present invention, the camera system including a semiconductor device according to an embodiment of the present invention.

FIG. 1 is a schematic diagram showing the construction of a camera system, which is an electronic apparatus according to an embodiment of the present invention, including a semiconductor device according to an embodiment of the present invention. In the camera system shown in FIG. 1, a solid-state imaging unit 2 according to an embodiment of the present invention is used. A solid-state imaging device 10 and peripheral circuits connected at a subsequent stage of the solid-state imaging device 10 are contained in a case. Thus, a digital still camera 1 that is capable of capturing color images is implemented. The digital still camera 1 including the solid-state imaging unit 2 is an example of electronic apparatus including an imaging device.

As shown in FIG. 1, the digital still camera 1 includes an imaging module 3 and a main unit 4. The imaging module 3 includes a solid-state imaging device 10 mainly composed of a CMOS imaging unit, an imaging lens 50, and a driving controller 96 for driving the solid-state imaging device 10.

The main unit 4 generates video signals based on imaging signals obtained by the imaging module 3, outputs the video signals to a monitor, or stores images on a storage medium.

The processing systems of the digital still camera 1 generally include an optical system 5, a signal processing system 6, a recording system 7, a display system 8, and a controlling system 9. It is to be understood that in an actual finished product, the imaging module 3 and the main unit 4 are contained in an exterior case that is not shown.

The driving controller 96 includes a timing-signal generator 40, a scanner 42, and a control-signal generator 46. The timing-signal generator 42 generates various pulse signals for driving the solid-state imaging device 10. The scanner 42 converts the pulse signals received from the timing-signal generator 40 into driving pulses for driving the solid-state imaging device 10. The control-signal generator 46 generates control signals for retrieving output signals from the solid-state imaging device 10. The timing-signal generator 40 and the control-signal generator 46 will be collectively referred to as a timing controller.

The optical system 5 includes the imaging lens 50 and the solid-state imaging device 10. The imaging lens 50 includes a shutter 52, a lens 54 for focusing an optical image of an object Z, and a diaphragm 56 for adjusting the amount of light of the optical image. The solid-state imaging device 10 converts the focused optical image into electric signals. Light L coming from the object Z transmits through the shutter 52 and the lens 54, is adjusted by the aperture 56, and enters the solid-state imaging device 10 with an appropriate brightness. At this time, the lens 54 adjusts the focal point so that an image composed of the light L coming from the object Z is formed on the solid-state imaging device 10.

The signal processing system 6 includes a pre-amplifier 61 corresponding to a column region unit described later, an analog-to-digital (A/D) converter 64, and an image processor 66. The pre-amplifier 61 is capable of amplifying analog imaging signals received from the imaging unit of the solid-state imaging device 10, and performing correlated double sampling (CDS) of the amplified imaging signals to suppress noise. The A/D converter 64 converts analog signals output from the pre-amplifier 61 into digital signals. The image processor 66 is implemented by a digital signal processor (DSP) that performs specific image processing on digital signals input from the A/D converter 64.

The recording system 7 includes a memory (recording medium) 72 for storing image signals, such as a flash memory, and a codec (compression/decompression) 74 for coding image signals processed by the image processor 66 and recording the coded image signals on the memory 72 or reading and decoding image signals recorded on the memory 72 and supplying the decoded image signals to the image processor 66.

The display system 8 includes a digital-to-analog (D/A) converter 82, a video monitor 84, and a video encoder 86. The D/A converter 82 converts image signals processed by the image processor 66 into analog signals. The video monitor 84 functions as a finder by displaying an image corresponding to input video signals, and is implemented, for example, by a liquid crystal display (LCD). The video encoder 86 encodes analog image signals into video signals in a format suitable for the video monitor 84 provided at a subsequent stage.

The controller 9 includes a central controller 92, e.g., a central processing unit (CPU). The central controller 92 controls a drive (not shown) to read a control program stored in a magnetic disk, an optical disk, a magneto-optical disk, or a semiconductor memory, and controls the entire digital still camera 1 according to the control program and based on commands entered by a user.

The control system 9 also includes an exposure controller 94, a driving controller 96, and an operation unit 98. The exposure controller 94 controls the shutter 52 and the diaphragm 56 so that the brightness of an image transferred to the image processor 66 will be appropriate. The driving controller 96 includes the timing-signal generator (TG) 40 for controlling operation timings of the functional units from the solid-state imaging device 10 to the image processor 66. The operation unit 98 allows a user to instruct shutter timing or to enter commands. The central controller 92 controls the image processor 66, the codec 74, the memory 72, the exposure controller 94, and the timing-signal generator 40, connected to a bus 99 of the digital still camera 1.

In the digital still camera 1, processing such as flicker correction, γ correction, shading correction, and color balancing is carried out in the digital domain, mainly by the image processor 66. The digital still camera 1 includes automatic controllers for auto focus (AF), auto white balance (AWB), auto exposure (AE), and the like. The automatic controllers exercises control based on signals output from the solid-state imaging unit 2. For example, the exposure controller 94 controls the diaphragm 56 according to a control parameter set by the central controller 92 so that the brightness of an image transferred to the image processor 66 will be appropriate.

The timing-signal generator 40 is controlled by the central controller 92. The timing-signal generator 40 generates timing pulses needed for operations of the solid-state imaging device 10, the pre-amplifier 61, the A/D converter 64, and the image processor 66, and supplies the timing pulses to these parts. The operation unit 98 is used when a user operates the digital still camera 1.

The solid-state imaging unit 2 is formed by the solid-state imaging device 10, the pre-amplifier 61, the A/D converter 64, and the driving controller 96 in the imaging module 3. Preferably, the solid-state imaging unit 2 is implemented by providing the solid-state imaging device 10, the pre-amplifier 61, the A/D converter 64, and the driving controller 96 on a single circuit board, or by forming these parts on a single semiconductor substrate. This, however, is only an example, and various modifications are possible. For example, the pre-amplifier 61, the A/D converter 64, and the driving controller 96, either partially or entirely, may be provided on a circuit board, which may be a semiconductor chip, that is separate from a semiconductor chip including the solid-state imaging device 10.

In the example shown in FIG. 1, the pre-amplifier 61 and the A/D converter 64 of the signal processing system 6 are included in the imaging module 3. However, without limitation to the example, the pre-amplifier 61 and the A/D converter 64 may be provided in the main unit 4. Furthermore, the D/A converter 82 may be provided in the image processor 66.

Furthermore, although the timing-signal generator 40 is included in the imaging module 3 in the example, alternatively, the timing-signal generator 40 may be provided in the main unit 4. Furthermore, although the timing-signal generator 40, the scanner 42, and the control-signal generator 46 are separately provided in the example, without limitation to the example, these parts may be provided integrally. This allows the digital still camera 1 to be more compact.

Furthermore, although the timing-signal generator 40, the scanner 42, and the control-signal generator 46 may be implemented respectively by discrete components, preferably, these parts are implemented by an integrated circuit (IC) formed on a single semiconductor substrate. More preferably, these parts are formed on a single semiconductor substrate together with the solid-state imaging device 10. This type of construction is very easy in the case of a CMOS imaging device. This allows the solid-state imaging unit 2 to be compact, facilitates handing of parts, and serves to reduce cost. Furthermore, manufacturing of the digital still camera 1 is facilitated.

Furthermore, handling and management of parts are facilitated when the timing-signal generator 40, the scanner 42, and the control-signal generator 46, which have strong connection with the solid-state imaging device 10 used, are integrated by mounting these parts and the solid-state imaging device 10 on a common substrate or providing these parts in the imaging module 3. In that case, since the parts are integrated as a module, manufacturing of the digital still camera 1 or a finished product of the digital still camera 1 is facilitated. The imaging module 3 may be composed of the solid-state imaging device 10 and the optical system 5 without including the driving controller 96.

Without limitation to the constructions described above, the timing-signal generator 40 may be provided separately from an imaging unit 110 so that the solid-state imaging unit 2 is formed by an imaging device including the imaging unit 110 and peripheral circuits such as the scanner 42, and the externally provided timing-signal generator 40. That is, the timing-signal generator 40 may be provided as a separate semiconductor integrated circuit independently of other functional units such as the imaging unit 110 and a horizontal scanner 42H. In that case, the solid-state imaging unit 2 is formed by the timing-signal generator 40 and an imaging device including the imaging unit 110 and the horizontal scanner 42H. The solid-state imaging unit 2 may be provided in the form of an imaging module including peripheral circuits such as a signal processing circuit and a power supply circuit.

Solid-State Imaging Device and Peripheral Parts

First and Second Embodiments

FIGS. 2A and 3 are schematic diagrams showing the solid-state imaging unit 2 mainly composed of the CMOS solid-state imaging device 10, and peripheral parts thereof, according to first and second embodiments of the present invention. In the embodiments shown in FIGS. 2A and 3, the solid-state imaging device 10 is composed mainly of the imaging unit 110 and the pre-amplifier 61, and the A/D converter 64 is provided externally to the solid-state imaging device 10.

The solid-state imaging device 10 is implemented by forming the imaging unit 110 and the pre-amplifier 61 on a common semiconductor substrate. Furthermore, the A/D converter 64 and a signal extending unit 310 may be formed on the same chip, in regions where column regions of the solid-state imaging device 10 are not formed. In that case, the solid-state imaging unit 2 is substantially coincides with the solid-state imaging device 10.

The solid-state imaging unit 2 includes an imaging unit (a photoelectric converter region) including a two-dimensional matrix of rows and columns of pixels. The pixels include photosensor elements that output signals corresponding to amounts of incident light. In the solid-state imaging unit 2, capacitors are provided for the respective columns of pixels, in column regions provided on the output side of the imaging signals read from the respective pixels are sequentially stored in the capacitors, and the signals are sequentially read out to an output amp. This arrangement will be referred to as a column-based arrangement.

According to the column-based arrangement, pixel signals are read and processed pixel on a column-by-column basis. Thus, compared with an arrangement in which pixel signals are processed in the respective unit pixels, the construction of each of the unit pixels is simplified. Therefore, it is possible to increase the number of pixels, to reduce size, and to reduce cost of an image sensor. The column-based arrangement will be described more specifically below.

Figure 2B:
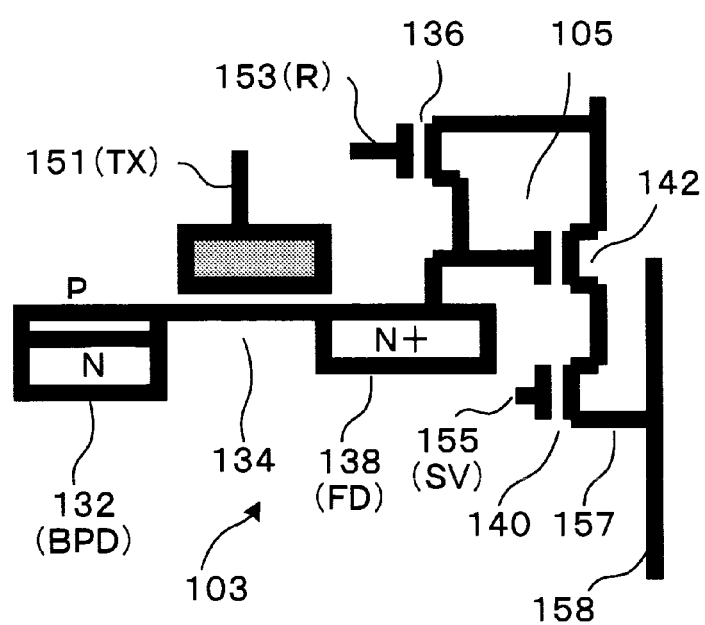

As shown in FIGS. 2A and 3, the solid-state imaging unit 2 includes an imaging unit 110 including a two-dimensional array of m rows and n columns of unit pixels (P) 103 shown in FIG. 2B, a driving controller 96 provided in proximity to the imaging unit 110, a pre-amplifier 61 including column circuit 63, and an output amp 129. The output amp 129 functions as an output portion that outputs pixel signals of substantially all the pixels (all the substantially effective pixels) of the imaging unit 110 as a single line of imaging signals S0.

As shown in FIG. 2B, each of the unit pixels 103 includes a floating diffusion (FD) region 138 having a stray capacitance. The floating diffusion region 138 functions as a charge accumulator that accumulates signal charges generated by a charge generator 132 implemented, for example, by a buried photodiode. Furthermore, the unit pixel 103 includes four transistors. This will hereinafter be referred to as a 4TR arrangement. The use of a buried photodiode in the unit pixel 103 serves to reduce dark current.

The four transistors TR include a read-select transistor 134, a reset transistor 136, a vertical-select transistor 140, and an amplifying transistor 142. Thus, the unit pixel 103 includes a pixel-signal generator 105 including the floating diffusion region 138. The unit pixel 103 will be described later in detail with reference to FIG. 14.

Although some rows and columns are omitted in FIG. 2A for simplicity, actually, several tens to several thousands of unit pixels 103 (103-1-1, . . . 103-1-n, 103-2-1, . . . 103-m-n) are provided on the rows and columns.

The driving controller 96 includes, for example, a horizontal scanner 42H, a vertical scanner 42V, and a control-signal generator 46. Although not shown, the horizontal scanner 42H includes a horizontal decoder for determining a column that is to be read, i.e., for individually selecting each of the column circuits 63 in the pre-amplifier 61. The horizontal scanner 42H also includes a horizontal driving circuit (i.e., a column-selecting shift register) for leading a signal of a selected column circuit 63 to a horizontal signal line 118 according to a read column address determined by the horizontal decoder.

Although not shown, the vertical scanner 42V includes a vertical decoder for determining a row that is to be read, i.e., for selecting a row of the imaging unit 110. The vertical scanner 42V also includes a vertical driving circuit (i.e., a row-selecting shift register) for supplying pulses to control lines to drive unit pixels 103 according to a read row address determined by the vertical decoder. The vertical driving circuit includes a transfer driving buffer 150, a reset driving buffer 152, and a select driving buffer 154, which will be described later with reference to FIG. 14.

Furthermore, the driving controller 96 includes the timing-signal generator 40 (shown in FIG. 1, not shown in FIG. 2A) for generating various pulse signals at specific timing and supplying the pulse signals to the horizontal scanner 42H, the vertical scanner 42V, and the column circuits 63. For example, the timing-signal generator 40 outputs a horizontal address signal to the horizontal decoder and a vertical address signal to a vertical decoder, and the decoders select corresponding row and column, respectively.

Preferably, the components of the driving controller 96 are formed integrally with the imaging unit 110 in a semiconductor region composed of single-crystal silicon or the like, using techniques used for manufacturing semiconductor integrated circuits, whereby a solid-state imaging device, which is an example of a semiconductor device, is formed. The unit pixels 103 of the imaging unit 110 are connected to a ground (GND) that serves as a master reference voltage defining a reference voltage for the entire device.

On signal paths between the unit pixels 103 and the respective column circuits 63, a load transistor unit 172 including load MOS transistors 171 (171-1, 171-2, . . . 171-$n$) whose drains are connected to vertical signal lines 158 (158-1, 158-2, . . . 158-$n$) is provided. Also, a load controller (load MOS controller) 174 for controlling driving of the load MOS transistors 171 is provided. The load controller 174 supplies bias voltages to the gates of the respective load MOS transistors 171 so that the load MOS transistors 171 are driven and controlled by the load controller 174.

For example, the unit pixels 103 are connected to the vertical scanner 42V via vertical-scanning control lines 115 (115-1, 115-2, . . . 115-$m$) for selecting rows, and are connected to the respective column circuits 63 via the vertical signal lines 158.

The vertical-scanning control lines 115 generally refer to lines extending from the vertical scanner 42V to the unit pixels 103. For example, with regard to the unit pixel 103 shown in FIG. 2B, the vertical-scanning control lines 115 include a transfer gate line (TX) 151 and a reset line (R) 153, and a vertical-select line (SV) 155 when the vertical-select line (SV) 155 extends from the vertical scanner 42V. The horizontal scanner 42H and the vertical scanner 42V include decoders, and start shift operations (i.e., scanning) in response to driving pulses supplied from the timing-signal generator 40. Thus, the vertical-scanning control lines 115 include lines for transferring various pulse signals for driving the unit pixels 103, such as a reset pulse R, a transfer control pulse TX, and a DRN control pulse SV.

The amplifying transistors 142 are connected to the vertical signal lines 158 via the vertical-select transistors 140. The vertical signal lines 158 are connected to the drains of the load MOS transistors 171 on a column-by-column basis. The gates of the load MOS transistors 171 commonly receive a load control signal CTld from the load controller 174, and when signals are read, a predetermined constant current is caused to flow by the load MOS transistors 171 connected to the amplifying transistors 142 via the vertical-select transistors 140.

Pixel signals obtained by the imaging unit 110 are transferred to the column circuits 63 (63-1, 63-2, . . . 63-$n$) of the pre-amplifier 61 via the vertical signal lines 158. Voltage signals processed by the column circuits 63 are transferred to the horizontal signal line 118 via horizontal-select transistors (not shown) selected according to horizontal-select signals from the horizontal scanner 42H, are then input to the output amp 129, and are then supplied to an external circuit 300 as imaging signals S0.

That is, in the column-based solid-state imaging unit 2, voltage signals output from the unit pixels 103 are transferred in order of the vertical signal lines 158, the column circuits 63, the horizontal signal line 118, and the output amp 129. More specifically, output pixel signals for one row are transferred in parallel to the column circuits 63 via the vertical signal lines 158, and signals obtained by CDS processing are output in serial via the horizontal signal line 118. The vertical-scanning control lines 115 serve to select rows.

As long as it is possible to individually drive each column and each row, physical wiring of driving clock lines for applying pulse signals, i.e., whether lines for transferring pulse signals are arranged along the rows or columns of the unit pixels, may be arbitrarily chosen.

The pre-amplifier 61 includes column processors 62 provided for the respective vertical signal lines 158 (i.e., columns). Each of the column processors 62 includes a pixel-signal detector 210, a pixel-signal amplifier 230, a switch 250, and a column circuit 63. The column circuits 63 are an example of a pixel-signal obtaining unit that sequentially accumulates pixel signals of the unit pixels 103 read via the vertical signal lines 158 and that reads the pixel signals at specific timing. Each of the column circuits 63 includes, for example, a sample and hold (S/H) circuit as a fundamental component. The operations of the column circuits 63 are controlled according to control signals input from the horizontal scanner 42H via control lines 43.

As will be described later in detail, the column circuits 63, depending on combination with the pixel-signal amplifiers 230 provided at a previous stage of thereof, preferably have a function of suppressing noise included in imaging signals output from the pixel-signal amplifiers 230. For example, the column circuits 63 are implemented by a known arrangement for correlated double sampling (CDS). That is, the column circuits 63 preferably have a function of a noise suppressor.

Furthermore, as will be described later in detail, the column circuits 63, depending on combination with the pixel-signal amplifiers 230, preferably have a function of suppressing variation in direct-current (DC) components of imaging signals output from the pixel-signal amplifiers 230. That is, the column circuits 63 preferably have a function of an output-DC-level suppressor according to the present invention.

The pre-amplifier 61, in addition to the column circuits 63, includes a pixel-signal controller 200. The pixel-signal controller 200 includes pixel-signal detectors (C) 210 (210-1, 210-2, . . . 210-$n$) for detecting signal levels of input signals, pixel-signal amplifiers 230 (230-1, 230-2, . . . 230-$n$) that can be implemented as programmable gain amplifiers (PGA), and switches 250 (250-1, 250-2, . . . 250-$n$). The pixel-signal detectors 210, the pixel-signal amplifiers 230, and the switches 250 are features of this embodiment. The pixel-signal controller 200 is an example of a gain controller according to the present invention. In this embodiment, the pixel-signal controller 200 includes the control-signal generator 46 in addition to the pixel-signal detectors 210 and the pixel-signal amplifiers 230, and it functions as a PGA circuit as a whole.

The first and second embodiments are characterized in that the levels of pixel signals Vsig of the respective unit pixels 103 are detected individually for each column of pixels in the column region unit (the pre-amplifier 61), in that gains can be set independently for the individual columns of pixels based on the results of detection, and in that pixel signals Vout after setting gains can be output to the outside of the column region unit (the pre-amplifier 61) in the form of analog signals.

The arrangement may be such that the signal levels of the unit pixels 103 are detected at a subsequent stage of the pre-amplifier 61. In that case, however, the frequency band of the amp must be increased, so that noise from the detecting circuit increases. As a countermeasure, by providing detecting circuits for the respective columns of pixels, the frequency band of a final-stage amplifier can be reduced to the reciprocal of the number of columns of pixels, so that noise is reduced.

The operations of the pixel-signal detectors 210 are controlled according to various control signals input from the control-signal generator 46 via a control line 211. The operations of the pixel-signal amplifiers 230 are controlled according to various control signals input from the control-signal generator 46 via a control line 231. The switching operations of the switches 250 are controlled according to a control signal φs input from the control-signal generator 46 via a control line 251.

The pixel-signal detectors 210 read pixel signals Vsig from the imaging unit 110 on a line-by-line basis, and determine voltage levels thereof. The pixel-signal detectors 210 sends M-bit classification signals Vsepa representing the results to the pixel-signal amplifiers 230 in the column region unit (the pre-amplifier 61) or the control-signal generator 46 outside the column region unit (the pre-amplifier 61). Thus, gain is controlled in a self-matching manner.

The pixel-signal detectors 210 also output the classification signals Vsepa to the outside of the chip of the solid-state imaging device 10 so that it is possible to find the levels of the pixel signals Vsig and the gains set to the pixel-signal amplifiers 230 from the outside of the chip. Thus, it is allowed to set gains with reference to classification signals Vsepa detected for the respective pixels, or to carry out signal processing in accordance with the gains, from the outside of the chip.

It is possible to select by the central controller 92 (shown in FIG. 1, not shown in FIG. 2A) whether to control gains of the pixel-signal amplifiers 230 by setting gains of the pixel-signal amplifiers 230 based on results of detection by the pixel-signal detectors 210 of the column region unit (the pre-amplifier 61) or to control gains by the control-signal generator 46 provided outside the column region unit (the pre-amplifier 61).

When gains are controlled by the control-signal generator 46, the control-signal generator 46 may set appropriate gains to the pixel-signal amplifiers 230 based on the results of detection by the pixel-signal detectors 210 in the column region unit (the pre-amplifier 61). Alternatively, for example, gains may be set as desired by a user with reference to an image without referring to the results of detection by the pixel-signal detectors 210, similarly to an arrangement described later with reference to FIG. 22.

In either case, when the results of detection by the pixel-signal detectors 210 of the column region unit (the pre-amplifier 61) are referred to, the results of detection by the pixel-signal detectors 210 are reflected in a self-matching manner on gain setting of the pixel-signal amplifiers 230 provided in the column region unit, allowing automatic setting of gains.

When the results of detection by the pixel-signal detectors 210 are not referred to, gains are not adjusted in a self-matching manner, and the gains of the pixel-signal amplifiers 230 are controlled externally by the control-signal generator 46. Thus, obviously, the pixel-signal detectors 210 need not be provided. According to the arrangement in which the results of detection by the pixel-signal detectors 210 are not referred to, the column region unit can be more compact, so that design flexibility can be increased by allowing external setting. Furthermore, when the control-signal generator 46 is not needed, obviously, the control-signal generator 46 need not be provided.

The pixel-signal amplifiers 230 have inputs connected to the vertical signal lines 158 via the switches 250, and outputs connected to the column circuits 63. The pixel-signal amplifiers 230 are preferably arranged so that DC levels of output signals Vout do not vary even when gains are adjusted.

The pixel-signal detectors 210 may be arranged according to the first embodiment so as to detect signal levels on the output side of the pixel-signal amplifiers 230, as shown in FIG. 2A, or according to the second embodiment so as to detect signal levels on the input side of the pixel-signal amplifiers 230, as shown in FIG. 3. When signal levels are detected on the output side of the pixel-signal amplifiers 230, signal levels may be detected between the pixel-signal amplifiers 230 and the column circuits 63 (or column ADC circuits 280 described later), or on the output side of the column circuits 64 (or column ADC circuits 280 described later). These arrangements will be described later in detail.

The column regions for the respective columns include the pixel-signal detectors 210, the pixel-signal amplifiers 230, the switches 250, and the column circuits 63, and the column regions for the respective columns will be collectively referred to as a column region unit. The column region unit substantially coincides with the pre-amplifier 61.

In the arrangement described above, the pixel-signal controller 200 detects the levels of pixel signals read through the vertical signal lines 158, and outputs the signal levels while controlling gains for the pixel signals of the unit pixels 103. The pixel-signal controller 200, which adaptively adjusts gains for output, will be referred to as an adaptive-gain column adjusting circuit. The pixel-signal controller 200 will be described later in detail.

In the adaptive-gain column adjusting circuit constructed as described above, the pixel-signal detectors 210 control gain setting of the pixel-signal amplifiers 230, for example, via output lines 212a (not shown in FIG. 2A). Furthermore, the pixel-signal detectors 210 send classification signals Vsepa to the control-signal generator 46 via an output line 212b (not shown in FIG. 2A). In response to the classification signals Vsepa, the control-signal generator 46 controls gain setting of the pixel-signal amplifiers 230.

Compared with a case where classification signals Vsepa are directly supplied to the pixel-signal amplifiers 230 through the output lines 212a, additional processing is carried out in the control-signal generator 46. Thus, gain setting of the pixel-signal amplifiers 230 can be controlled from the outside of the column region unit according to results of detection, so that flexibility of gain setting is improved compared with a case where gain setting can be controlled only within the column region unit.

For example, depending on the classification signals Vsepa and operation timing, when gain setting is controlled directly via the output lines 212a, control could be restricted to powers of 2 such as 1 (2^0), 2 (2^1), 4 (2^2), 8 (2^4) ("^" denotes a power of 2). In contrast, by sending classification signals Vsepa via the control line 212b to the control-signal generator 46, gain setting can be controlled in a stepwise manner with a step size of 1 in a range of ×1 to ×8 or even larger.

For example, an average level of signals in a single entire screen is detected by an external circuit 300, and the result of detection representing the average level of signals is sent to the control-signal generator 46 via the central controller 92. Based on classification signals Vsepa received from the pixel-signal detectors 210, the control-signal generator 46 determines powers of 2 as gains to be set to the pixel-signal amplifiers 230. Then, the gains are corrected based on the average signal level reported from the central controller 92, and the corrected gains in a range of ×1 to ×8 are set to the pixel-signal amplifiers 230.

Furthermore, the pixel-signal detectors 210 output the classification signals Vsepa to the outside of the chip of the solid-state imaging device 10 via output line 212c. At this time, the classification signals Vsepa are output in association with imaging signals amplified by the pixel-signal amplifiers 230 on the basis of the unit pixels 103.

To be "output in association with" indicates that pixel signals and classification signals Vsepa associated with the pixel signals are output in synchronization with each other with respect to pixel position so that these signals are input at substantially the same timing to an input section of a signal processing circuit provided at a subsequent stage (i.e., a signal extending unit 310). For example, without limitation to outputting classification signals Vsepa to the outside of the chip at the same timing as signals amplified by the pixel-signal amplifiers 230, when analog imaging signals are digitized by the A/D converter 64 before being passed to the signal extending unit 310, a delay due to the digitization is to be considered.

By inputting the classification signals Vsepa and pixel signals at the same timing to the signal extending unit 310, signal processing in the signal extending unit 310 can be controlled accurately, so that signal processing is facilitated.

When the levels of pixel signals Vsig and the values of gains set to the pixel-signal amplifiers 230 can be found from the outside of the chip, for example, a single screen displayed on a monitor is represented by intensity information or color information based on M-bit classification signals Vsepa representing results of detection by the pixel-signal detectors 210 so that the levels of pixel signals or the values of gains can be found from outside. The central controller 92 receives instructions for gain setting for a single entire screen from a user, and sends the instructions to the control-signal generator 46.

Compared with a case where gains can be controlled only within the chip, by allowing external setting by a user, flexibility of gain setting is increased. Furthermore, since classification signals Vsepa can be referred to even from outside the chip, compared with a case where the brightness of an image is controlled by controlling gains from the outside irrespective of signal levels, precise control is allowed even though setting is made manually by a user. In this case, the control-signal generator 46 may be provided outside the chip, for example, by integrating the control-signal generator 46 with the central controller 92. This serves to reduce the area occupied by the chip.

At a subsequent stage of the solid-state imaging unit 2 (the solid-state imaging device 10), an external circuit 300 including an N-bit (e.g. 12-bit or 14-bit) A/D converter 64 and a signal extending unit 310 that is a feature of this embodiment is provided. As will be described later in detail, the signal extending unit 310 has a noise canceling function and a gain-mismatch correcting function.

The signal extending unit 310, based on classification signals Vsepa input from the pixel-signal detectors 210 and N-bit imaging signals Vout2 digitized by the A/D converter 64, extends the digital dynamic range of the N-bit imaging signals. At this time, the signal extending unit 310 performs digital noise canceling, and gain-mismatch correction, which is an example of gain correction according to the present invention.

The gain-mismatch correction aims at correcting gain setting variation over a single screen, which is caused by setting different gains for the respective pixels in the pixel-signal amplifiers 230, so that original state will be recovered in the entire screen, thereby extending the dynamic range of signals of one screen.

For example, when the range of adjustment of gains set to the pixel-signal amplifiers 230 is represented by M bits, data is represented by (N+M) bits. When the number of bits M of the classification signals Vsepa corresponds to the range of adjustment of gains, the bit resolution of N-bit data is corrected using input signals V(i) and the classification signals Vsepa so that the bit resolution is extended, for example, from N bits to (M+N) bits or even further. Even if the classification signals Vsepa is 1-bit data, when the gains represented by the classification signals Vsepa are ×1 and ×8, i.e., when gains that can be set to the pixel-signal amplifiers 230 are ×1 and ×8 (an adjustment range of 3 bits), the input N-bit data is extended by 3 bits. At this time, the classification signals Vsepa are associated with gain correcting factors by a gain-correcting-factor generator 316.

The signal extending unit 310 constitutes a part of the image processor 66 (shown in FIG. 1) implemented by a DSP. Although the A/D converter 64 and the signal extending unit 310 of the external circuit 300 are provided separately from the solid-state imaging unit 2 (the solid-state imaging device 10), the external circuit 300 may be formed integrally with the imaging unit 110 in a semiconductor region composed of single-crystal silicon or the like, using techniques used for manufacturing semiconductor integrated circuits, whereby a solid-state imaging device, which is an example of a semiconductor device, is implemented.

Principles of Operation

Next, the principles of operation of the solid-state imaging unit 2 constructed as described above will be described. First, signal voltages Vsig are output from the vertical signal lines 158 (158-1, 158-2, ... 158-n) and are input to the pixel-signal amplifiers 230. The signal voltages Vsig are amplified by certain amplification factors, and the resulting signals are output as output signals Vout. The pixel-signal detectors 210 compare the output signals Vout with predetermined reference voltages on the output side of the pixel-signal amplifiers 230. Alternatively, the pixel-signal detectors 210 compare the signal voltages Vsig with predetermined reference voltages on the input side of the pixel-signal amplifiers 230. The pixel-signal detectors then output classification signals Vsepa.

Figure 5:
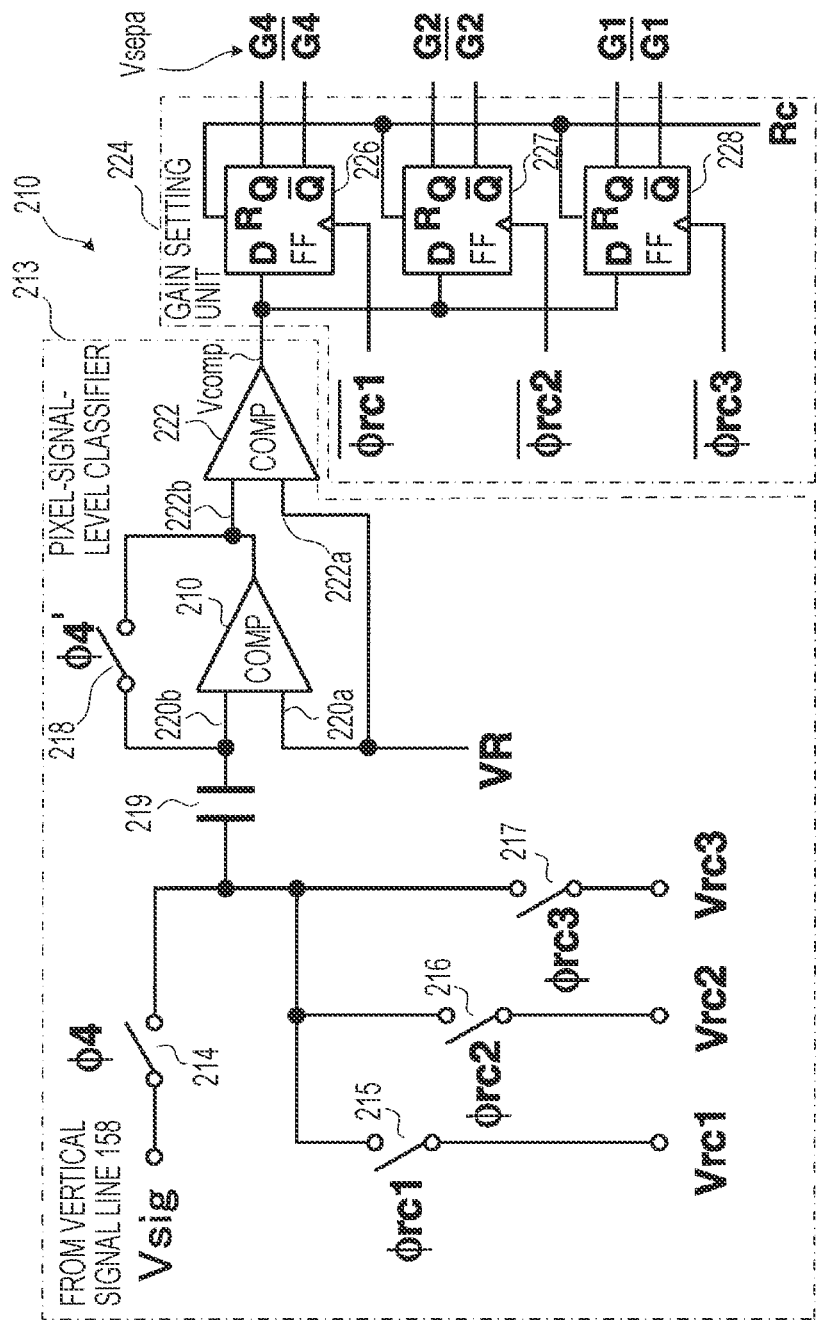
FIG. 5 is a diagram showing an example construction of a pixel-signal detector in the second embodiment shown in FIG. 3.

First Example of Operation Timing and Detecting Circuit, Which Relates to the Second Embodiment FIG. 4 is a timing chart showing operation timing in one horizontal period of the solid-state imaging unit 2 according to the second embodiment shown in FIG. 3. FIG. 5 is diagram showing an example construction of a pixel-signal detector 210 in the second embodiment shown in FIG. 3.

As shown in FIG. 5, the pixel-signal detector 210 in the second embodiment includes a pixel-signal-level detector 213 and a classification-signal generator 224. The pixel-signal-level detector 213 detects the level of a pixel signal Vsig output through a vertical signal line 158 of the imaging unit 110, and compares the level with predetermined threshold values. The classification-signal generator 224 generates a classification signal Vsepa for classifying the level of the pixel signal Vsig based on a result of detection by the pixel-signal-level detector 213.

The pixel-signal-level detector 213 includes switches 214, 215, 216, 217, and 218, a capacitor 219, and comparators 220 and 222. The classification-signal generator 224 includes three flip-flop (FF) circuits 226, 227, and 228.

In the pixel-signal level detector 213, to one input nodes 220a and 222a of the respective comparators 220 and 222, a predetermined reference voltage VR is applied by a voltage generator (not shown) in the pixel-signal detector 210. One terminals of the respective switches 215 to 217 receive comparison voltages Vrc1, Vrc2, and Vrc3 of predetermined levels, and the other terminals of the respective switches 215 to 217 are commonly connected to the output of the switch 214 and the capacitor 219.

The switch 218 is provided between an input node 220b and the output so that the comparator 220 can be reset. The switch 214 receives a pixel signal Vin through a vertical signal line 158. The pixel signal Vin is passed to the capacitor 219 via the switch 214, and is compared with a predetermined voltage by the comparator 220. The output of the comparator 220 is input to an input node 222b of the comparator 222. The output of the comparator 222 is commonly input to data input terminals (D) of the flip-flop circuits 226, 227, and 228.

The switches 214 to 218 receive synchronization clocks φrc1 to φrc3, φ4, and φ4' that serve as control signals from the control-signal generator 46 through the control line 211.

In the classification-signal generator 224, clock terminals of the flip-flop circuits 226 to 228 receive synchronization clocks /φrc1 to /φrc3 (indicated with overbars in FIG. 4), which are inverted signals of the synchronization clocks φrc1 to φrc3, from the control-signal generator 46 through the control line 211. Latch terminals (R) of the flip-flop circuits 226 to 228 receive output pulses Rc.

Now, the operation of the pixel-signal detector 210 will be described with reference to the timing chart shown in FIG. 4. First, the pixel-signal amplifier 230 is reset in an "H" period (t10 to t23) of the clock φ1, which is a control signal for controlling the pixel-signal amplifier 230. Furthermore, in the period of φ1="H", the reset transistor 136 of the pixel-signal generator 105 including the floating diffusion region 138 of the unit pixel 103 is rest by inputting a reset pulse R(i) through a reset line 153 (t10 to t11). Then, a reset level received from the unit pixel 103 is sampled (t11 to t12).

Then, a transfer control signal (i.e., a reading pulse) TX(i) is pulled to "H" via a transfer gate line 151, whereby a signal of the charge generator 132 implemented by a photodiode or the like is read out to the floating diffusion region 138 (t12 to t13). At this time, the control signal φ2 for the switch 250 is at "L", so that the pixel-signal amplifier 230 is kept reset.

Then, during a period when φ1="H" and φ2="L", the control signal φ4 for the switch 214 is pulled to "H" so that the pixel-signal detector 210 is activated (t14 to t15). Then, control signals φrc1 to φrc3 are sequentially selected (t16 to t21) to determine gains in accordance with the signal levels (t22).

For example, a pixel signal Vsig input via the switch 214 through the vertical signal line 158 is accumulated in the capacitor 219 of the input node 220b of the comparator 220 (t14 to t15). The accumulated signal Vsig is compared with the comparison voltages Vrc1, Vrc2, and Vrc3 by the comparators 220 and 222 by operations of the switches 215, 216, and 217 based on the synchronization clocks φrc1 to φrc3. Comparison results Vcomp of the three times of comparison are written to the flip-flop circuits 226, 227, and 228 based on the synchronization clocks /φrc1 to /φrc3. Then, upon completion of the comparison associated with the synchronization clock φrc3, the gain of the pixel-signal amplifier 230 is determined from powers of 2 such as 1, 2, 4 and 8.

In this example, comparison and classification are performed based on reference voltages associated with gain setting represented by powers of 2, so that classification signals Vsepa are associated one by one with gain setting values for the pixel-signal amplifiers 230 represented by powers of 2. Thus, bit control signals G1, G2, and G4 (or /G1, /G2, and /G4) can be directly used as control signals for switching gains, and the number of bits M of the classification signals Vsepa is equal to the number of bits of the range of adjustment of gains. This association is not allowed when only a single reference voltage is used or when reference voltages are not represented by powers of 2.

For example, when comparison and classification are performed based on only a reference voltage associated with a gain of ×8, a classification signal Vsepa is 1-bit data, and the range of adjustment of gain is three bits in accordance with the gain of ×8, so that a mismatch occurs. Even in this case, however, when used in combination with a pixel-signal amplifier 230 in which gain of ×1 or ×8 can be set, the 1-bit classification signal Vsepa can be used directly for gain setting. In this case, however, when correcting gain in the signal extending unit 310, it does not suffice to perform correction for the one bit of the classification signal Vsepa, and correction must be performed for the gain represented by the classification signal Vsepa, i.e., 3 bits, as will be described later in detail with reference to FIGS. 21A and 21B.

Thus, it is possible to classify the signal Vsig on the vertical signal line 158 (more specifically, the difference ΔV between the reset level Vrst and the pixel signal Vsig) into a range. The classification signal Vsepa representing the result of classification is output as bit signals (hereinafter also referred to as bit control signals) G1, G2, and G4 from non-inverted output terminals Q of the flip-flop circuits 226, 227, and 228, based on output pulses Rc, and as bit control signals /G1, /G2, and /G4 (indicated by overbars in FIG. 5) from the inverted output terminals /Q (indicated by overbars in FIG. 5), as 3-bit data on the positive side and on the negative side.

The classification signal Vsepa represented by 3-bit data is supplied to the pixel-signal amplifier 230, and is used as a gain setting signal for the pixel-signal amplifier 230. That is, the classification-signal 224 including the flip-flop circuits 226, 227, and 228 functions as a gain-setting controller according to the present invention, which controls gain setting of the pixel-signal amplifier 230 according to the classification signal Vsepa.

The classification signal Vsepa representing the result of classification by the pixel-signal-level detector 213 and the classification-signal generator 224 provided for each column is fed back for gain setting of the pixel-signal amplifier 230 provided for each column, thereby automatically setting gain for the pixel-signal amplifier 230. That is, in an arrangement in which the classification signal Vsepa is sent from the classification-signal generator 224 to the pixel-signal amplifier 230 to set gain for the pixel-signal amplifier 230, a gain setting controller is provided for each column of pixels.

Furthermore, the classification signal Vsepa represented by 3-bit data is supplied to the control-signal generator 46, or is read out to the outside of the chip of the solid-state imaging device 10 together with an output signal amplified by the pixel-signal amplifier 230. It is possible to refer to the classification signal Vsepa and set a gain for the pixel-signal amplifier 230 from the control-signal generator 46 or from the outside of the chip. Furthermore, gain setting for each pixel is corrected in the signal extending unit 310 by digital signal processing so that digital dynamic range is extended while correcting variation in gain setting over a single screen.

Although the classification signal Vsepa is output from the classification-signal generator 224 to the outside of the column region unit in this embodiment, alternatively, it is possible to directly output a detection result Vcomp from the pixel-signal-level detector 213 and to use it for gain setting or gain correction.

Furthermore, after completing operation for determining gain for the pixel-signal amplifier 230, the control signal φ1 is pulled to "L" and the control signal φ2 is pulled to "H" so that the pixel signal Vsig on the vertical signal line 158 is amplified by the pixel-signal amplifier 230. The amplified signal Vout is read out to the outside of the column region unit (the pre-amplifier 61). Thus, the pixel signal Vsig of a low level is amplified in the analog domain to achieve a signal of a higher level.

The amplified signal Vout may be directly read out to the outside of the solid-state imaging device 10, or may be read by sampling and holding the signal Vout by the column circuit 63 at a subsequent stage of the pixel-signal amplifier 230, as shown in FIGS. 2A and 3. When the column circuit 63 is adapted to have a CDS or other noise suppressing function or DC-variation suppressing function, a signal of a low level can be amplified to a higher level in the analog domain, and noise associated with variation in DC level due to fixed-pattern noise or gain adjustment is suppressed, so that a high S/N ratio is achieved.

Example Construction of Comparator

Figure 6:
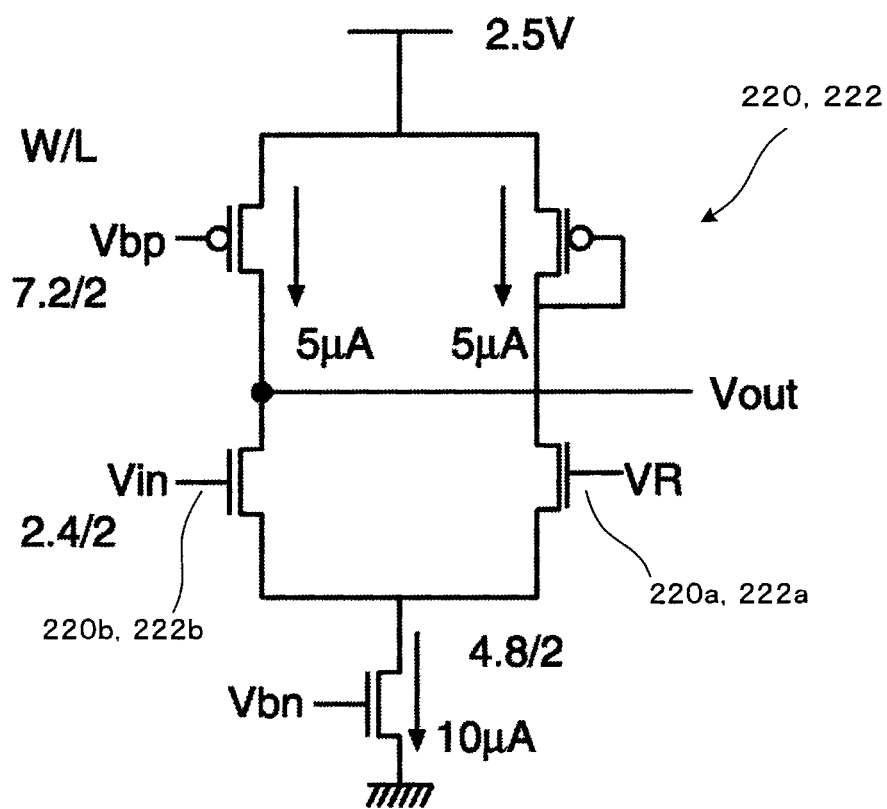
FIG. 6 is a diagram showing an example construction of a comparator shown in FIG. 5.

FIG. 6 is a diagram showing an example construction of the comparators 220 and 222 shown in FIG. 5. Each of the comparators 220 and 222 includes a differential amplifier. More specifically, as shown in FIG. 6, in the comparators 220 and 222, the sources of a pair of transistors Q220 and Q222 for performing differential amplification are commonly connected to a transistor Q226 that serves to supply a constant current, and the drains of the transistors Q220 and Q222 are connected to a pair of transistors Q227 and Q228 by cascade connection. The drains of the transistors Q227 and Q228 receive a power-supply voltage (2.5 V in this example).

The gate of the transistor Q222 corresponds to the input nodes 220a and 222a shown in FIG. 5, and it receives a reference voltage VR. The gate of the transistor Q220 corresponds to the input nodes 220b and 222b shown in FIG. 5. The gate of the transistor Q226 receives a predetermined control voltage from the control-signal generator 46, so that it serves as a constant-current source. The gate of the transistor Q227 receives a predetermined control signal from a voltage generator (not shown) in the comparators 220 and 222. Alternatively, a control signal may be applied to the gate of the transistor Q227 from the control-signal generator 46.

Since the comparators 220 and 222 can be implemented by the simple differential amplifiers described above, the comparators 220 and 222 can be implemented by circuits in which the number of elements is small and in which the area of column region is small.

Next, the operation of the pixel-signal detector 210 in the second embodiment will be described using specific examples of numeric values. For example, in the arrangement according to the second embodiment in which the signal voltage Vsig is compared with predetermined reference voltages on the input side of the pixel-signal amplifier 230 (refer to FIG. 3), the reference voltages are 500 mV, 250 mV, and 125 mV. These values are determined in accordance with the signal saturation level of the vertical signal line 158 being 1 V. More specifically, 1 V is classified into eight ranges of 125 mV. In order to perform comparison with these reference voltages, comparison voltages Vrc1, Vrc2, and Vrc3 having predetermined levels corresponding to 500 mV, 250 mV, and 125 mV, respectively, are supplied to the pixel-signal detector 210.

Outputs representing results of comparison by the respective pixel-signal detectors 210 (210-1, 210-2, ... 210-n) are codes (i.e., classification signals Vsepa) expressed in expression (1) below:

For example, when Vsig=300 mV, a comparison output (i.e., a classification signal Vsepa) represented by a 3-bit digital signal of a code "002" is output from the output line 212c to the outside of the column region unit (the pre-amplifier 61). When Vsig=100 mV, a classification signal Vsepa represented by a 3-bit digital signal of a code "000" is output from the output line 212c to the outside of the column region unit.

The pixel-signal detectors 210 (210-1, 210-2, ... 210-n) also output the comparison outputs (i.e., the classification signals Vsepa) from the output line 212b to the pixel-signal amplifiers 230 (230-1, 230-2, ... 230-n) implemented as PGA circuits, and also output the comparison outputs from the output line 212c to the control-signal generator 46.

For example, when Vsig=300 mV, the gain of the pixel-signal amplifier 230 is doubled in accordance with the code signal "002" from the pixel-signal detector 210. When Vsig=100 mV, the gain of the pixel-signal amplifier 230 is multiplied by 8. That is, in this embodiment, the input signal voltage Vsig is converted into a high voltage by the pixel-signal amplifier 230. For example, a gain of ×1 is applied to a pixel having a high signal level corresponding to a normal luminance, and a gain of ×8 is applied to a pixel having a low signal level corresponding to a low luminance.

Figure 7:
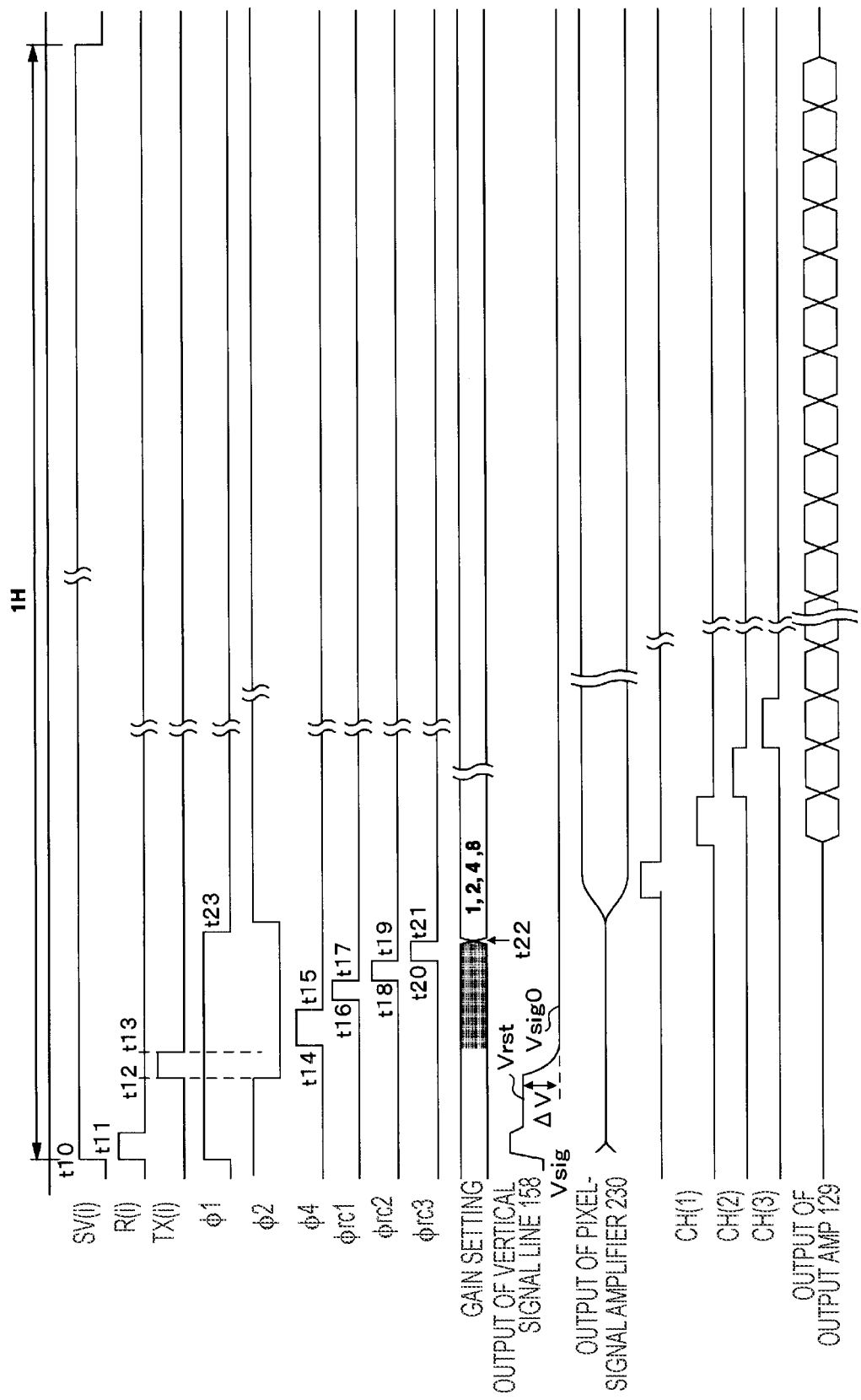
FIG. 7 is a timing chart showing operation timing in a horizontal period of the solid-state imaging unit according to the first embodiment shown in FIG. 2A.
Figure 8:
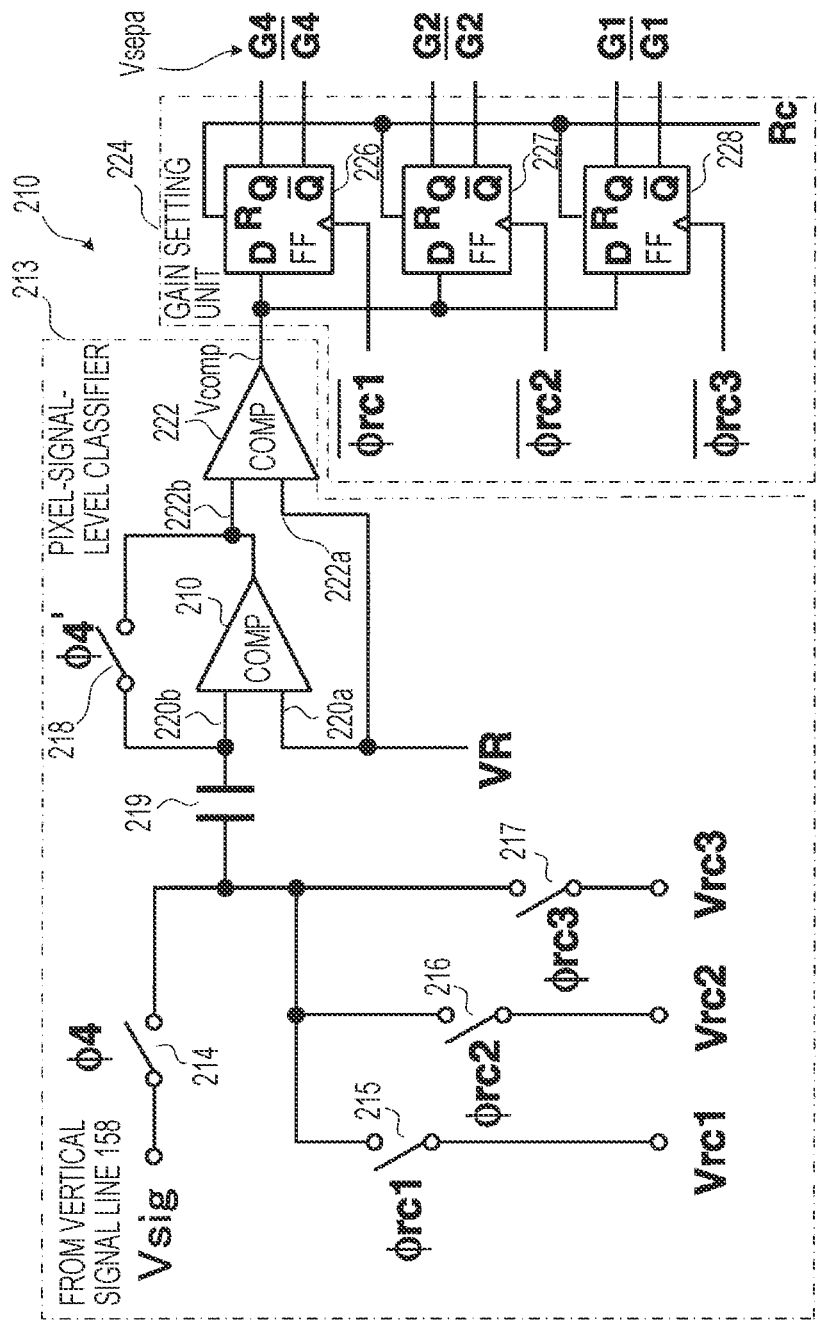
FIG. 8 is a diagram showing an example construction of a pixel-signal detector in the first embodiment shown in FIG. 2A.

Second Example of Operation Timing and Detecting Circuit, Which Relates to the First Embodiment FIG. 7 is a timing chart showing operation timing during a horizontal period of the solid-state imaging unit 2 according to the first embodiment shown in FIG. 2A. FIG. 8 is a diagram showing an example construction of the pixel-signal detector 210 in the first embodiment shown in FIG. 2A.

Next, the operation of the pixel-signal detector 210 in the first embodiment will be described using specific examples of numeric values. For example, in an arrangement according to the first embodiment in which the signal voltage Vout is compared with predetermined reference voltages on the output side of the pixel-signal amplifier 230, when gain setting is controlled by three levels of ×2, ×4, and ×8 based on powers of 2, the reference voltages are 500 mV, 250 mV, and 125 mV. In order to perform comparisons with these reference voltages, the pixel-signal detector 210 receives comparison voltages Vrc1, Vrc2, and Vrc3 having predetermined levels corresponding to 500 mV, 250 mV, and 125 mV, respectively.

Outputs of the pixel-signal detectors 210 (210-1, 210-2, ... 210-n) representing results of comparison are represented by codes (i.e., classification signals Vsepa) based on the rules expressed in expression (2) below. By using the three reference voltages 500 mV, 250 mV, and 125 mV in combination, such as 125+250=375 mV, 125+500=675 mV, 500+250=750 mV, and 500+125+250=875 mV, it is possible to perform comparison with respect to levels not based on powers of 2.

$$\begin{aligned}
&Vsig < 125 \text{ mV} & \text{Code 000} \\
&125 \text{ mV} \leq Vsig < 250 \text{ mV} & \text{Code 001} \\
&250 \text{ mV} \leq Vsig < 375 \text{ mV} & \text{Code 002} \\
&375 \text{ mV} \leq Vsig < 500 \text{ mV} & \text{Code 003} \\
&500 \text{ mV} \leq Vsig < 625 \text{ mV} & \text{Code 004} \\
&625 \text{ mV} \leq Vsig < 750 \text{ mV} & \text{Code 005} \\
&750 \text{ mV} \leq Vsig < 875 \text{ mV} & \text{Code 006} \\
&875 \text{ mV} \leq Vsig < 1{,}000 \text{ mV} & \text{Code 007}
\end{aligned} \quad (1)$$

$$\begin{aligned}
&Vsig < 125 \text{ mV} & \text{Code 000} \\
&125 \text{ mV} \leq Vsig < 250 \text{ mV} & \text{Code 001} \\
&250 \text{ mV} \leq Vsig < 375 \text{ mV} & \text{Code 002} \\
&375 \text{ mV} \leq Vsig < 500 \text{ mV} & \text{Code 003} \\
&500 \text{ mV} \leq Vsig < 625 \text{ mV} & \text{Code 004} \\
&625 \text{ mV} \leq Vsig < 750 \text{ mV} & \text{Code 005} \\
&750 \text{ mV} \leq Vsig < 875 \text{ mV} & \text{Code 006} \\
&875 \text{ mV} \leq Vsig < 1{,}000 \text{ mV} & \text{Code 007}
\end{aligned} \quad (2)$$

When a gain is set to the pixel-signal amplifier 230 based on a result of detection by the pixel-signal detector 210, if a signal level detected based on a predetermined gain is outside a linear range of the pixel-signal amplifier 230, of gains that can be set to the pixel-signal amplifier 230, a maximum gain except for the predetermined gain is set to the pixel-signal amplifier 230. Thus, gain setting is controlled so as not to exceed the dynamic range of the pixel-signal amplifier 230.

Conventionally, signals of small level (100 mV in this example) are directly used, so that the S/N ratio is small and resulting images include much noise. In contrast, according to the first and second embodiments, the equivalent input signal is 800 mV, so that the S/N ratio is high and the image quality is good.

Furthermore, although the precision has been conventionally 6 or 7 bits when the number of bits of the A/D converter 64 is 10 and Vsig=100 mV, according to the embodiments, the precision is improved to 9 or 10 bits. This is equivalent to increasing the capability of the A/D converter 64 from 10 bits to 13 bits. Furthermore, since it is possible to set a PGA gain for each pixel signal, the embodiments are very advantageous for achieving a large number of bits in analog-to-digital (A/D) conversion.

Furthermore, by increasing the number of reference voltages of the pixel-signal detector 210 to four voltages based on powers of 2, a precision of 4 bits is achieved, so that the S/N ratio of analog signals is further increased.

Since gain is increased in a lower region of the driving frequency band of the transistor, compared with the conventional art in which gain is increased at a final stage with a high driving frequency, thermal noise that could occur decreases. When an image is captured with a large number of pixels at a high frame rate, conventionally, noise causes a problem due to increased bandwidth of an analog circuit provided at a final output stage. In contrast, according to the embodiments, the bandwidth is reduced and noise therefore decreases compared with the conventional art, which serves to increase margin.

Furthermore, by predetermining stepwise values of gain to be set in the pixel-signal amplifier 230, it is possible to reduce circuitry scale. Although it is possible to allow gain to be varied continuously, in that case, the circuitry becomes more complex.

In addition, according to the first and second embodiments, a feedback arrangement that causes the output signal level to be constant is not employed, and the pixel-signal amplifier 230 operates at a gain determined based on a specified condition. Thus, the problem of variation in output due to the non-infinity of feedback gain, which constantly occurs by trying to make the output constant, does not occur. Thus, images having a favorable S/N ratio can be obtained.

As will be understood from the circuit arrangements shown in FIGS. 2A and 3, by providing the pixel-signal detectors 210 that detect the levels of signals on the vertical signal lines 158 for the respective columns, it is possible to set gains of the pixel-signal amplifiers 230 for the respective pixels. That is, when control circuits are provided for the respective unit pixels 103 in order to optimize gains for signals of the respective unit pixels, a large area is occupied and cost is increased. In contrast, according to the embodiments, a pixel-signal controller 200 composed mainly of a pixel-signal detector 210 and a pixel-signal amplifier 230 is provided for each column. Thus, by controlling gains for all the unit pixels 103 on a row-by-row basis, it is possible to control gains for substantially all the unit pixels 103 without causing increase in the chip size.

Since the signal saturation level varies among devices, when the brightness is increased by the same gain over the entire screen, a bright region in the screen exceeds the signal saturation level, so that unevenness caused by saturation appears in the resulting image. In contrast, according to the first and second embodiments, a pixel-signal detector 210 and a pixel-signal amplifier 230 are provided for each column, so that it is possible to control pixel signal individually for each of the unit pixels 103. Thus, it is possible to control gain for each unit pixel having a small signal in the screen. Therefore, it is possible to exercise control so that a bright region in the screen will not exceed saturation. Accordingly, it is possible to perform suitable processing for each device so as not to be affected by the variation in the signal saturation level.

Furthermore, by employing an arrangement according to the first embodiment in which the signal voltage Vout is compared with predetermined reference voltages on the output side of the pixel-signal amplifier 230, the output signal Vout amplified by the pixel-signal amplifier 230 is prevented from exceeding the dynamic range of the circuit.

When the output of the vertical signal line 158 itself is saturated, the signal remains saturated in subsequent circuits. Thus, a gain of ×1 is set for a region of a normal luminance, and in a region of a low luminance, gain is increased substantially to the signal level for the normal luminance, i.e., so that the output level of the pixel-signal amplifier 230 does not exceed the signal saturation level of the vertical signal line 158. To put it conversely, the dynamic range of the pixel-signal amplifier 230 is chosen to be substantially the same as or somewhat larger than the signal saturation level of the vertical signal line 158.

For example, in an arrangement according to the second embodiment in which the pixel-signal detector 210 perform comparison on the input side of the pixel-signal amplifier 230 to control gain of the pixel-signal amplifier 230, when the signal saturation level of the solid-state imaging device 10 (particularly the imaging unit 110) is 1 V, and 0.2 V is detected on the input side and is amplified by 10 in the pixel-signal amplifier 230, the output voltage Vout of the pixel-signal amplifier 230 is supposed to be 2 V.

According to the second embodiment, since the output of the pixel-signal amplifier 230 is not monitored, it is not possible to find whether the pixel-signal amplifier 230 is saturated. Thus, when the pixel-signal amplifier 230 does not have a sufficient dynamic range for 2 V, the problem of saturation of the imaging device occurs.

In order to avoid exceeding the signal saturation level, it does not suffice to set gains of amplifier circuits so that the signal saturation level of vertical signal line 158 will not be exceeded. That is, in order that the dynamic range of the pixel-signal amplifier 230 is not exceeded, a somewhat lower gain relative to a standard dynamic range of the relevant device type must be set so that the output of the pixel-signal amplifier 230 does not fall outside of the linear range by amplification at a high gain, in consideration of a margin relating to the environment or variation. Even if a gain is set so that the signal saturation level of the vertical signal line 158 is not exceeded, it is meaningless if the pixel-signal amplifier 230 does not allow for the signal saturation level (although the pixel-signal amplifier 230 is usually designed so as to allow for the signal saturation level), failing to effectively use the dynamic range suitable for the pixel-signal amplifier 230.

In contrast, according to the first embodiment, comparison is performed at a subsequent stage of the pixel-signal amplifier 230 while switching gain setting of the pixel-signal amplifier 230. Thus, by checking linearity between switching of gain setting and change in the output signal, it is possible to find whether the pixel-signal amplifier 230 is saturated on a device-by-device basis.

Thus, when saturation occurs with a gain that is set, it is possible to determine that amplification is not to be carried out with the gain setting. Thus, advantageously, a maximum gain can be set within the limit of the dynamic range of an individual device so that the signal saturation level of the imaging device will not be exceeded. Thus, images having better S/N ratio than in the second embodiment can be obtained.

Third and Fourth Embodiments

Figure 9:
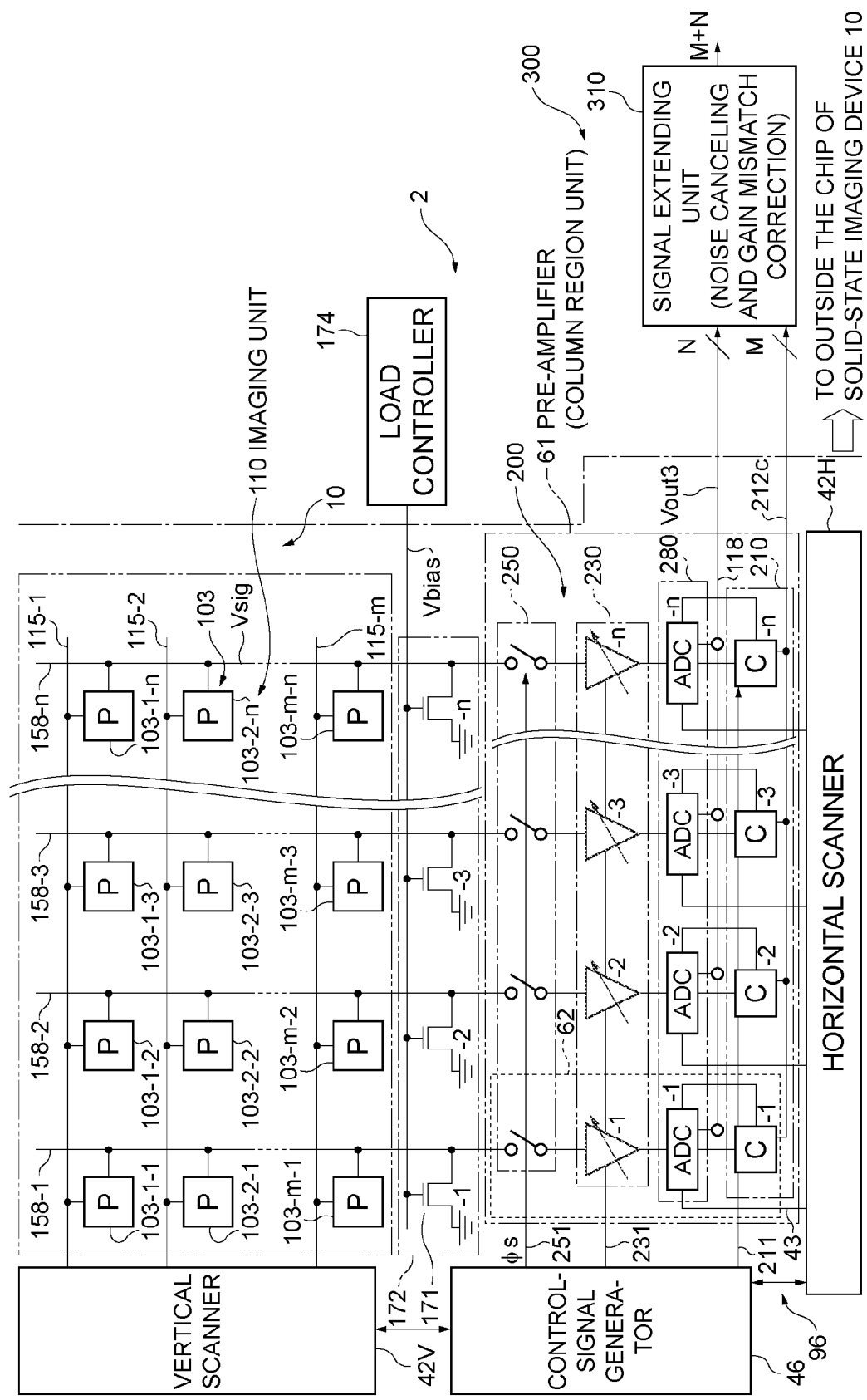
FIG. 9 is a schematic diagram showing a solid-state imaging unit composed mainly of a CMOS imaging device, and peripheral parts thereof, according to a third embodiment of the present invention.

FIGS. 9 and 10 are schematic diagrams showing third and fourth embodiments of the solid-state imaging unit 2 mainly composed of the CMOS solid-state imaging device 10, and peripheral parts thereof. The third embodiment relates to the first embodiment, and the fourth embodiment relates to the second embodiment. In the embodiments shown in FIGS. 9 and 10, the solid-state imaging unit 2 is composed mainly of the imaging unit 110 and the pre-amplifier 61, and the signal extending unit 310 is formed on the same chip as the solid-state imaging unit 2 (the solid-state imaging device 10).

In contrast to the first and second embodiments described above, which relate to examples of CMOS image sensors that output analog imaging signals, in the third and fourth embodiments, an AD converter is provided in the column region unit so that digital imaging signals are output on a column-by-column basis. That is, the third and fourth embodiments are characterized in that the levels of respective pixel signals Vsig are detected for each column in the column region unit (the pre-amplifier 61), in that gains can be set independently for the levels of the respective signals, and in that pixel signals Vout after setting gains are output as digital signals to the outside of the column region unit (the pre-amplifier 61). The following description will be directed mainly to differences from the first and second embodiments.

In the third and fourth embodiments, a pixel-signal detector 210, a pixel-signal amplifier 230, and a column circuit having a function of AD conversion (hereinafter referred to as a column ADC circuit) 280 are provided for each column region associated with a column of pixels, and digital signals are formed in each column region. That is, the column circuits in the first and second embodiments are replaced with column ADC circuits 280. The pixel-signal detector 210, the pixel-signal amplifier 230, the switch 250, and the column ADC circuit 280 form a column processor 62 for each column.

In the arrangement described above, the signal level of the vertical signal line 158 is detected by the pixel-signal detector 210 on the output side (in the third embodiment) or on the input side (in the fourth embodiment) of the pixel-signal amplifier 230. Then, the result is reflected to the gain setting of the pixel-signal amplifier 230 so that the gain of the pixel-signal amplifier 230 will be optimized. The pixel-signal amplifier 230 amplifies an input signal Vsig by the gain set as described above, and sends the amplified signal to the column ADC circuit 280 at a subsequent stage.

The column ADC circuit 280 reduces noise or DC variation of the analog pixel signal Vsig for the column region associated with each column, and converts the signal into, for example, an N-bit digital signal Vout3. The column ADC circuit 280 temporarily holds the digitized pixel data Vout3 for a certain period, and outputs the digitized N-bit pixel signals Vout3 of the respective unit pixels at a specific timing to the outside of the column region unit (the pre-amplifier 61) and the outside of the chip of the solid-state imaging device 10, by a shift operation according to horizontal select signals CH(i) input from the horizontal scanner 42H via the control line 43.

Similarly to the first and second embodiments, the pixel-signal detector 210 sends a classification signal Vsepa to the pixel-signal amplifier 230 and the control-signal generator 46 via the output lines 212a and 212b (not shown in FIG. 10), and also outputs the classification signal Vsepa to the outside of the chip of the solid-state imaging device 10 as M-bit data via the output line 212c.

In the arrangement described above, the pixel-signal detector 210 holds N-bit information, and the column ADC circuit 280 holds M-bit information. Thus, according to the third and fourth embodiments, similarly to the first and second embodiments, it is possible to obtain information equivalent to (N+M) bits by the signal extending unit 310. That is, similarly to the first and second embodiments, the signal extending unit 310 converts an N-bit imaging signal into an (N+M)-bit signal based on the M-bit classification signal Vsepa input from the pixel-signal detector 210 and the N-bit imaging signal Vout3 from the column ADC circuit 280.

Furthermore, since the column circuits 63 are replaced with the column ADC circuit 280, and the pixel-signal detectors 210, the pixel-signal amplifiers 230, and the control-signal generator 46 are the same as those in the first and second embodiments, images having high S/N ratio can be obtained, noise margin can be increased, and the effect of variation in signal saturation level is avoided, similarly to the first and second embodiments. Furthermore, according to the third embodiment, the signal saturation level of the imaging device is not exceeded, similarly to the first embodiment.

Example Construction of Pixel-Signal Amplifier

FIGS. 11A and 11B are diagrams for explaining an example construction the pixel-signal amplifier 230 and peripheral parts in the first and third embodiments (hereinafter referred to as a first example construction), and operation thereof. In the first example construction, switches 242 and 246 are provided to implement a switched-capacitor noise canceling amp (hereinafter also referred to as a column amp).

More specifically, as shown in FIG. 11A, a pixel signal Vsig from a vertical signal line 158 is input to an amplifier circuit 235 implemented by an operational amplifier via a capacitor 232 having a capacitance 7C and a capacitor 233 having a capacitance 1C. Between the input and output of the amplifier circuit 235, a capacitor 236 having a capacitance 1C is provided for setting of feedback gain. The capacitors 233, 234, and 236, and switches 242 and 246, provided on the input side and between the input and output of the amplifier circuit 235, form a gain setting unit 245 according to the present invention. The amplifier circuit 235 and the gain setting unit 245 form the pixel-signal amplifier 230, which is an example of variable-gain amplifier circuit. The pixel-signal amplifier 230, together with a controller for controlling gain setting by the gain setting unit 245, forms a PGA circuit.

The output of the amplifier circuit 235 is connected to the column circuit 63, and is also connected to the input of the pixel-signal detector 210. The switch 246 receives a control signal φ1 and the switch 242 receives a control signal φ2 via the control line 231 of the control-signal generator 46.

The capacitor 232 on the input side is connected to the amplifier circuit 235 via the switch 242. In the first example construction, the switch 242 is provided between a subsequent stage of the capacitor 232 having a capacitance 7C and the input of the amplifier circuit 235.

The output of the amplifier circuit 235 is input to the column circuit 63, and is also input to the pixel-signal detector 210. The pixel-signal detector 210 checks the level of the output signal of the amplifier circuit 235, and reflects the result to final gain setting of the amplifier circuit 235.

In the arrangement described above, as shown in FIG. 11B, the switch 246 is turned on and the capacitor 236 is reset by the control signal φ1, whereby the amp is reset (t60 to t63). Furthermore, in this period, the switch 242 is turned on and the capacitor 232 is reset by the control signal φ2 (t61 to t62).

That is, first, a reset level from a unit pixel 103 is sampled by a capacitor having a capacitance 8C (7C+1C) formed by the capacitors 232 and 233 of the noise canceling amp implemented by a switched-capacitor circuit (t61 to t62). Then, the switch 242 is turned off by the control signal φ2 so that the input capacitor 232 is disconnected from the vertical signal line 158 (t62).

Then, a transfer control pulse TX to the transfer gate line 151 of the imaging unit 110 is pulled to "H" so that charges generated by the charge generator 132 are transferred to the floating diffusion region 138. Thus, a pixel signal Vsig corresponding to the amount of light received by the charge generator 132 appears in the output of the imaging unit 110 on the vertical signal line 158 (t64a to t64b).

Thus, after the amp is reset (t63), the pixel signal Vsig from the vertical signal line 158 is sampled by the capacitors 233 and 232 of the switched-capacitor circuit on the input side. Since the reset level is sampled in advance (t61 to t62), the amplifier circuit 235 outputs a result of amplifying a difference ΔV between the reset level Vrst and the signal level Vsig0 of the input pixel signal Vsig by a predetermined gain.

At this time, in a parallel circuit of the capacitor 233 having a capacitance C1 and the capacitor 232 having a capacitance 7C, provided on the input side of the amplifier 235, the switch 242 is controlled by the control signal φ2 to set a gain of ×8 (when the switch 242 is ON) or ×1 (when the switch 242 is OFF) for the amplifier circuit 235. Thus, it is possible to adjust gain by adjusting capacitance by controlling the switch 242 according to the control signal φ2.

For example, at a specific timing in a period when the control signal φ2 is at "L" and the switch 242 is OFF (t63 to t66), the pixel-signal detector 210 detects an output signal with a gain of ×1, output from the amplifier circuit 235 (t65). Furthermore, at a specific timing in a period when the control signal φ2 is at "H" and the switch 242 is ON (t66 to t68), the pixel-signal detector 210 detects an output signal with a gain of ×8, output from the amplifier circuit 235 (t67).

The pixel-signal detector 210 performs comparison for the output results of the respective gains, and outputs classification signals Vsepa representing the results by one-bit data. For example, a 1-bit classification signal Vsepa is supplied directly to the pixel-signal amplifier 230, and ×1 gain is used when the signal is high while ×8 gain is used when the signal is low. At this time, a signal with a high gain is output only when it is determined by the comparison with gain adjustment that the dynamic range is not exceeded even with a high gain up to the output of the amplifier circuit 235. When saturation occurs, a high gain is not set. Thus, a maximum gain can be chosen within the limit of the dynamic range of an individual imaging device without exceeding the signal saturation level.

Accordingly, compared with a fourth example construction described later, in which gain is switched by switching capacitance between the input and output of the amplifier circuit 235, advantageously, a switch that is controlled by inverted pulses is not needed.

FIG. 12 is a diagram showing another example construction of the pixel-signal amplifier 230 and peripheral parts in the first and third embodiments (hereinafter referred to as a second example construction), and operation thereof. Also in the second example construction, switches 242 and 246 are provided to implement a switched-capacitor column amp.

Figure 12A:
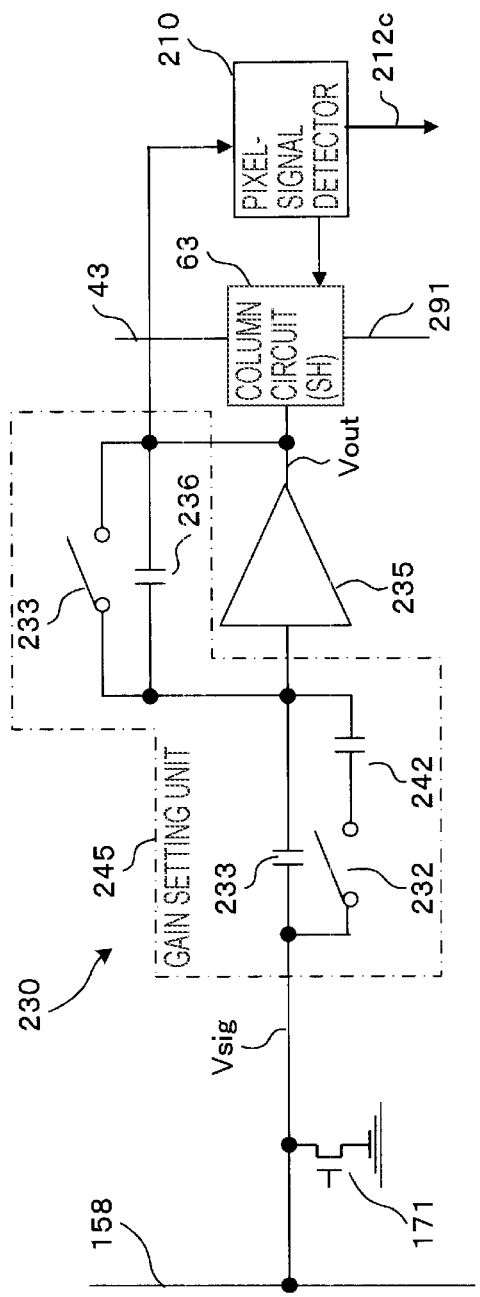
FIGS. 12A and 12B are diagrams showing a second example of the construction and operation of a pixel-signal amplifier and peripheral parts in the first and third embodiments.
Figure 12B:
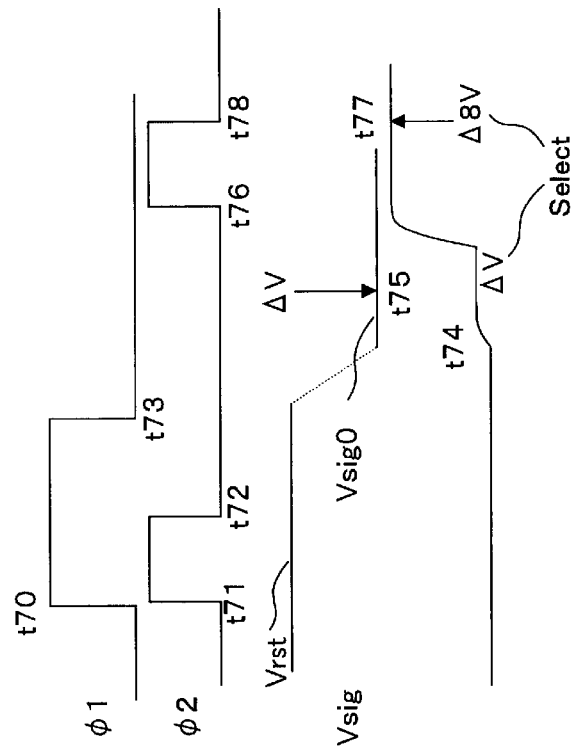

As shown in FIG. 12A, in the second example construction, the switch 242 is provided between a previous stage of the capacitor 232 having a capacitance 7C and the vertical signal line 158. Similarly to the first example construction, a gain setting unit 245 according to the present invention is formed by the capacitors 233, 234, and 236 and the switches 242 and 246, provided on the input side and between the input and output of the amplifier circuit 235. The operation timing is the same as that of the first example construction, as shown in FIG. 12B.

Accordingly, compared with the first example construction in which the switch 242 is provided at a subsequent stage of the capacitor 232 having a capacitance 7C, advantageously, the capacitor 232 that is switched does not cause coupling effect on the signal on the vertical signal line 158.

FIGS. 13A and 13B are diagrams showing another example construction of the pixel-signal amplifier 230 and peripheral parts in the first and third embodiments (hereinafter referred to as a third example construction), and operation thereof. The third example construction is also implemented using a switched-capacitor column amp, and is characterized in that switching of both of the two capacitors 232 and 233 provided on the input side of the amplifier circuit 235 is allowed, and in that switches are provided on both ends of each of the two capacitors 232 and 233.

More specifically, in the third example construction, as shown in FIG. 13A, a switch 242a that operates according to a control signal φ2_ (substantially the same as the control signal φ2) is provided on the input side of the capacitor 232 having a capacitance 7C, and a switch 242b that operates according to the control signal φ2 is provided on the output side of the capacitor 232 (i.e., on the input side of the amplifier circuit 235).

Furthermore, a switch 243a that operates according to a control signal φ3_ (substantially the same as the control signal φ3) is provided on the input side of the capacitor 233 having a capacitance 1C, and a switch 243b that operates according to the control signal φ3 is provided on the output side of the capacitor 233 (i.e., on the input side of the amplifier circuit 235).

A gain setting unit 245 according to the present invention is formed by the capacitors 233, 234, and 236 and the switches 242a, 242b, 243a, 243b, and 246 provided on the input side and between the input and output of the amplifier circuit 235.

In the arrangement described above, as shown in FIG. 13B, the switch 246 is turned on and the capacitor 236 is reset according to the control signal φ1, whereby the amp is reset (t80 to t83). Furthermore, in this period, the switches 242a, 242b, 243a, and 243b are turned on according to the control signals φ2, φ2_, φ3, and φ3_, whereby the capacitors 232 and 233 are reset. That is, a reset level from a unit pixel 103 is sampled by a capacitor having a capacitance 8C (7C+1C), formed by the capacitors 232 and 233 of the noise canceling amp implemented by a switched capacitor circuit (t81 to t82). Then, the switches 242a and 242b are turned off according to the control signals φ2 and φ2_, whereby the input capacitor 232 is disconnected from the vertical signal line 158 (t82).

After the amp is reset (t83), if the switches 242a, 242b, 243a, and 243b are ON, the input capacitors 232 and 233 are charged by the pixel signal Vsig from the vertical signal line 158, so that the output of the amplifier circuit 235 changes.

Thus, after the amp is reset (t83), the pixel-signal amplifier 230 maintains the control signals φ3 and φ3_ turned on (t83 to t86), and samples the pixel signal Vsig from the vertical signal line 158 by the input capacitor 233 of the noise canceling amp implemented by a switched-capacitor circuit. Since the reset level is sampled in advance (t81 to t82), the amplifier circuit 235 outputs a result of amplifying a difference ΔV between a reset level Vrst and a signal level Vsig0 in the input pixel signal Vsig by a gain of ×1, i.e., outputs ΔV. The pixel-signal detector 210 detects an output signal Vout of the pixel-signal amplifier 230, obtained by amplifying ΔV by a gain of ×1, at a specific timing (t85).

Then, the switches 243a and 243b are turned off according to the control signals φ3 and φ3_, whereby the input capacitor 233 is disconnected from the vertical signal line 158 (t86). Then, the switch 246 is turned on according to the control signal φ1 to reset the amp (t86 to t87). Then, the switches 242a and 242b are turned on according to the control signals φ2 and φ2_ (t87 to t89), whereby the pixel signal Vsig from the vertical signal line 158 is sampled by the input capacitor 233 of the noise canceling amp implemented by the switched-capacitor circuit. Since the reset level is sampled in advance (t81 to t82), the amplifier circuit 235 outputs a result of amplifying a difference ΔV between a reset level Vrst and a signal level VisgO in the input pixel signal Vsig by a gain of ×8, i.e., outputs 8ΔV. The pixel-signal amplifier 210 detects an output signal Vout of the pixel-signal amplifier 230, obtained by amplifying ΔV by a gain of ×8, at a specific timing (t88).

The pixel-signal detector 210 performs comparison of the output results for the respective gains, and outputs classification signals Vsepa representing the results in 1-bit data. For example, a 1-bit classification signal Vsepa is directly supplied to the pixel-signal amplifier 230, and a gain of ×1 is used when the signal is high while a gain of ×8 is used when the signal is low. If it is determined that the dynamic range up to the output of the amplifier 235 is not exceeded even with a high gain (×8 in this example), a signal is output with a high gain. If saturation is to occur, a high gain is not chosen. Thus, an optimal signal is output without causing saturation of the amplifier circuit 235.

According to the third example construction, similarly to the second example construction, advantageously, the capacitors 232 and 233 that are switched do not cause coupling effect on the signal on the vertical signal line 158.

Figure 14:
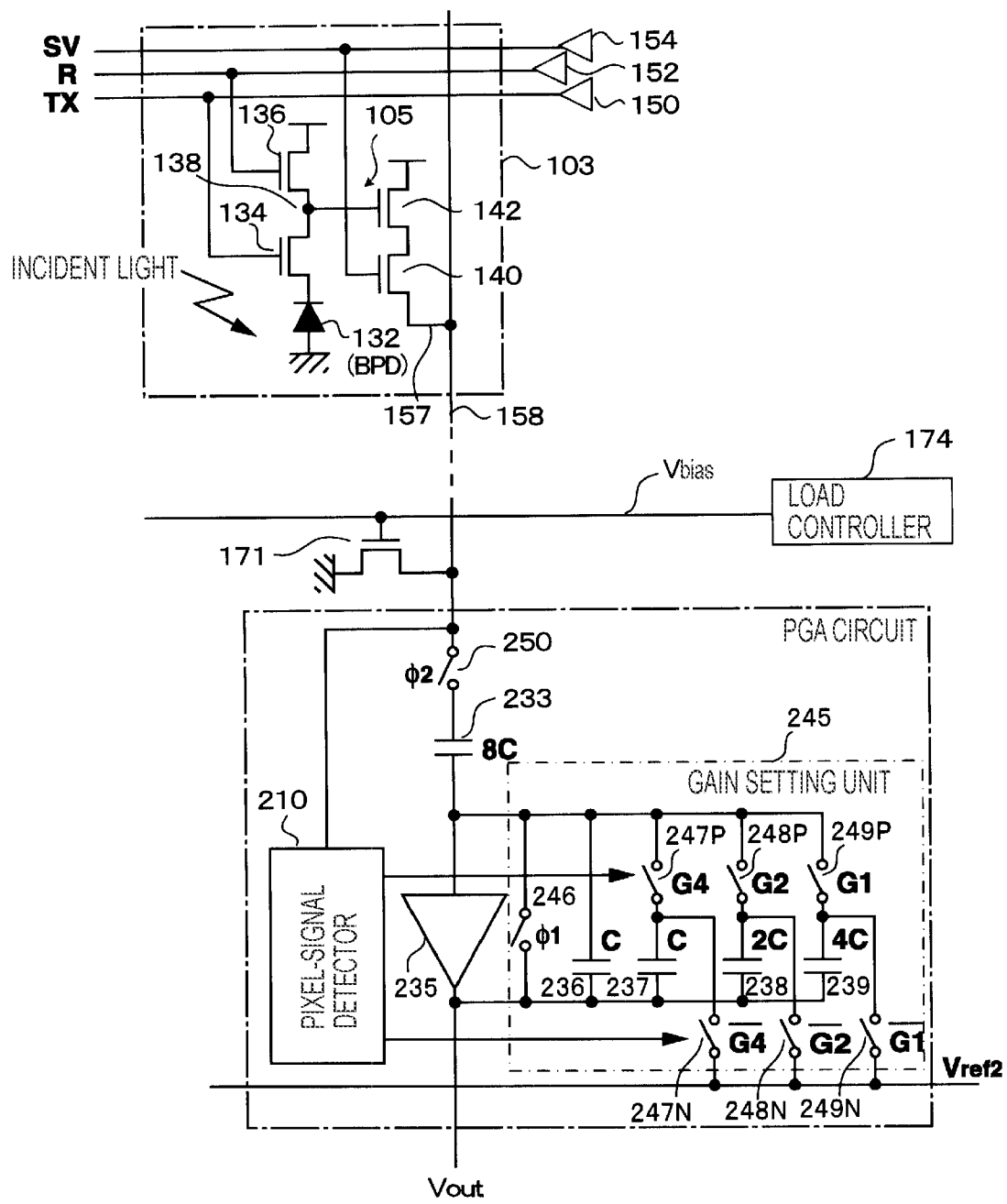
FIG. 14 is a diagram showing an example of the construction and operation of the pixel-signal amplifier and peripheral parts in the second and fourth embodiments.

FIG. 14 is a diagram showing an example construction of the pixel-signal amplifier 230 and peripheral parts in the second and fourth embodiments (hereinafter referred to as a fourth example construction), and operation thereof. The fourth example construction is also implemented using a switched-capacitor column amp. In FIG. 14, an example construction of the unit pixel 103 is also shown. The pixel-signal detector 210 has a function of a controller for controlling gain setting of the pixel-signal amplifier 230. The pixel-signal detector 210, the pixel-signal amplifier 230, and the gain setting unit 245 form a PGA circuit.

The unit pixel 103 is implemented by a 4TR arrangement including four transistors, using the floating diffusion region 138 as a charge accumulator. In the 4TR arrangement, the floating diffusion region 138 is connected to the gate of the amplifying transistor 142, so that the amplifying transistor 142 outputs a signal corresponding to the potential of the floating diffusion region 138 (hereinafter referred to as an FD potential) to the vertical signal line 158, which is an example of a signal reading line, via a pixel line 157. Furthermore, a load MOS transistor 171 is connected to the vertical signal line 158, so that operation of a source-follower circuit is achieved.

For example, when a pixel signal is read, first, the floating diffusion region 138 is reset by the reset transistor 136. Then, the read-select transistor (transferring transistor) 134 transfers signal charges generated by the charge generator 132 implemented by a photodiode or the like to the floating diffusion region 138. In order to select a pixel from a plurality of pixels connected to the vertical signal lines 158, the vertical-select transistor 140 for the pixel to be selected is turned on. Then, only the selected pixel is connected to a vertical signal line 158, and a signal of the selected pixel is output to the vertical signal line 158.

By the operation described above, due to the bootstrap effect, the potential of the floating diffusion region 138 increases, so that the amplitude of output voltage increases. Since the unit pixel 103 is provided with the amplifying transistor 142, the solid-state imaging unit 2 (or the solid-state imaging device 10) is implemented as an amplifying solid-state imaging unit.

The unit pixel 103 is not limited to the 4TR arrangement described above, and may be a 4TR arrangement in which the vertical-select transistor 140 is connected to the drain of the amplifying transistor 142. Furthermore, without limitation to a 4TR arrangement, the unit pixel 103 may be implemented using three transistors (hereinafter referred to as a 3TR arrangement) so that the pixel size will be smaller, as disclosed, for example, in Japanese Patent Publication No. 2708455.

In the fourth example construction, the vertical signal line 158 is connected to the pixel-signal detector 210, and is connected to the amplifier circuit 235 via the switch 250 controlled according to the control signal φ2 and the capacitor 233 having a capacitance 8C.

Between the input and output of the amplifier circuit 235, a capacitor 236 having a capacitance 1C is provided for setting of a feedback gain. In parallel with the capacitor 236, a capacitor 237 having a capacitance 1C is provided via a switch 247P controlled according to a bit control signal G4 from the pixel-signal detector 210, a capacitor 238 having a capacitance 2C is provided via a switch 248P controlled according to a bit control signal G2, and a capacitor 237 having a capacitance 4C is provided via a switch 249P controlled according to a bit control signal G1.

A node between the switch 247P and the capacitor 237 receives a reference voltage Vref2 from the control line 231 of the control-signal generator 46 via the switch 247N controlled according to a bit control signal /G4. A node between the switch 248P and the capacitor 238 receives the reference voltage Vref2 via the switch 248N controlled according to a bit control signal /G2. A node between the switch 249P and the capacitor 239 receives the reference voltage Vref2 via the switch 249N controlled according to a bit control signal /G1. Thus, the capacitance can be changed in a range of C to 8C by controlling the switches 247, 248P, and 249P.

Thus, in the column-amp pixel-signal amplifier 230, the gain can be changed in a range of ×1 to ×8 by the ratio of the capacitance 8C of the capacitor 233 to a capacitance in a range of C to 8C that depends on the connection status of the capacitors 237, 238, and 239.

A pixel signal Vsig is input from the input side of the switch 250 of the vertical signal line 158 to the pixel-signal detector 210. The pixel-signal detector 210 checks the input signal level of the amplifier circuit 235, and sets a final gain of the amplifier 235 accordingly. The pixel-signal detector 210 and the amplifier circuit 235, together with a controller for controlling gain setting, form a programmable-gain-control (PGA) amplifier circuit.

In the arrangement described above, as shown in FIG. 4, the switches 250 and 246 are first turned on according to the control signals φ1 and φ2 (t10 to t12), and a reset level of the unit pixel 103 is sampled by the capacitor 233 having a capacitance 8C on the input side of the noise canceling amp implemented by a switched-capacitor circuit (t11 to t12). Then, the switch 250 is turned off by the control signal φ2, whereby the input capacitor 233 is disconnected from the vertical signal line 158 (t12).

Then, the transfer control pulse TX to the transfer gate line 151 of the imaging unit 110 is pulled to "H", whereby charges generated by the charge generator 132 are transferred to the floating diffusion region 138. Thus, a pixel signal Vsig corresponding to the amount of light received by the charge generator 132 appears on the vertical signal line 158 carrying the output of the imaging unit 110 (t12 to t13).

Thus, the pixel signal Vsig output from the imaging unit 110 is input to the pixel-signal detector 210 to detect the level of the signal on the vertical signal line 158. That is, the pixel-signal detector 210 compares the level of the pixel signal Vsig on the vertical signal line 158 with predetermined threshold values while controlling the switches 247P, 248P, and 249P by the bit controlling signals G4, G2, and G1 (t14 to t21).

Based on the results of the comparison, the pixel-signal detector 210 determines a maximum gain within a range where the output signal Vout of the pixel-signal amplifier 230 does not exceed the signal saturation level of the vertical signal line 158, and sets the gain in the pixel-signal amplifier 230. Alternatively, the pixel-signal detector 210 outputs the results of the comparison to the control-signal generator 46 or to the outside of the chip.

If the gain is not set within the range where the signal saturation level of the vertical signal line 158 is not exceeded, the pixel-signal amplifier 230 attempts to amplify the signal above the signal saturation level. Thus, the output exceeds the signal saturation level, so that the resulting picture becomes corrupted. This problem can be avoided by setting a gain so that the range of amplified signal does not exceed the signal saturation level of the vertical signal line 158.

By employing the method described above, the amount of input-referred noise that could occur in the pixel-signal amplifier 230 is minimized. Furthermore, the output signal Vout is amplified individually for each unit pixel 103 so as to be closer to the signal saturation level. This is advantageous to suppress the effect of noise that could occur subsequently.

Although several example constructions of the pixel-signal amplifier 230 have been described above, the constructions described above are only examples, and various modifications are possible. For example, although only a single line of gain switching is provided in the first to third examples, without limitation thereto, three lines of gain switching, or more than three lines of gains switching, may be provided, similarly to the fourth example construction.

Furthermore, although the first to fourth example constructions are implemented using a noise canceling amp implemented by a switched-capacitor circuit and gain is changed by a capacitance ratio, without limitation thereto, gain may be changed by a resistance ratio.

As described in relation to the first to fourth example constructions, when the pixel-signal amplifier 230 is implemented using a switched-capacitor noise canceling amp, as will be understood from the above description, the pixel-signal amplifier 230 operates so as to amplify a difference ΔV between a reset level Vrst and a signal level Vsig0 of a pixel signal Vsig immediately after a reset. Thus, by the effect of correlated double sampling, a fixed pattern noise (FPN) of the imaging unit 110 or a noise signal component referred to as a reset noise is canceled, and 1/f noise of the source follower circuits of the imaging unit 110 is reduced. Furthermore, the pixel-signal amplifier 230 constructed as described above has an advantage that DC output level does not tend to vary even when gain is adjusted. That is, the variable amplifier circuit (the pixel-signal amplifier 230) according to the first to fourth example construction, including the amplifier circuit 235 and the gain setting unit 245, has a function of an output-DC-level suppressing unit according to the present invention.

First Example of Gain Setting Method

Figure 15:
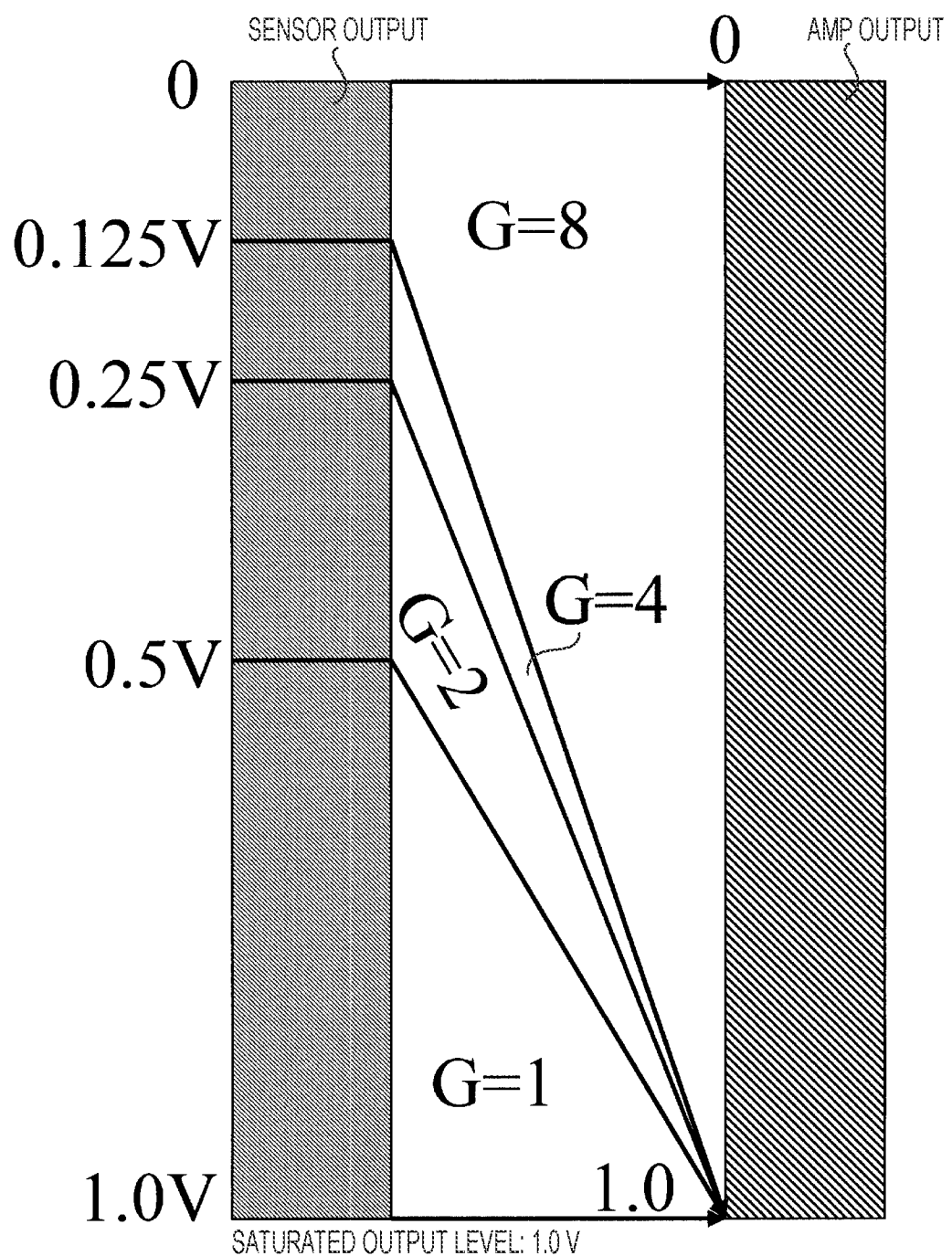
FIG. 15 is a diagram showing a first example method of gain setting in the pixel-signal amplifier shown in FIG. 14.

FIG. 15 is a diagram showing a first example method of gain setting in the pixel-signal amplifier 230 shown in FIG. 14. In the first example, the gain of the pixel-signal amplifier 230 is controlled based on powers of 2, such as 1 ($2^0$), 2 ($2^1$), 4 ($2^2$), and 8 ($2^3$) ("^" denotes a power of 2). Thus, the digital dynamic range of signal processing in the signal extending unit 310 can be controlled by shifting bits, so that the circuit construction can be simplified.

In the first example, it is assumed that the signal saturation level is 1 V, so that control is exercised so that the maximum gain is 1 V. For example, when the output signal on the vertical signal line 158 is 0 to 125 mV, the gain is set to be ×8. Then, even if the input signal is the maximum 125 mV, the output signal of the amplifier circuit 235 is 1 V. That is, when the signal is output to the outside of the column region unit (the pre-amplifier 61), the output signal is 1 V. When the input signal is greater than 125 mV and is less than or equal to 250 mV, a gain of ×4 is set to the pixel-signal amplifier 230. Similarly, when the input signal is greater than 250 mV and is less than or equal to 500 mV, a gain of ×2 is set to the pixel-signal amplifier 230. When the input signal is greater than 500 mV and is less than or equal to 1 V, a gain of ×1 is set to the pixel-signal amplifier 230.

In the first example, gain setting is controlled based on powers of 2 so that the maximum output of the pixel-signal amplifier 230 will be equal to the signal saturation level of the vertical signal line 158. Without limitation to the example, however, the maximum output the pixel-signal amplifier 230 is determined appropriately in accordance with the specifications of a solid-state imaging unit that is used. Obviously, however, the maximum output must be set within a dynamic range of the pixel-signal amplifier 230 (particularly the amplifier circuit 235).

As described above, in the first example, the gain of the pixel-signal amplifier 230 is set in accordance with the level of the pixel signal Vsig output from the imaging unit 110, setting a relatively high gain when the signal level is relatively small. Thus, it is possible to output pixel signals of large magnitudes to the outside, and to achieve a maximum S/N ratio regarding noise that could occur in the pixel-signal amplifier 230. Furthermore, S/N ratio is maximized when the signal level is small. This is important when implementing a solid-state imaging unit having a high sensitivity.

Second Example Method of Gain Setting

Figure 16:
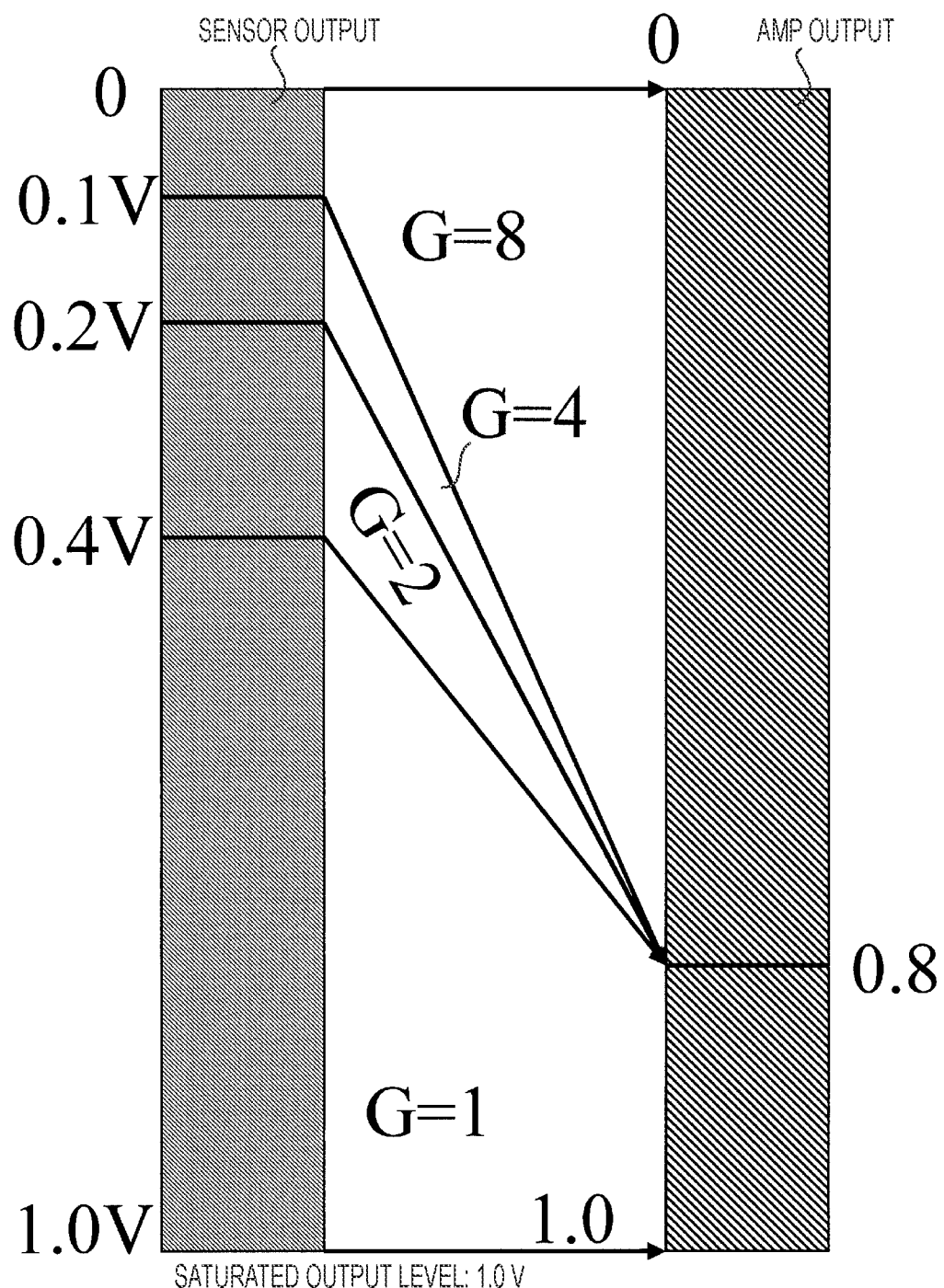
FIG. 16 is a diagram showing a second example method of gain setting in the pixel-signal amplifier shown in FIG. 14.

FIG. 16 is a diagram for explaining a second example method of gain setting in the pixel-signal amplifier 230 shown in FIG. 14. Also in the second example, the gain of the pixel-signal amplifier 230 is controlled by powers of 2.

In the second example, the signal saturation level is 1 V, similarly to the first example, but control is exercised so that the maximum signal level achieved by the maximum gain will be 800 mV. This is used when a sufficient margin is not provided for the dynamic range of the pixel-signal amplifier 230.

For example, when the output signal on the vertical signal line 158 is 0 to 100 mV, a gain of ×8 is set. Then, even when the input signal is the maximum 100 mV, the output signal of the amplifier circuit 235 is 800 mV. That is, when the signal is output to the outside of the column region unit (the pre-amplifier 61), the level of the signal is 800 mV. When the input signal is greater than 100 mV and is less than or equal to 200 mV, a gain of ×4 is set to the pixel-signal amplifier 230. Similarly, when the input signal is greater than 200 mV and is less than or equal to 400 mV, a gain of ×2 is set to the pixel-signal amplifier 230. When the input signal is greater than 400 mV and is less than or equal to 800 mV, a gain of ×1 is set to the pixel-signal amplifier 230.

As described above, also in the second example, the gain of the pixel-signal amplifier 230 is set in accordance with the level of a pixel signal Vsig output from the imaging unit 110, so that S/N ratio is maximized when the signal level is relatively small. That is, the pixel signal Vsig is less susceptible to the effect of the pixel-signal amplifier 230.

In the first and second examples of gain control, the gain of the pixel-signal amplifier 230 is selected from powers of 2 including ×1, ×2, ×4, and ×8. Alternatively, for example, by controlling the bit controlling signals G1, G2, and G4 as bit data via the control-signal generator 46, the gain can be set in a range of ×1 to ×8 by a smaller step size, for example, by a step size of 1. In that case, it is not possible to control the dynamic range of the signal extending unit 310 by bit shifting, so that some processing for calculation is needed and circuit construction becomes more complex. Furthermore, a gain larger than ×8 may be set. The range of gain setting is determined suitably in accordance with application or other factors.

Example Circuit Construction of Column Circuit and Peripheral Parts

Figure 17:
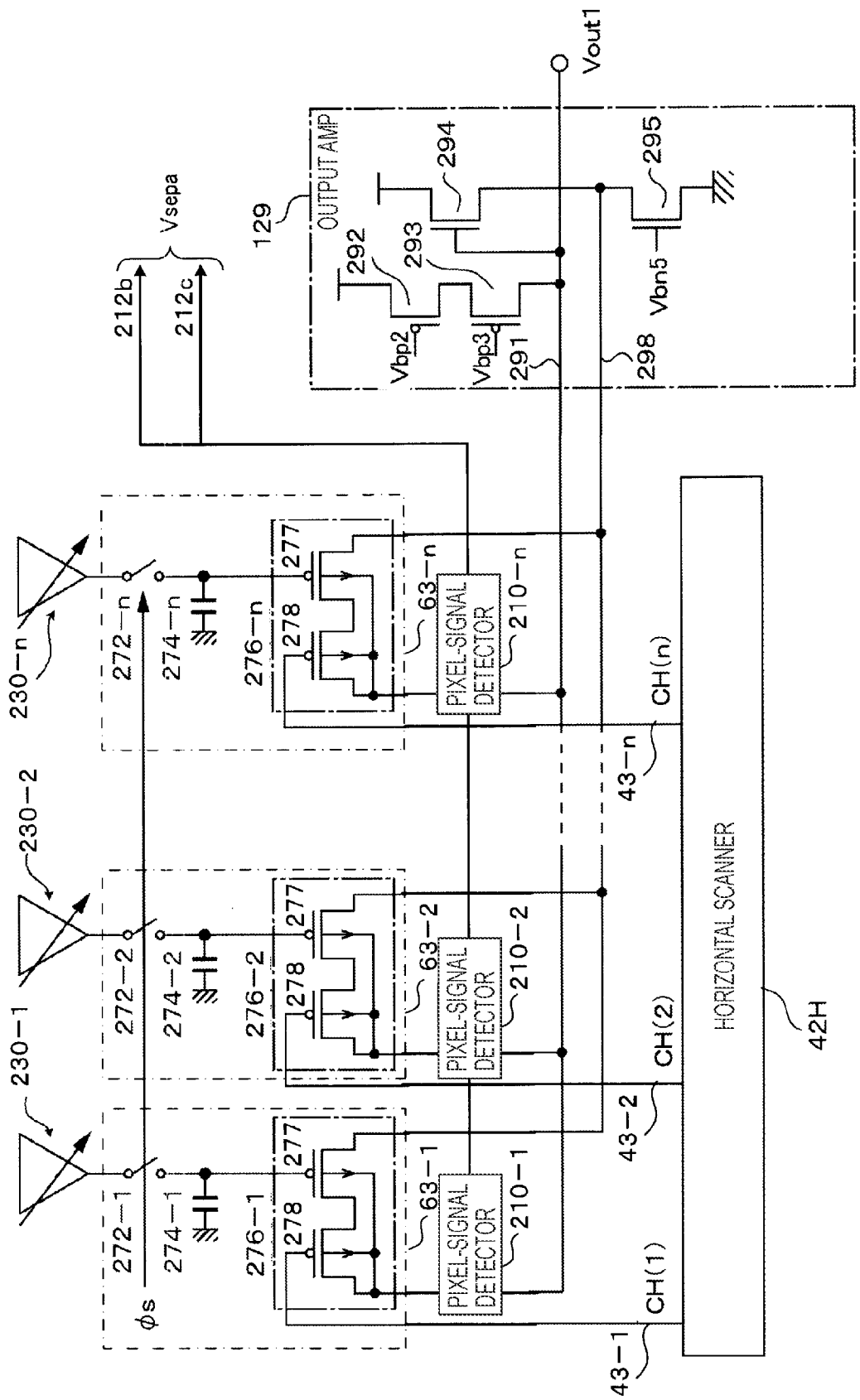
FIG. 17 is a block diagram showing a first example of the circuit construction of a column circuit and peripheral parts provided at a subsequent stage of a pixel-signal amplifier in a column region unit.

FIG. 17 is a block diagram showing a first example circuit construction of the column circuit 63 provided at a subsequent stage of the pixel-signal amplifier 230 of the column region unit (the pre-amplifier 61), and peripheral parts thereof. The first example relates to the first and third embodiment in which the pixel-signal detector 210 compares the signal voltage Vout with predetermined reference voltages on the output side of the pixel-signal amplifier 230.

The column circuits 63 are provided for the respective vertical signal lines 158 (columns). The column circuits 63 act as sample and hold circuit. That is, the column circuits 63 receive pixel signals Vsig of unit pixel 103 of one line, read through the vertical signal line 158, via the pixel-signal amplifiers 230, sequentially accumulate output signals Vout obtained by amplifying the pixel signals Vsig in the pixel-signal amplifiers 230, and outputs the output signals Vout to the output amp 129 at specific timing.

For example, the column circuits 63 (63-1, 63-2, . . . 63-n) include switches 272 (272-1, 272-2, . . . 272-n), capacitors 274 (274-1, 274-2, . . . 274-n) for accumulating signal charges, and reading circuits 276 (276-1, 276-2, . . . 276-n).

A reading circuits 276 (276-1, 276-2, . . . 276-n) includes transistors 277 and 278. The transistor 277 has a drain connected to a signal feedback line 298 of the output amp 129 commonly with other columns, and a source connected to the input of the pixel-signal detector 210. The output of the pixel-signal detector 210 is connected to the output signal line 291 commonly with other columns. A result of detection by the pixel-signal detector 210 is output to the control-signal generator 46 via the output line 212b, and to the outside of the chip via the output line 212c. In the first example construction, a function of setting gain to the pixel-signal amplifier 230 via the output line 212a is not provided.

Horizontal sampling pulses ϕs are input from the horizontal scanner 42H to the switches 272 (272-1, 272-2, . . . 272-n) via the control lines 43 (43-1, 43-2, . . . 43-n), and a horizontal select signal CH(i) is input to the gate of the transistor 288 of a pulse reading circuit 286.

The output amp 129, provided at a subsequent stage of the column circuit 63, includes two transistors 292 and 293 that are cascaded between the source and the drain, and two transistors 294 and 295 that are cascaded between the source and the drain.

The drain-source connection between the transistors 292 and 293 is provided between a power source and an output signal line 291. The gate of the transistor 294 is connected to the output signal line 291, and a node between the transistors 294 and 295 is connected to a signal feedback line 298. The gates of the transistors 292 and 293 receive control signals Vbp2 and Vbp3, respectively. The gate of the transistor 295 receives a control signal Vbn5.

In the arrangement described above, when the horizontal sampling pulse ϕs is input to the switch 272 (refer to FIG. 7) at a specific timing, an output signal Vout of the pixel-signal amplifier 230 is temporarily accumulated in the capacitor 274. Then, horizontal select signals CH(i) from the horizontal scanner 42H are applied to the transistors 278 to sequentially select lines to be read, so that pixel signals from the capacitors 274 are read as output signals Vout1 through the output signal lines 291 by the reading circuit 276 and the output amp 129 acting as an external amplifier circuit.

At this time, the pixel signal Vout1 on the output signal line 291 is input to the gate of the transistor 294, and is supplied to the drain of the transistor 277 via the signal feedback line 298. By the operation described above, due to the bootstrap effect, the amplitude of output voltage is increased. Since the pixel-signal amplifier 230 is disconnected from the column circuit 63 by the sample and hold circuit construction, the pixel-signal amplifier 230 is not affected by the bootstrap function.

Figure 18:
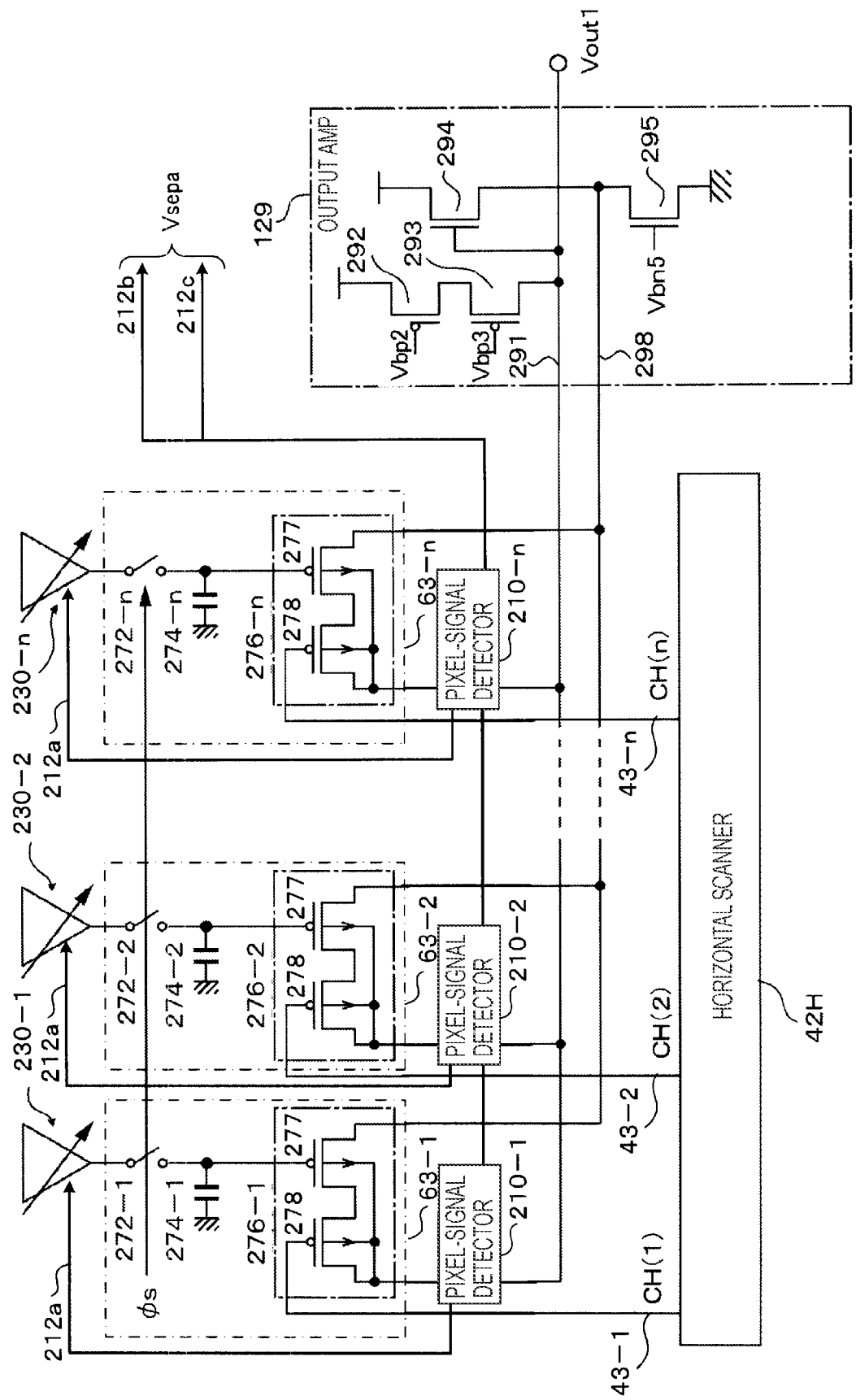
FIG. 18 is a block diagram showing a second example of the circuit construction of a column circuit and peripheral parts provided at a subsequent stage of a pixel-signal amplifier in a column region unit.

FIG. 18 is a block diagram showing a second example circuit construction of the column circuit 63 provided at a subsequent stage of the pixel-signal amplifier 230 of the column region unit (the pre-amplifier 61), and peripheral parts thereof. The second example also relates to the first and third embodiments in which the pixel-signal detector 210 compares a signal voltage Vout with predetermined reference voltages on the output side of the pixel-signal amplifier 230.

The second example is characterized in that a result of detection by the pixel-signal detector 210 is supplied to the pixel-signal amplifier 230 via the output line 212a so that a gain is set to the pixel-signal amplifier 230 based on the result of detection. For example, when a pixel signal Vout amplified by a gain exceeds the saturation level of the pixel-signal amplifier 230, control is exercised so that the gain is decreased.

Figure 19:
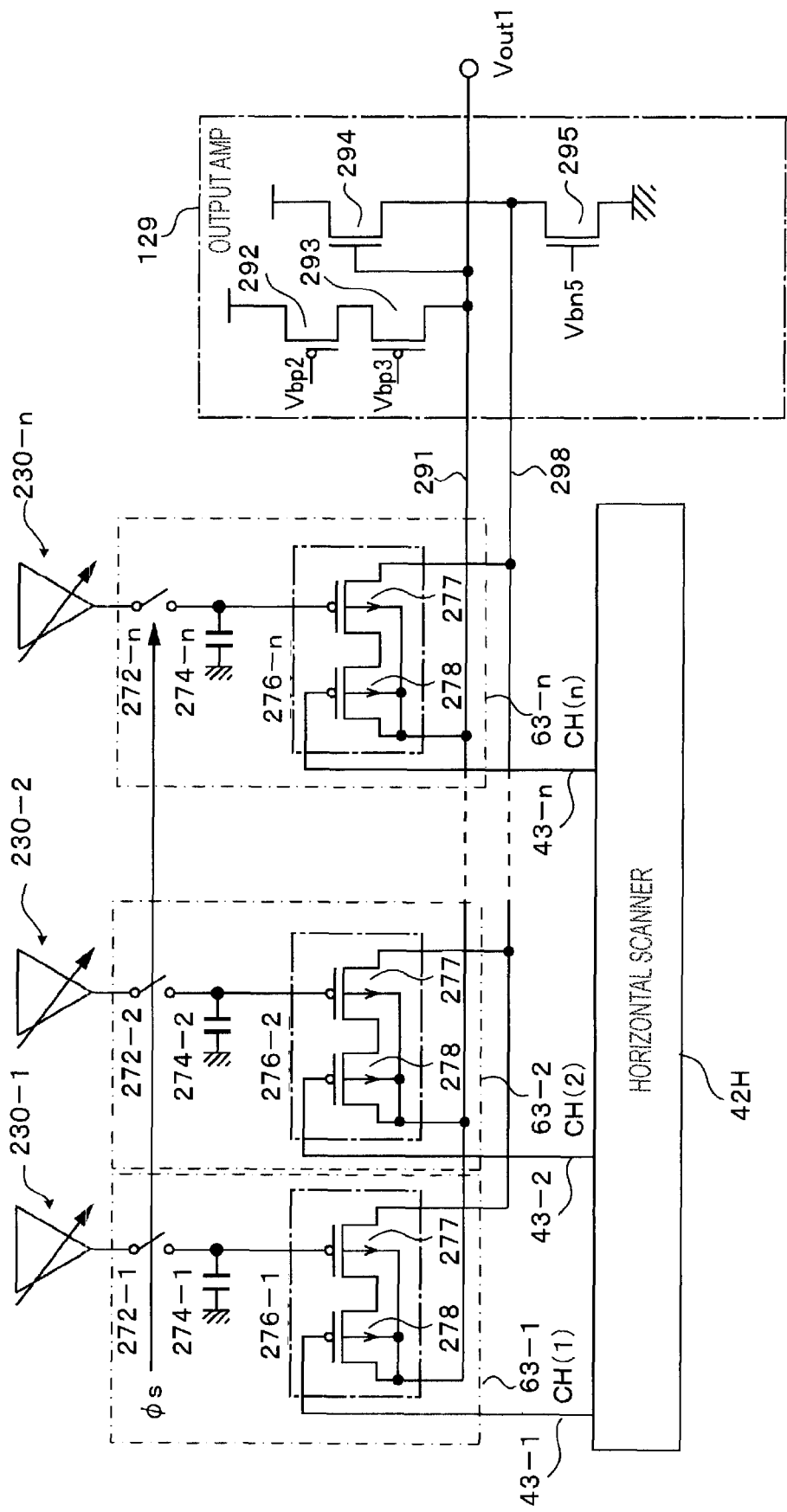
FIG. 19 is a block diagram showing a third example of the circuit construction of a column circuit and peripheral parts provided at a subsequent stage of a pixel-signal amplifier in a column region unit.

FIG. 19 is a block diagram showing a third example circuit construction of the column circuit 63 provided at a subsequent stage of the pixel-signal amplifier 230 of the column region unit (the pre-amplifier 61), and peripheral parts thereof. The third example relates to the second and fourth embodiments in which the pixel-signal detector 210 compares a signal voltage Vsig with predetermined reference voltages on the input side of the pixel-signal amplifier 230.

The third example differs from the first example only in that the pixel-signal detector 210 is removed. The source of the transistor 278 is connected to the output signal line 291 commonly with other columns. The basic operation is the same as that in the first example, so that detailed description thereof will be omitted.

Although the column circuit 63 in the first to third examples shown in FIGS. 17 to 19 are compact, when the gain of the pixel-signal amplifier 230 is adjusted, if variation of DC level occurs in the output thereof, the DC variation is accumulated in the capacitor 274 as well as the signal component. Thus, the DC variation is output as superposed on the imaging signal, so that the DC variation could cause noise. Therefore, the column circuits 63 in the first to third embodiments are preferably used in combination with a circuit in which the output DC level is not likely to vary even when the gain is adjusted, e.g., the switched-capacitor circuits shown in FIGS. 11 to 14.

The arrangement may be such that variation in DC level is removed from digital data in the A/D converter 64 connected at a subsequent stage of the column circuit 63 and the output amp 129. Alternatively, the column circuit 63 may have a function of suppressing variation in DC component of imaging signal output from the pixel-signal amplifier 230.

By suppressing variation in output DC level in the column circuit 63, a wide input dynamic range is provided in the A/D converter 64 provided at a subsequent stage. That is, when variation in output DC level is removed in the A/D converter 64 provided at a subsequent stage, A/D conversion is carried out on signals including variation in output DC level, so that the input dynamic range is narrowed by the amount of variation in output DC level.

Figure 20A:
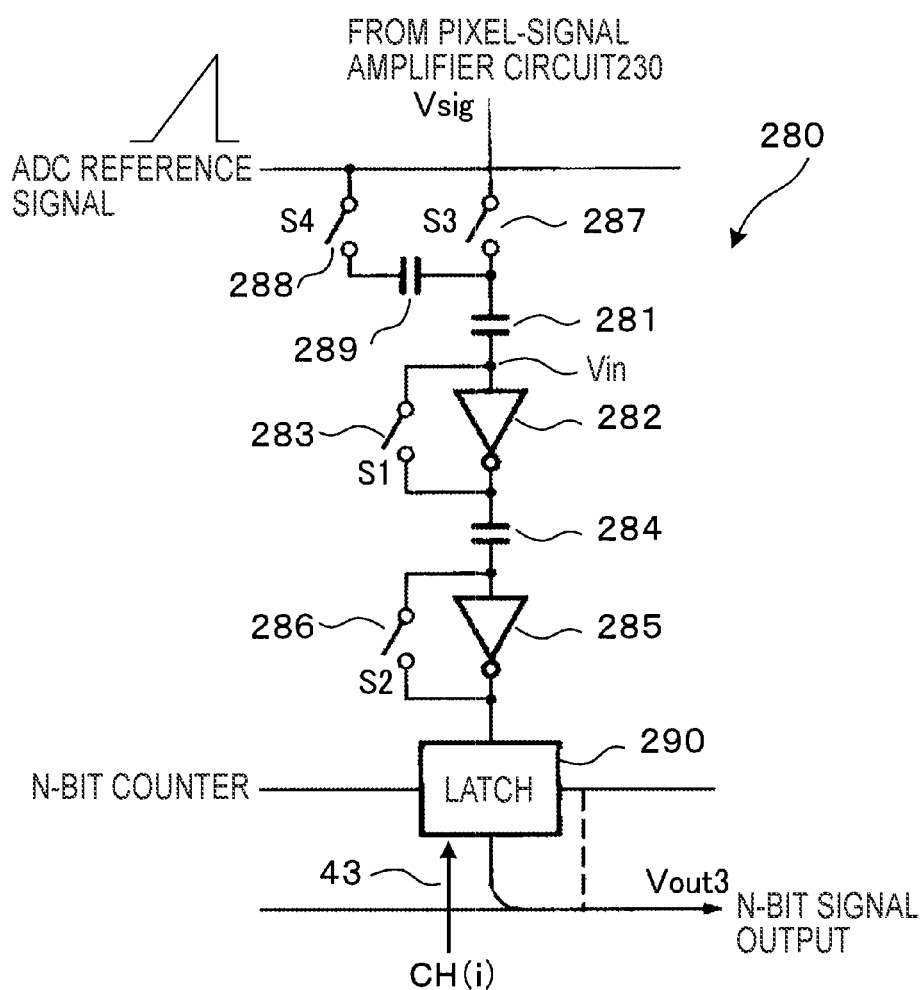

FIG. 20A is a block diagram showing an example circuit construction of a column circuit having a function of A/D conversion, i.e., a column ADC circuit 280, provided at a subsequent stage of the pixel-signal amplifier 230 of the column region unit (the pre-amplifier 61), and peripheral parts thereof. This will hereinafter be referred to as a fourth example of column circuit. The fourth example relates to the third and fourth embodiments.

The column ADC circuit 280 converts analog signals into digital signals while suppressing fixed pattern noise, using an A/D converter that processing signals from the vertical signal lines 158 (columns) in parallel. The column ADC circuit 280 is characterized by a method of clamping a reference signal for suppressing fixed pattern noise.

As shown in FIG. 20A, the column ADC circuit 280, in order to clamp a reset level in the pixel signal Vsig therein, is implemented by double clamping circuits including a first clamp circuit formed by a capacitor 281, an amp 282, and a switch 283 and including a second clamping circuit formed by a capacitor 284, an amp 285, and a switch 286.

On the input side of the double-clamping circuit, switches 287 and 288 and a capacitor 289 are provided to control sampling of pixel signals Vsig that appear on the vertical signal lines 158. The output of the second clamping circuit is input to the latch circuit 290 that is capable of holding data.

The switches 283, 286, 287, and 288 receive control pulses S1, S2, S3, and S4 from the horizontal scanner 42H via the control lines 43. One input terminal of the switch 288 receives a reference signal for AD conversion (hereinafter referred to as an ADC reference signal), having a ramp waveform, from a signal generator (not shown). The latch circuit 290 receives a counter output value of an N-bit counter (not shown).

In the arrangement of the column ADC circuit 280, in a pixel-signal reading period (t90 to t99) corresponding to a horizontal blanking period, a reset signal Vrst of a unit pixel 103 is output to the vertical signal line 158 in response to a reset pulse R (t91 to t92). Thus, the two clamping circuits of the column ADC circuit 280 perform coarse clamping and precise clamping according to control pulses S1 and S2 at operation timing shown in FIG. 20B.

More specifically, first, the switch 287 is turned on (t93), the switches 283 and 286 of the amps 282 and 286 are closed simultaneously (t94), and the switch 283 is opened (t95). Then, the pixel signal Vsig is clamped to a voltage obtained by adding variation of switching of the switch 283 to the threshold voltage of the amp 282. At this time, the switch 286 is kept closed, so that the voltage serves as an input threshold voltage of the amp 285.

When the switch 286 is opened (t96), the voltage including variation of switching is clamped. At this time, a component of variation of switching of the switch 286 divided by the gain of the amp 285 is reduced to variation of the input signal Vin, so that the precision of clamping as viewed from the input signal Vin is improved.

Thus, occurrence of fixed pattern noise that could occur in the clamping circuit is sufficiently suppressed. That is, clamping of the reset signal Vrst is finished while sufficiently suppressing variation of the clamping circuit.

Then, the transfer control pulse TX rises, so that the pixel signal Vsig0 appears on the vertical signal line 158 (t97a to t97b). Then, the switch 288 is closed to perform sampling (t98 to t99). When the sampling is finished, the switch 287 is opened so that the ramp-waveform ADC reference signal is supplied via the switch 288 (t99).

Thus, the input signal Vin eventually exceeds the threshold voltage of the clamping circuit in accordance with the ramp waveform, so that the output of the amp 285 is reversed. The counter value of the N-bit counter at this time serves as a pixel signal, which is stored in the latch circuit 290, and the A/D conversion is finished. Then, pixel data Vout3 stored in the latch circuit 290 is sequentially output to the outside of the column region unit (the pre-amplifier 61) or to the outside of the solid-state imaging device 10 by shift operations according to horizontal select signals CH(i) input from the horizontal scanner 42H via the control lines 43 at specific timing.

With the column ADC circuit constructed as described above, occurrence of fixed pattern noise is sufficiently suppressed, and variation in DC components of imaging signals output from the pixel-signal amplifier 230 is also suppressed. That is, the column ADC circuit 280 also has a function of an output DC level suppressing unit according to the present invention.

Example Construction of Signal Extending Unit

Figure 21A:
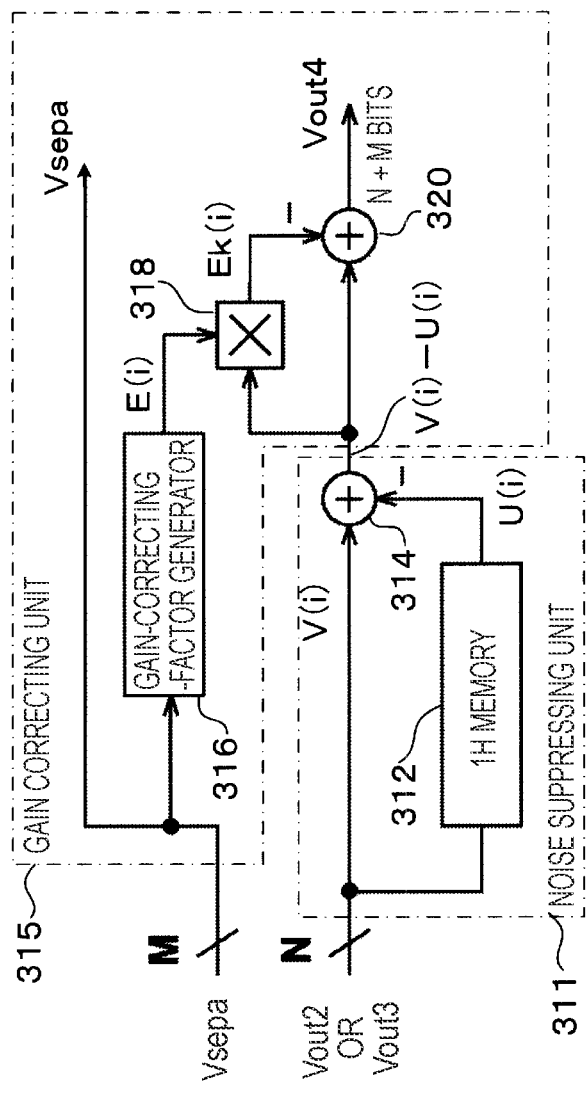
FIGS. 21A and 21B are diagrams showing an example construction of a signal extending unit.
Figure 21B:
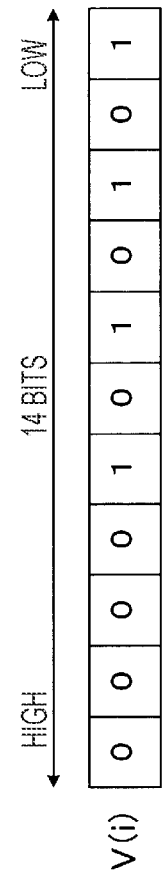

FIG. 21A is a diagram showing an example construction of the signal extending unit 310. The signal extending unit 310 includes a noise suppressing unit 311 and a gain correcting unit 315. The noise suppressing unit 311 suppresses noise included in an input N-bit signal V(j). The gain correcting unit 315 corrects a gain set to the pixel-signal amplifier 230, and extends the dynamic range of signals after noise suppression by the noise suppressing unit 311 with reference to an M-bit classification signal Vsepa obtained from the pixel-signal detector 210.

The noise suppressing unit 311 includes a 1H memory for holding an N-bit pixel signal V(j) in a horizontal period, and an adder 314 for adding together the pixel signal V(j) and an output signal U(j) of the 1H memory 312 (actually a subtraction is performed since −U(j) is input).

The gain correcting unit 315 includes a gain-correcting-factor generator 316, a multiplier 318, and an adder 320. The gain-correcting-factor generator 316 converts the M-bit classification signal Vsepa input from the pixel-signal detector 210 into a gain correcting factor. The multiplier 318 multiplies the gain correcting factor E(j) output from the gain-correcting-factor generator 316 by (V(j)−U(j)) output from the adder 314. The adder 320 adds together (V(j)−U(j)) output from the adder 314 and the output Ek(j) of the multiplier 318 (actually subtraction is performed since −Ek(j) is input).

In the arrangement described above, when the signal extending unit 310 is provided on the same chip as the solid-state imaging device 10, a column ADC circuit 280 is provided for each column as in the third and fourth embodiments, or an A/D converter 64 is mounted in a non-column region on the same chip. An output signal Vout from the pixel-signal amplifier 230 is converted into an N-bit digital signal by the on-chip A/D converter circuit, and the N-bit digital signal is input to the signal extending unit 310.

An output signal Vout1 of the output amp 129 in the first or second embodiment is converted into an N-bit digital signal Vout2 by the A/D converter 64, which is input to the signal extending unit 310 as digital data V(j). Alternatively, output data Vout3 of the column ADC circuit 280 in the third or fourth embodiment is input to the signal extending unit 310 as digital data V(j). Furthermore, an M-bit classification signal from the pixel-signal detector 210, corresponding to an N-bit pixel signal, is input to the gain-correcting-factor generator 108 at the same timing.

The noise suppressing unit 311 including the 1H memory 312 and the adder 314 cancels fixed pattern noise in the digital domain. The fixed pattern noise could occur due to variation in amp characteristics in column regions (particularly the amplifier circuits 235) including the pixel-signal detectors 210, the pixel-signal amplifiers 230, and the column circuits 63 provided for the respective columns. At this time, a column amp with a high gain, when combined with an A/D converter 64 having a high resolution, achieves a very high input referred resolution. Thus, noise is cancelled at a high precision, so that fixed pattern noise is considerably suppressed.

In the gain correcting unit 315, the gain-correcting-factor generator 316 converts the classification signal Vsepa into a gain correcting factor E(i). For example, if the classification Vsepa indicates a gain of ×8, the gain correcting factor E(i) is chosen to be "8".

Then, the multiplier 318 corrects the N-bit digital signal (V(j)−U(j)) by dividing it by the gain correcting factor E(i). The adder corrects (V(j)−U(j)) with the gain correcting factor Ek(i) to obtain an (N+M)-bit digital signal.

Accordingly, the N-bit amplified signals Vout2 and Vout3 from the pixel-signal amplifier 230 are extended by the number of bits of the gain setting represented by the classification signal Vsepa. In this example, the classification signal Vsepa corresponds one by one to the value of gain in the pixel-signal amplifier 230. Thus, the number of bits is increased to the sum of the number of bits M of the classification signal Vsepa and the number of bits N of the signal V(i).

For example, in the signal extending unit 310, when the gain is controlled based on powers of 2 and the maximum gain is ×8, an N-bit (e.g., 14-bit) signal is amplified by a gain of ×8 if gain setting of the pixel-signal amplifier 230 is ×1, and the N-bit signal is output as it is when the gain setting is ×8. That is, the N-bit signal is shifted to the lower side by three bits when the gain setting is ×8, and the N-bit signal is shifted to the higher side by three bits when the gain setting is ×1, whereby the digital dynamic range is extended by three bits as a whole.

When setting of a high gain is maintained in the pixel-signal amplifier 230 without correcting gain, for example, a signal of a region of low luminance is amplified by a gain of ×8, so that gain differs among regions over the screen (i.e., a gain mismatch occurs) and signal amplitudes are reversed. Thus, the gain of the pixel-signal amplifier 230 is corrected, for example, by reducing the signal level of the region amplified by the gain of ×8 to ⅛. When gain setting is based on powers of 2 as in this example, gain mismatch can be corrected by bit shifting operations, so that the circuit construction is simplified.

By the circuit architecture described above, a CMOS image sensor with which S/N ratio for signals of small levels is improved and with which a large digital dynamic range of (N+M) bits can be implemented. Compared with a case where only signal changes within N bits is allowed, digital signal processing is allowed within (M+N) bits, so that quantization noise is reduced and dynamic range is increased.

Thus, when processing such as auto exposure (AE), flicker correction, γ correction, shading correction, or color balancing is performed in the digital domain at a subsequent stage of the signal extending unit 310, S/N ratio is not degraded, so that images of high quality can be readily obtained.

Fifth Embodiment

FIG. 22 is a schematic diagram showing a fifth embodiment of the solid-state imaging unit 2 composed mainly of the CMOS solid-state imaging device 10, and peripheral parts thereof. Although FIG. 22 shows a modification of the third and fourth embodiments including the column ADC circuit 280, a similar modification is possible with the first and second embodiments including the column circuit 63 instead of the column ADC circuit 280. In the embodiment shown in FIG. 22, the solid-state imaging unit 2 is composed mainly of the imaging unit 110 and the pre-amplifier 61, and a signal processor 330 provided at a subsequent stage of the pre-amplifier 61 is formed on the same chip as the solid-state imaging unit 2 (the solid-state imaging device 10).

According to the first to fourth embodiments, the magnitude of a pixel signal Vsig is detected independently for each column of the column region unit (the pre-amplifier 61), and the result of detection is directly fed back to the pixel-signal amplifier 230 provided for each column, or is indirectly fed back via the control-signal generator 46 or a controller provided outside the chip, so that a gain is set independently for the magnitude of the pixel signal Vsig.

In contrast, according to the fifth embodiment, the pixel-signal detector 210 is not provided for columns, and gain is set to the pixel-signal amplifier 230 from outside of the chip. In this case, it is possible to detect the magnitude of a pixel signal at the outside of the chip, or to set a gain irrespective of the magnitude of a pixel signal without detecting the magnitude of the pixel signal. The following description will be directed mainly to differences from the first to fourth embodiments.

As shown in FIG. 22, in the fifth embodiment, the pixel-signal detector 210, which is provided in the first to fourth embodiments, is removed. The switching of the switch 250 is controlled via the control line 251 from the timing-signal generator 40 instead of the control line 251 from the control-signal generator 46.

The pre-amplifier includes the pixel-signal amplifiers 230 and the column ADC circuits 280 provided for the respective columns. The pixel-signal amplifiers 230 have a function of amplifying an input signal by a specified gain. The pixel-signal amplifiers 230 operate according to various control signals input from the control-signal generator 46 via the control lines 231. The ADC circuits 280 have a function of suppressing noise or suppressing DC variation and a function of holding data. The arrangements, functions, and operations of the pixel-signal amplifiers 230 and the column ADC circuits 280 are the same as those described in relation to the first to fourth embodiments. In the case of a modification of the first or second embodiment, although not shown, the column ADC circuits 280 are replaced with column circuits 63, and the pixel-signal amplifiers 230 are provided.

The pixel-signal amplifiers 230 of the respective columns are controlled by the control-signal generator 46 provided outside the column region unit (the pre-amplifier 61) so that the same amplification factor (i.e., gain) is used for one line. That is, the same gain setting is used for the magnitudes of pixel signals of one line, instead of setting optimal amplification factors independently for the respective pixels as in the first to fourth embodiments.

At a subsequent stage of the pre-amplifier 61, a signal processor 330 for performing noise canceling, gain-mismatch correction, extension of digital dynamic range, and so forth, on the imaging signals Vout3 input from the column ADC circuits 280, is provided.

Example Construction of Signal Extending Unit

Figure 23A:
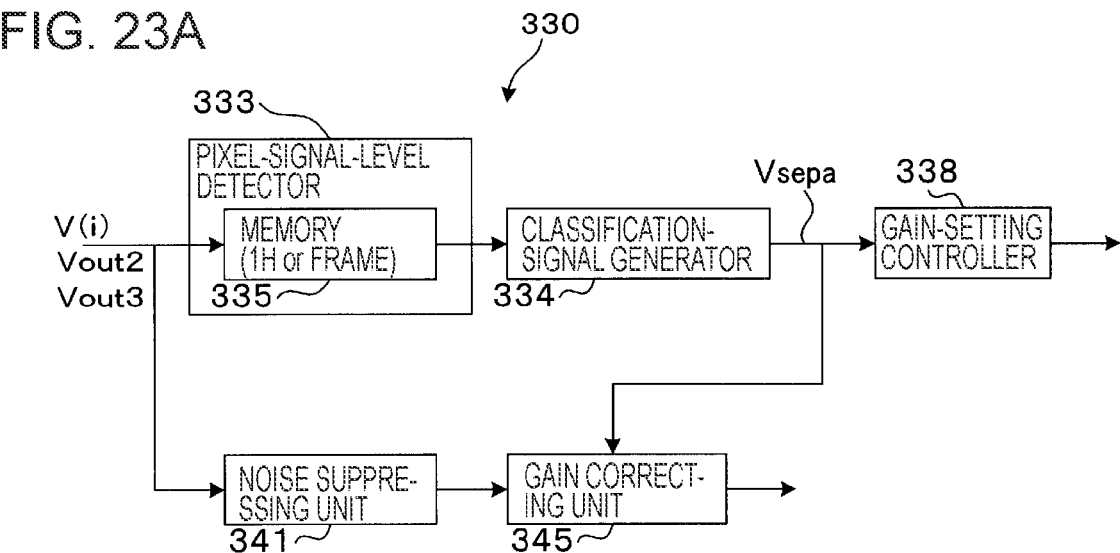
FIGS. 23A and 23B are diagrams showing example constructions of a signal processor in the fifth embodiment.
Figure 23B:
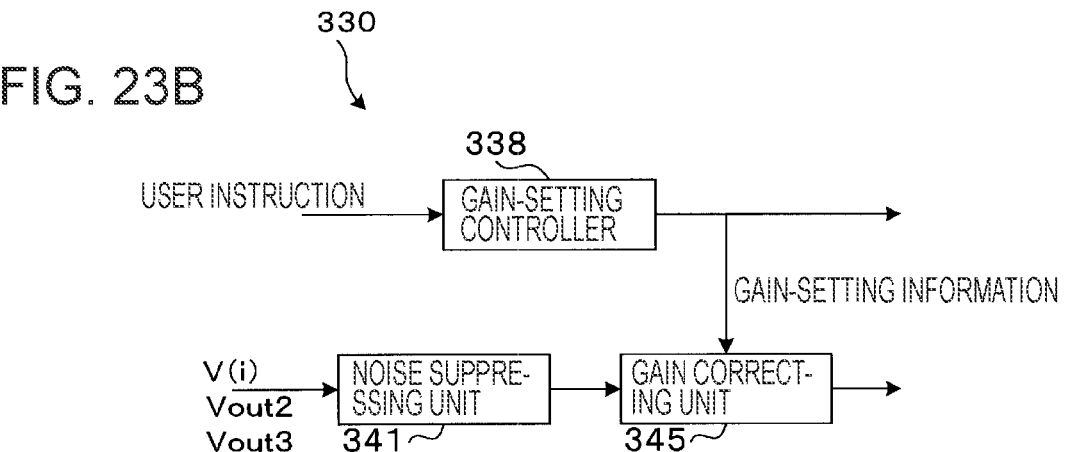

FIGS. 23A and 23B are diagrams showing example constructions of the signal processor 330 in the fifth embodiment. A first example of the signal processor 330, shown in FIG. 23A, detects the magnitude of a pixel signal at the outside of the chip, and controls gain setting with reference to the result of detection. That is, the signal processor 330 of the first example includes a pixel-signal-level detector 333 and a classification-signal generator 334. The pixel-signal-level detector 333 detects the magnitudes of signals of one line or one screen, and compares the magnitudes with predetermined thresholds. The classification-signal generator 334 generates classification signals Vsepa for classifying the magnitudes of the pixel signals Vsig based on the results of detection by the pixel-signal-level detectors 333.

The pixel-signal-level detector 333 includes a memory 335 for holding input pixel signals V(i) of one line or one screen (one frame). The pixel-signal-level detector 333 temporarily holds the pixel signals V(i) in the memory 335, and calculates a representative value Vrep of pixel data of one line or one screen. The representative value may be, for example, an average, a median, a mean value between a maximum value and a minimum value, or the like. Preferably, it is allowed to switch which of these values is to be used as the representative value depending on intended use of the system.

It is not necessary to precisely detect the signal level of each of the unit pixels 103, and it suffices to find an approximate signal level of one line or one screen. Therefore, it is not needed to increase the frequency bandwidth of the detecting amp. Since the detector circuit is provided outside the column region unit, the detector circuit does not cause noise in the pixel-signal amplifier 230, and flexibility of circuit design is increased. That is, when the pixel-signal detector 210 is provided on the same chip as the solid-state imaging device 10, chip size and noise must be considered in design. In contrast, when the pixel-signal-level detector 333 is provided outside of the chip, these issues need not be considered, so that flexibility in design is increased.

The pixel-signal-level 333 compares the representative value Vrep obtained as described above with predetermined threshold values. The classification-signal generator 334 generates a classification signal for classifying the magnitude of the representative value Vrep (i.e., the pixel signals Vsig of one line or one screen) based on the results of detection by the pixel-signal-level detector 213.

Then, the classification-signal generator 334, with reference to the classification signal Vsepa, controls gain setting of the pixel-signal amplifier 230 via the control-signal generator 46. That is, the classification-signal generator 334 has a function of a gain setting unit according to the present invention, which controls gain setting of the pixel-signal amplifier 230 from the outside of the chip. This is achieved by replacing the pixel signal Vsig by the representative value Vrep in the circuit arrangements shown in FIGS. 5 and 8. Alternatively, it is possible to provide a gain-setting controller 338 at a subsequent stage of the classification-signal generator 334 and to control the control-signal generator 46 via the gain-setting controller 336.

The gain is changed on a line-by-line basis when the representative value Vrep represents one line. For example, when the signal level of one line is smaller than a certain threshold value, the gain is changed during a horizontal blanking period.

When the representative value Vrep represents one screen, the gain is changed on a frame-by-frame basis (screen-by-screen basis). For example, when the signal level of the entire screen is smaller than a certain threshold, the gain is changed during a vertical blanking period.

Furthermore, the signal processor 330 of the first example includes a noise suppressing unit 341 and a gain correcting unit 345. The noise suppressing unit 341 suppresses noise included in an input N-bit signal V(j). The gain correcting unit 345 corrects a gain set to the pixel-signal amplifier 230, and extends the dynamic range of pixel signals supplied from the noise suppressing unit, with reference to the M-bit classification signal Vsepa obtained from the pixel-signal-level detector 333. The arrangements of these parts are the same as those in the arrangement of the signal extending unit 310 shown in FIG. 21A.

When gain setting is controlled on a line-by-line basis, gain is corrected on a line-by-line basis. When gain setting is controlled on a screen-by-screen (frame-by-frame basis), gain is corrected on a screen-by-screen (frame-by-frame basis).

FIG. 23B shows a second example of the signal processor 330, which does not include the pixel-signal-level detector 333 and the classification-signal generator 334 for detecting the magnitudes of pixel signal at the outside of the chip. Instead, the signal processor 330 of the second example includes a gain-setting controller 338 for controlling gain setting of the pixel-signal amplifier 230 from the outside of the column region unit via the control-signal generator 46.

Furthermore, the signal processor of the second example includes a noise suppressing unit 341 and a gain correcting unit 345. The noise suppressing unit 341 suppresses noise included in an input N-bit signal V(i). The gain correcting unit 345 corrects gain with reference to gain-setting information set by the gain-setting controller 338. The gain correcting unit 345 may be omitted. The arrangements of the noise suppressing unit 341 and the gain correcting processor 345 are the same as those in the signal extending unit 310 shown in FIG. 21A.

In the second example described above, a user instructs a desired brightness or gain to the gain-setting controller via a user interface (not shown) while checking the brightness of an image. Based on the instruction received, the gain-setting controller 338 controls gain setting as desired by the user. Accordingly, the brightness of the image can be controlled by controlling gain from the outside irrespective of the signal level.

In this case, gain is basically controlled on a frame-by-frame (screen-by-screen) basis. Actually, however, the user rarely changes gain setting at the frame rate, so that the processing can be considered as similar to processing for increasing or decreasing gain in an ordinary camera. Thus, the gain correcting unit 345 is not necessary in this case.

As described above, according to the fifth embodiment, the number of elements provided in the column region unit can be decreased. This is advantageous in reducing the chip size. Furthermore, noise is not caused in the pixel-signal amplifier 230 by the pixel-signal detector.

Noise Analysis

Figure 24:
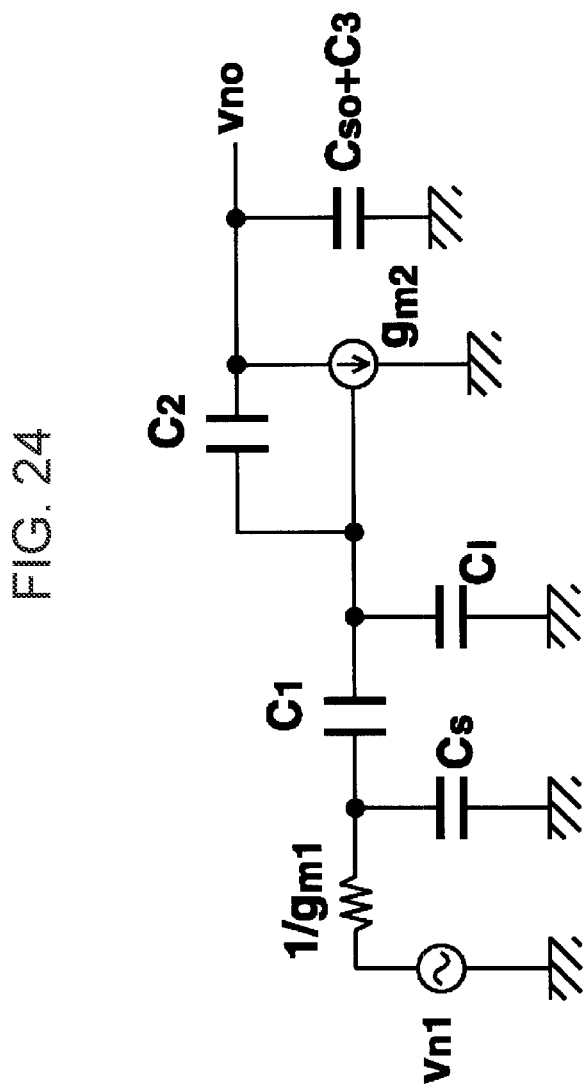
FIG. 24 is a diagram showing noise analysis in an equivalent circuit for calculating thermal noise caused by a pixel source-follower circuit.
Figure 25A:
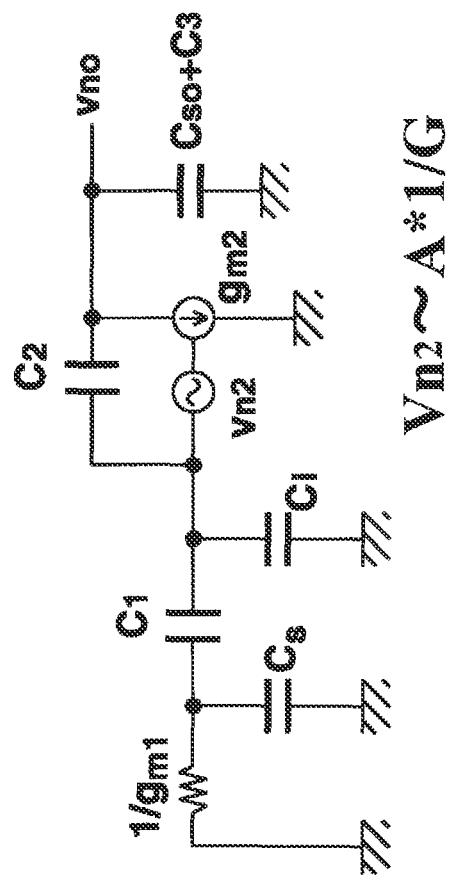
FIGS. 25A and 25B are diagrams showing noise analysis in an equivalent circuit for calculating noise that could be caused by a column amp.
Figure 25B:
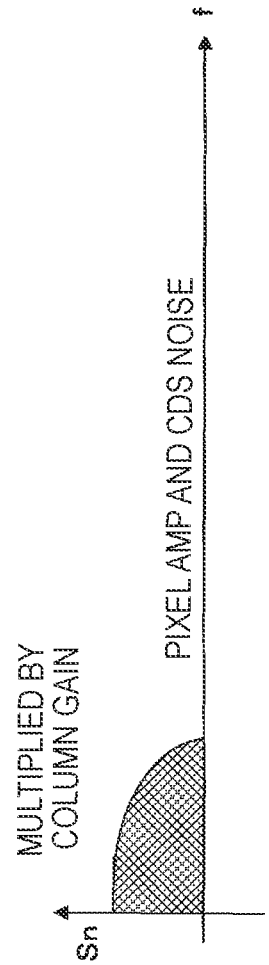
Figure 26:
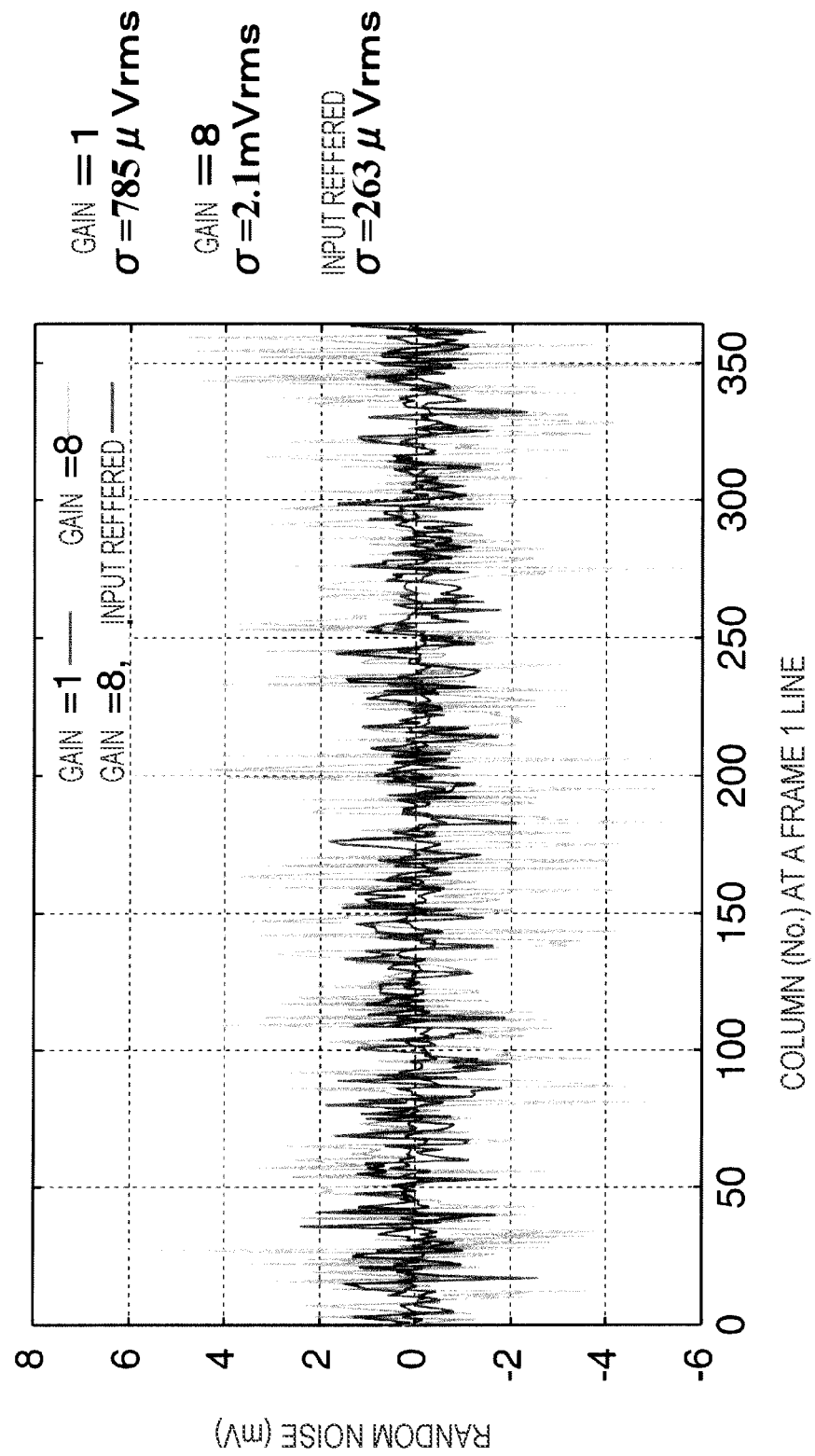
FIG. 26 is a diagram showing results of an experiment.
Figure 27:
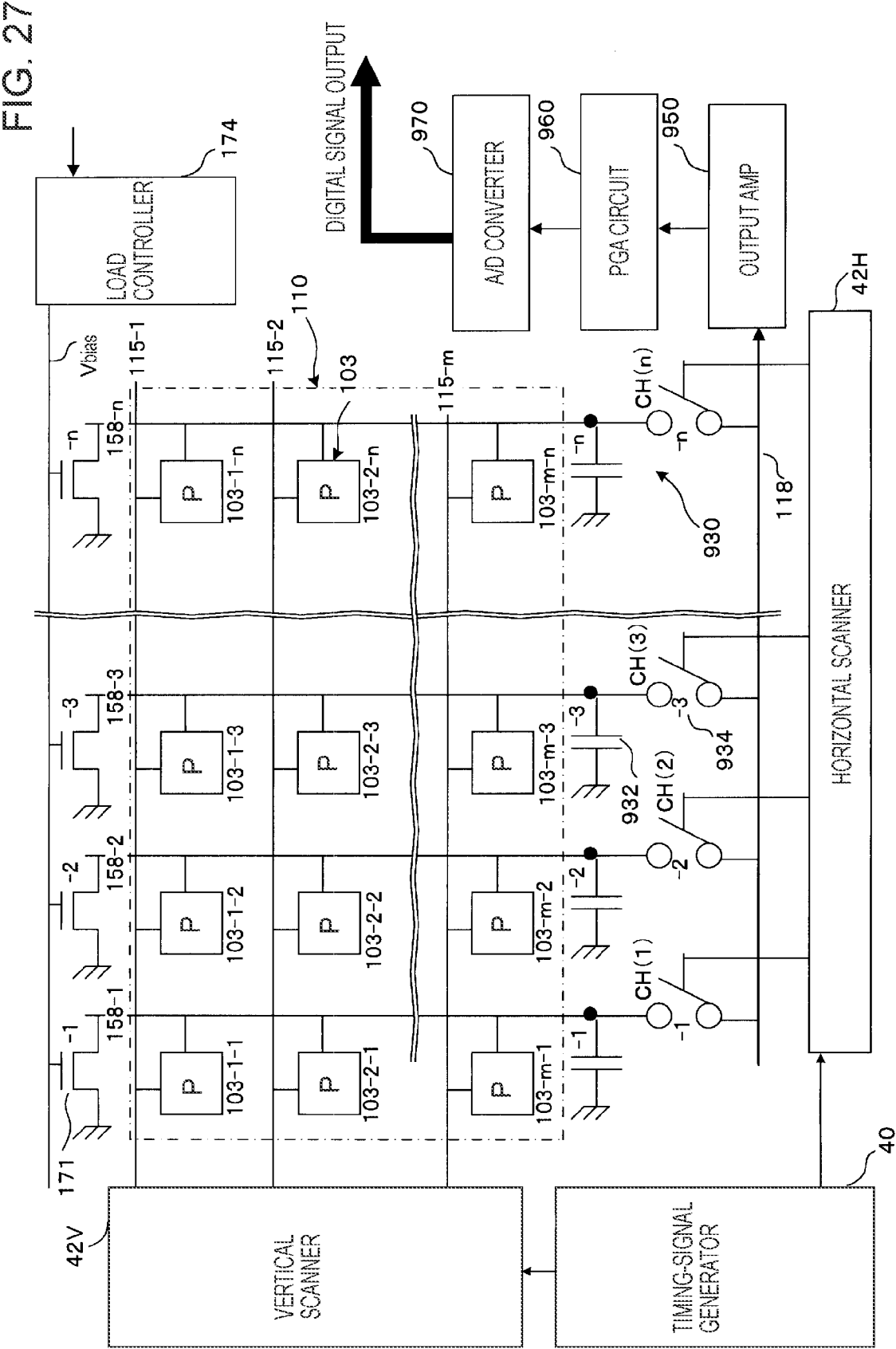
FIG. 27 is a diagram showing a column-based CMOS image sensor according to the related art.

FIGS. 24 to 26 are diagrams for explaining noise analysis in the noise canceling amp (column amp, or the pixel-signal amplifier 230) implemented by switched capacitors. FIG. 24 shows noise analysis in an equivalent circuit for calculating source-follower thermal noise of pixels. FIG. 25 shows noise analysis in an equivalent circuit for calculating noise that could occur from a column amp. FIG. 26 shows results of an experiment.

In analyzing noise, in addition to noise caused by the column amp, noise caused by the imaging unit 110 provided at a previous stage, and noise caused by the column circuit 63, the column ADC circuit 280, and the output circuit 129 provided at a subsequent stage must be considered.

For example, when amplification at a high gain is performed in the column amps, random noise that is superposed subsequently, e.g., noise caused by the output amp 129 or the quantization noise of the A/D converter 64 is reduced. However, it is not possible to considerably reduce noise as a whole unless noise that could be caused by the source-follower circuits of the imaging unit 110 or the column amps is sufficiently reduced.

Noise in amp output in a case where noise source is thermal noise of the source-follower circuits of the imaging unit 110, the column amps, and the subsequent column circuits 63 and column ADC circuits 280 will be calculated.

Noise components in the circuitry, including the source-follower circuits of the unit pixels 103, the switched-capacitor column amps, and sampling capacitances of the column circuits 63 and the column ADC circuits 280, include the following five components:

(1) Noise caused by the pixel source-follower circuits and sampled by the column amp at reset sampling
(2) Noise caused by the common-source amplifiers in the column amps and is sampled by the column amps at reset sampling
(3) Noise caused by the pixel source-follower circuits and is directly sampled by the column circuits 63 or the ADC circuits 280 at signal sampling
(4) Noise caused by the common-source amplifiers in the column amps and is directly sampled by the column circuits 63 or the column ADC circuits 280 at signal sampling
(5) Noise that could be caused by switches that reset the feedback capacitors of the column amps In equivalent circuits shown in FIGS. 24 and 25A, in the case of components (1) and (2), transfer functions in relation to noise power up to the input of the amps are determined and calculations are performed assuming that the noise charges are transferred to the output. In the case of components (2) and (3), transfer functions in relation to noise power up to the amp output, i.e., up to the input of the column circuits 63 or the column ADC circuits 280, are determined. The reset noise of the feedback capacitors is calculated in consideration of correlation between the inputs and outputs of the amps.

For example, regarding noise caused by the pixel source-follower (SF) circuits, the noise can be reduced by increasing gain G=C1/C2. The capacitance C2 for adjusting gain is set before or after the amp, and an approximate expression of input-referred noise power (mean square) is obtained from expression (3) below. This is because the effect of restricting the bandwidth of noise is increased by increasing the gain G.

$$\overline{v_n^2} = \frac{2}{3}kT\beta_A \frac{(1+(1/G)+C_i/C_1)^2}{C_1+C_i+(1+G+GC_i/C_1)C_3} \quad (3)$$

As for noise that could be caused by the column amp, the noise can be increased by increasing the gain G=C1/C2. As shown in FIG. 25, the input-referred noise power (mean square) can be expressed by expression (4) below. By increasing the gain G, the effect of restricting noise is increased. Furthermore, although noise is increased by the ratio of Ci to C2, the input-referred noise is decreased by increasing the gain G.

$$\overline{v_n^2} = \frac{2}{3}kT\beta_{SF} \frac{1}{G \frac{\{C_{SH}(1+C_s/C_1)+(1+GC_{SH}/C_1)}{(C_S+C_i+C_iC_s/C_1)\}}} \quad (4)$$

As described above, by adjusting gain in the column amp as in the embodiment described above, the input-referred thermal noise that could be caused by the pixel source-follower circuits and the column amps for adjusting gains is reduced.

That is, by increasing gain using a column circuit that adaptively amplifies pixel signals, the input-referred noise can be reduced. By amplifying signals at a high gain using a column circuit having a narrow bandwidth of noise, the input-referred noise that could be caused by a dominant noise source, for example, the source-follower circuits of the imaging unit 110 or the column amps, is reduced.

FIG. 26 shows distribution of random noise of one line in one frame in an experimental image sensor constructed according to the first embodiment. The distribution was obtained by calculating a fixed pattern noise component with regard to a specific line and subtracting the fixed pattern component from the output data of the one line. Random noise σ is 785 μVrms with gain setting of ×1, and is 2.1 mVrms with gain setting of ×8, and the input-referred noise is 263 μVrms. That is, random noise is reduced considerably. Although not shown, the fixed pattern noise is 1.7 mVrms before correction and is 50 μVrms after correction. That is, noises are favorably reduced as in CCD devices.

As described above, circuits for independently detecting the magnitudes of pixel signals and independently setting gains for the magnitudes are provided for the respective pixel columns, so that random noise is reduced by a certain factor compared with the related art. Furthermore, the amplitude of voltage from the solid-state imaging unit 2 (the solid-state imaging device 10) is large, so that the dynamic range is increased. For example, when the A/D converter 64 is 15 (17) bits wide and gain setting is controlled in a range of ×1 to ×8, a precision of 15 (17) bits is achieved. This allows improvement in S/N ratio for each pixel and increase in dynamic range using simple circuit construction and small pixels.

As described above, according to this embodiment, the following main advantages are achieved.

(1) Although the arrangement is column-based, signals of the respective pixels are read with optimal amplification gains, and it is possible to set gains independently for the respective pixels.
(2) S/N ratio of signals of small levels is considerably improved, so that the solid-state imaging unit achieves high sensitivity.
(3) By performing 12 (14) bits AD conversion and by performing gain setting (×2, ×4, or ×8) with respect to normal gain (×1) based on powers of 2 in the column circuits, a wide dynamic range of 15 (17) bits or larger is achieved.
(4) Even when processing such as auto exposure, flicker correction, γ correction, shading correction, or color balancing is performed in the digital domain, S/N ratio is not degraded, and images of high quality can be readily obtained.

Although the above description has been made in the context of a CMOS image sensor, the present invention may be applied to various electronic apparatuses including imaging devices, such as cameras, portable terminals, and personal computers including solid-stage imaging devices, serving to improve the functionality of the imaging devices.

Furthermore, the present invention may be applied to high-sensitivity CMOS image sensors of other arrangements, or CCD-CMOS combined sensors combined with CCD.

Furthermore, various modifications relating to other parts are possible without departing from the spirit of the present invention.

In the description of the embodiments of the present invention, "row" and "column" indicating the arrangement of pixels or the direction of lines refer to a horizontal direction and a vertical direction of a matrix, respectively. However, the present invention is not limited to the arrangements of components described above. For example, signals may be read from pixels to the outside of an imaging region through signal lines extending in a horizontal direction. Furthermore, the directions of "row" and "column" depend on how "row" and "column" are defined. For example, when "row" indicates a vertical direction, the present invention is to be construed with "row" and "column" exchanged with each other.

Furthermore, even when pixels are not strictly arranged in a matrix form, for example, when pixels are arranged with shifts of half pitch, those skilled in the art can set "row" and "column" as appropriate and apply the present invention.

What is claimed is:

1. An image sensor comprising:
a pixel configured to convert incident light into electrical charges;
circuitry configured to read out to a signal line a pixel signal based on the electrical charges;
a column processor provided for the pixel and including a switch, an operational amplifier, a column circuit, and a two-stage circuit;
a capacitor coupling the signal line to an input of the operational amplifier, wherein a gain of the operational amplifier is adjusted based on the pixel signal;
the two-stage circuit having a first stage circuit and a second stage circuit, the first stage circuit receiving a first voltage and the second stage circuit receiving a second voltage, wherein the first voltage and the second voltage are based on a reference voltage, the two-stage circuit has an input electrically coupled to an output of the operational amplifier, the first stage circuit compares the output of the operational amplifier to the reference voltage, the first stage circuit has a reset switch operatively coupled thereto to effect a reset of the first stage circuit, the two-stage circuit detects a signal level of the signal line on an output side of the operational amplifier to obtain a classification signal and outputs the classification signal to the operational amplifier, wherein the gain of the operational amplifier is adjusted based on the classification signal; and
a storage device coupled to receive an output from the two-stage circuit.

2. The image sensor of claim 1, wherein:
the pixel can be reset by draining electrical charges stored therein; and
the image sensor is configured to reset the operational amplifier while the pixel is being reset.

3. The image sensor of claim 2, wherein the image sensor is configured to terminate resetting of the pixel prior to terminating resetting of the operational amplifier.

4. The image sensor of claim 1, wherein:
the pixel can be reset by draining electrical charges stored therein; and
the image sensor is configured to terminate resetting of the pixel prior to terminating resetting of the first stage circuit.

5. The image sensor of claim 1, wherein an electrical signal relating to reset noise is stored in the first stage circuit.

6. The image sensor of claim 1, wherein the pixel includes a buried photodiode to convert the incident light into the electrical charges.

7. The image sensor of claim 1, wherein the output is a gain that is set based on a signal level detected on the output side of the first stage circuit.

8. The image sensor of claim 1, wherein the gain is adjusted in four stages.

9. The image sensor of claim 1, wherein the sensor further comprises a pixel signal level classifier circuit comprising a set of two comparators, an input capacitor, and a switch.

10. The image sensor of claim 1, wherein the two-state circuit comprises a set of two comparators, an input capacitor, and a switch.

11. The image sensor of claim 1, wherein the storage device is located in an ADC.

12. The image sensor of claim 11, wherein the ADC comprises an amp circuit and a counter.

13. The image sensor of claim 12, wherein the amp circuit compares an amplified signal based on the pixel signal to a RAMP signal.

14. The image sensor of claim 1, wherein the operational amplifier is arranged such that DC levels of the output from the two-stage circuit do not vary when the gain is adjusted.

15. The image sensor of claim 1, wherein the two-stage circuit also outputs the classification signal to a control signal generator, the control signal generator generating control signals for retrieving the output from the two-stage circuit.

16. An electronic device including an image sensor, the image sensor comprising:
a pixel configured to convert incident light into electrical charges;
circuitry configured to read out to a signal line a pixel signal based on the electrical charges;
a column processor provided for the pixel and including a switch, an operational amplifier, a column circuit, and a two-stage circuit;
a capacitor coupling the signal line to an input of the operational amplifier, wherein a gain of the operational amplifier is adjusted based on the pixel signal;
a two-stage circuit having a first stage circuit and a second stage circuit, the first stage circuit receiving a first voltage and the second stage circuit receiving a second voltage, wherein the first voltage and the second voltage are based on a reference voltage, the two-stage circuit has an input electrically coupled to an output of the operational amplifier, the first stage circuit compares the output of the operational amplifier to the reference voltage, the first stage circuit has a reset switch operatively coupled thereto to effect a reset of the first stage circuit, the two-stage circuit detects a signal level of the signal line on an output side of the operational amplifier to obtain a classification signal and outputs the classification signal to the operational amplifier, wherein the gain of the operational amplifier is adjusted based on the classification signal; and
a storage device coupled to receive an output from the two-stage circuit.

17. The electronic device of claim 16, wherein the image sensor is configured to terminate resetting of the pixel prior to terminating resetting of the operational amplifier.

18. The electronic device of claim 16, wherein:
the pixel can be reset by draining electrical charges stored therein; and
the image sensor is configured to terminate resetting of the pixel prior to terminating resetting of the first stage circuit.

19. The electronic device of claim 16, wherein pixel an electrical signal relating to reset noise is stored in the first stage circuit.

20. A method of driving an image sensor comprising:
(a) a pixel configured to convert incident light into electrical charges;
(b) circuitry configured to read out to a signal line a pixel signal based on the electrical charges;
(c) a column processor provided for the pixel and including a switch, an operational amplifier, a column circuit, and a two-stage circuit;
(d) a capacitor coupling the signal line to an input of the operational amplifier, wherein a gain of the operational amplifier is adjusted based on the pixel signal;
(e) a two-stage circuit having a first stage circuit and a second stage circuit, the first stage circuit receiving a first voltage and the second stage circuit receiving a second voltage, wherein the first voltage and the second voltage are based on a reference voltage, the two-state circuit has and an input electrically coupled to an output of the operational amplifier, the first stage circuit compares the output of the operational amplifier to the reference voltage, the first stage circuit has a reset switch operatively coupled thereto to effect a reset of the first stage, the two-stage circuit detects a signal level of the signal line on an output side of the operational amplifier to obtain a classification signal and outputs the classification signal to the operational amplifier, wherein the gain of the operational amplifier is adjusted based on the classification signal; and
(f) a storage device coupled to receive an output from the two-stage circuit.

21. The method of claim 20, further comprising the step of resetting the operational amplifier while the pixel is being reset to drain electrical charges therefrom.

22. The method of claim 21, further comprising the step of terminating resetting of the pixel prior to terminating resetting of the operational amplifier.

23. The method of claim 20, further comprising the steps of:
resetting the first stage while the pixel is being reset; and
terminating resetting of the pixel prior to terminating resetting of the first stage circuit.

24. The method of claim 20, comprising the step of storing a signal relating to pixel reset noise in the first stage circuit.

* * * * *